US012312028B2

(12) United States Patent
McKendrick et al.

(10) Patent No.: US 12,312,028 B2
(45) Date of Patent: May 27, 2025

(54) MODULAR VEHICLE

(71) Applicant: FACTION TECHNOLOGY, INC., South San Francisco, CA (US)

(72) Inventors: Ain McKendrick, Redwood City, CA (US); Peter O. Schmidt, Fredericksburg, TX (US); Mike Lowe, Santa Cruz, CA (US)

(73) Assignee: FACTION TECHNOLOGY, INC., South San Francisco, CA (US)

( * ) Notice: Subject to any disclaimer, the term of this patent is extended or adjusted under 35 U.S.C. 154(b) by 0 days.

(21) Appl. No.: 18/433,085

(22) Filed: Feb. 5, 2024

(65) Prior Publication Data

US 2024/0262437 A1 Aug. 8, 2024

Related U.S. Application Data

(60) Provisional application No. 63/443,311, filed on Feb. 3, 2023.

(51) Int. Cl.
*B62D 63/02* (2006.01)
(52) U.S. Cl.
CPC ................................ *B62D 63/025* (2013.01)
(58) Field of Classification Search
CPC ............................ B62D 63/025; B62D 31/003
See application file for complete search history.

(56) References Cited

U.S. PATENT DOCUMENTS

| | | | | |
|---|---|---|---|---|
| 3,616,872 A | * | 11/1971 | Taylor | B62D 31/003 296/205 |
| 6,042,170 A | * | 3/2000 | Yamaoka | B62D 25/10 292/303 |
| 9,221,508 B1 | * | 12/2015 | De Haan | B60N 2/005 |
| 10,665,140 B1 | * | 5/2020 | Ahn | B60K 37/00 |
| 11,912,144 B2 | * | 2/2024 | Wheatley | B60L 53/52 |
| 12,060,102 B1 | * | 8/2024 | Nusier | B62K 5/027 |
| 2002/0175534 A1 | * | 11/2002 | Strong | B62D 53/02 296/77.1 |
| 2003/0204999 A1 | * | 11/2003 | George | B60J 5/047 49/216 |
| 2008/0245593 A1 | * | 10/2008 | Kim | B62D 61/08 180/65.245 |
| 2009/0241493 A1 | * | 10/2009 | Sprague | E04B 2/827 55/493 |

(Continued)

*Primary Examiner* — Paul N Dickson
*Assistant Examiner* — Shams Dhanani
(74) *Attorney, Agent, or Firm* — Maschoff Brennan

(57) ABSTRACT

An autonomous modular vehicle includes electronic components, sensors, a three-wheeled chassis, a frame, and a modular body. The frame is attached to the chassis and is configured to enclose the electronic components and support a sensor enclosure. The sensor enclosure is configured to house the sensors. The modular body is attached to the frame and includes a battery, an electrical charging system, a modular interior portion, a door, and a canopy. The electrical charging system is configured to receive an electrical input for charging the battery. The modular interior portion is configured to be one of a cargo configuration, a single rider configuration, or a double rider configuration. The door is configured to provide access and egress to the modular interior portion. The door is rotatably coupled to the modular body. The canopy is attached to a superior portion of the door.

19 Claims, 48 Drawing Sheets

(56) References Cited

U.S. PATENT DOCUMENTS

| | | | | |
|---|---|---|---|---|
| 2010/0078254 A1* | 4/2010 | Rolfe | ............... | B60L 53/31 |
| | | | | 180/302 |
| 2011/0010998 A1* | 1/2011 | Elliott | ............... | E05D 15/101 |
| | | | | 49/260 |
| 2011/0017527 A1* | 1/2011 | Oriet | ............... | B60S 13/00 |
| | | | | 296/186.4 |
| 2012/0024612 A1* | 2/2012 | Ballard | ............... | B32B 5/18 |
| | | | | 296/187.02 |
| 2012/0037441 A1* | 2/2012 | Frohnmayer | ............... | B62D 31/003 |
| | | | | 180/210 |
| 2013/0098695 A1* | 4/2013 | Itou | ............... | B60K 17/356 |
| | | | | 180/211 |
| 2017/0203801 A1* | 7/2017 | Hung | ............... | B62D 61/12 |
| 2017/0247924 A1* | 8/2017 | Gabl | ............... | E05D 15/264 |
| 2017/0296405 A1* | 10/2017 | Clevenger | ............... | B60N 2/01516 |
| 2018/0119465 A1* | 5/2018 | Wojdyla | ............... | E05D 3/04 |
| 2019/0375464 A1* | 12/2019 | Favaretto | ............... | B62D 29/001 |
| 2020/0223485 A1* | 7/2020 | Wang | ............... | B62D 21/02 |
| 2020/0307437 A1* | 10/2020 | Thieberger | ............... | B62D 31/003 |
| 2020/0369334 A1* | 11/2020 | Lee | ............... | B60K 1/04 |
| 2021/0024164 A1* | 1/2021 | Mauck | ............... | B62K 19/46 |
| 2021/0086852 A1* | 3/2021 | Kunsch | ............... | B60L 50/60 |
| 2021/0364631 A1* | 11/2021 | Hasegawa | ............... | G01S 13/86 |
| 2021/0403091 A1* | 12/2021 | Stronach | ............... | B62D 21/15 |
| 2022/0242277 A1* | 8/2022 | Liong | ............... | B62D 31/003 |
| 2023/0077070 A1* | 3/2023 | Yates | ............... | B60K 1/04 |
| 2023/0182834 A1* | 6/2023 | Jaradi | ............... | B62D 39/00 |
| | | | | 280/62 |
| 2023/0202270 A1* | 6/2023 | Yim | ............... | E05F 1/12 |
| | | | | 296/146.11 |
| 2023/0286586 A1* | 9/2023 | de Castro Guimarães Lopes Barbosa | ............... | B62D 25/12 |
| 2023/0415840 A1* | 12/2023 | Hoskin | ............... | B62J 25/04 |
| 2024/0227531 A1* | 7/2024 | Kunsch | ............... | B60L 50/60 |

\* cited by examiner

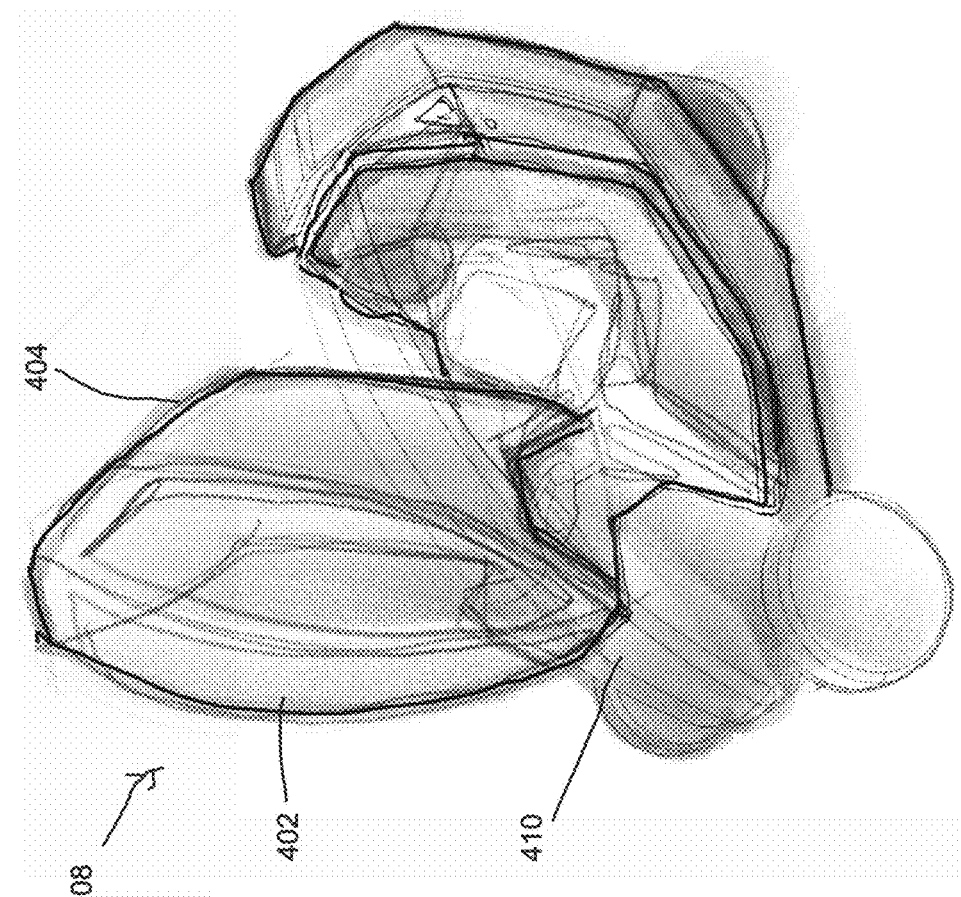
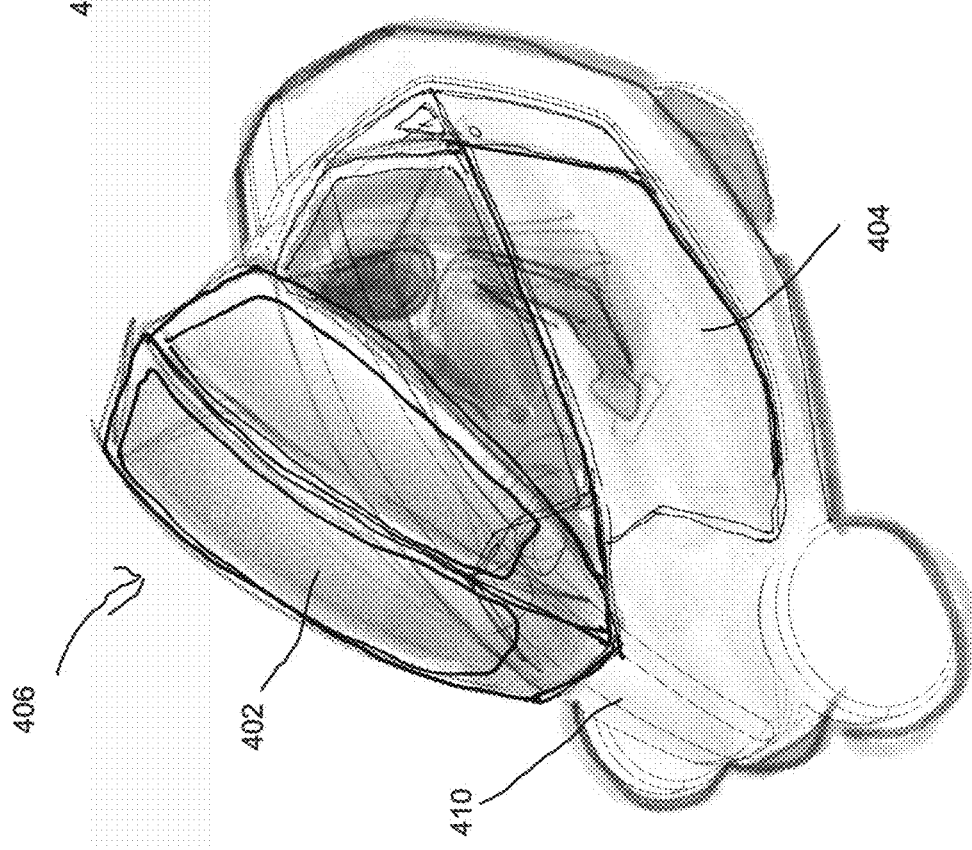
B canopy and door combined
A canopy only
FIG. 4

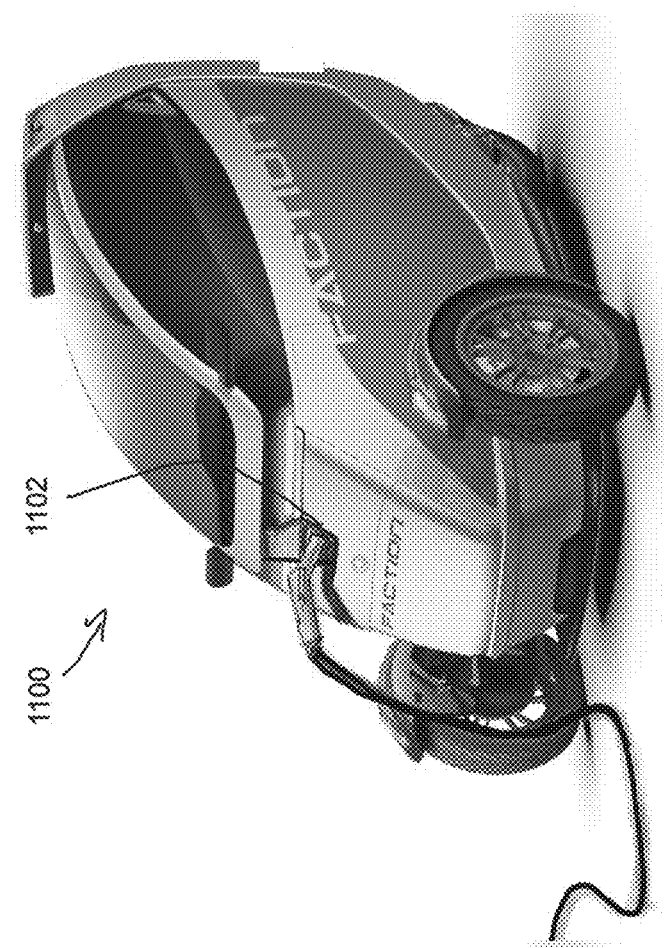
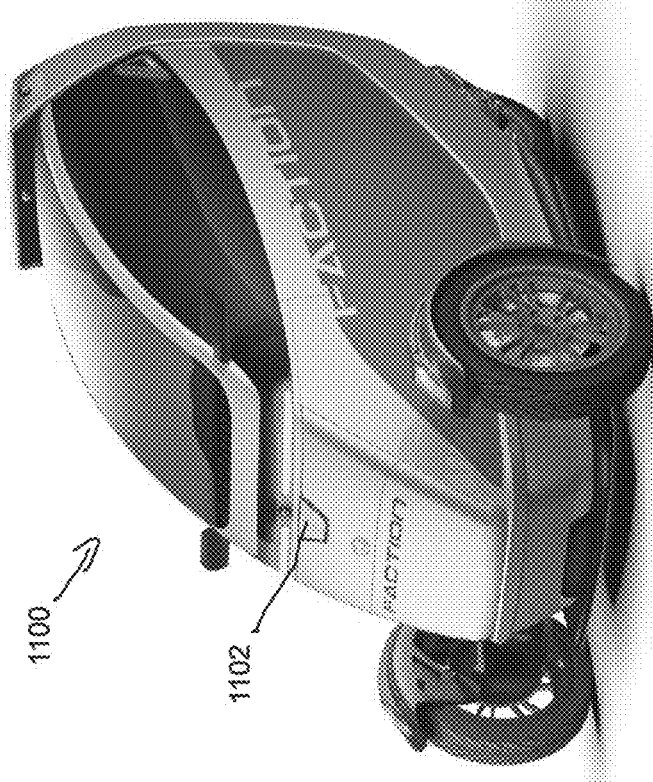
FIG. 11

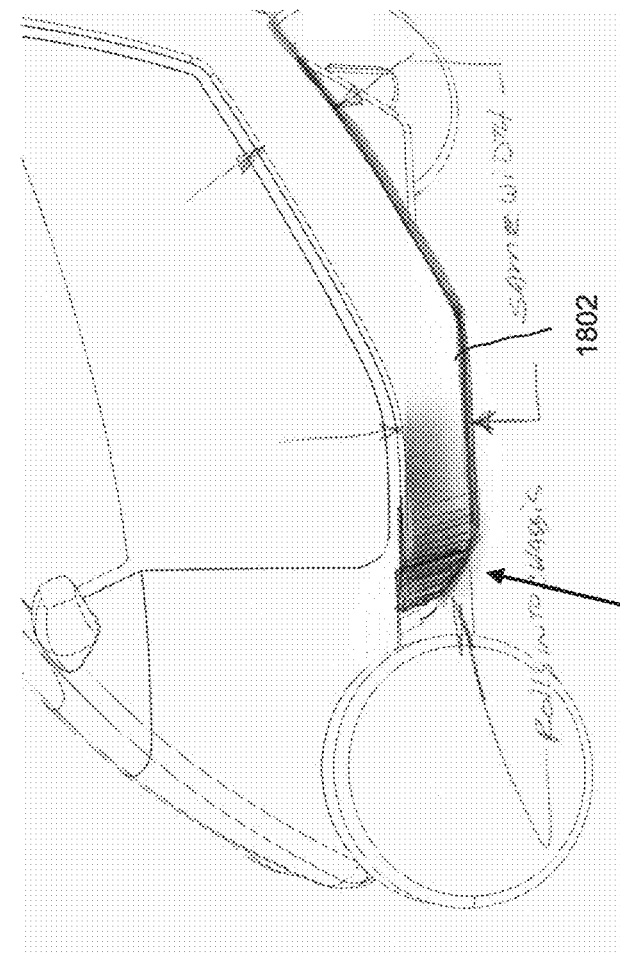
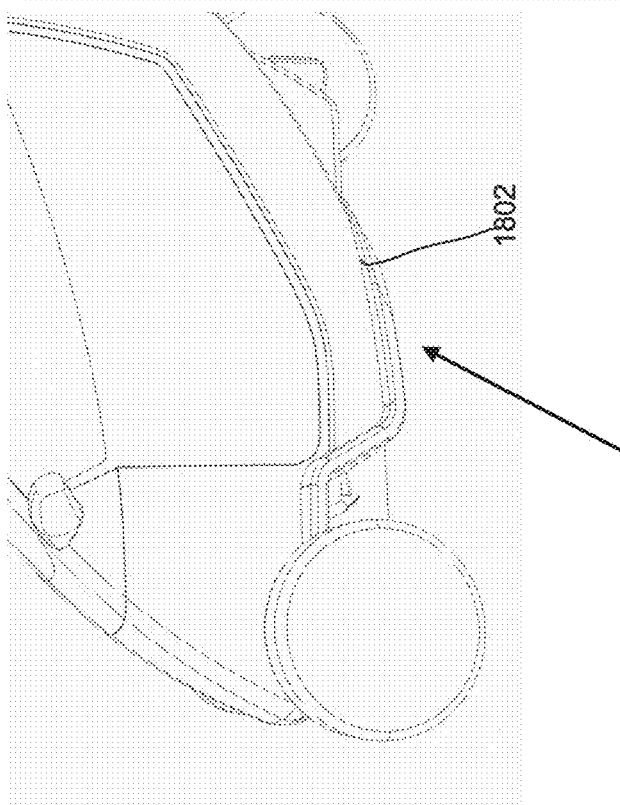
FIG. 18

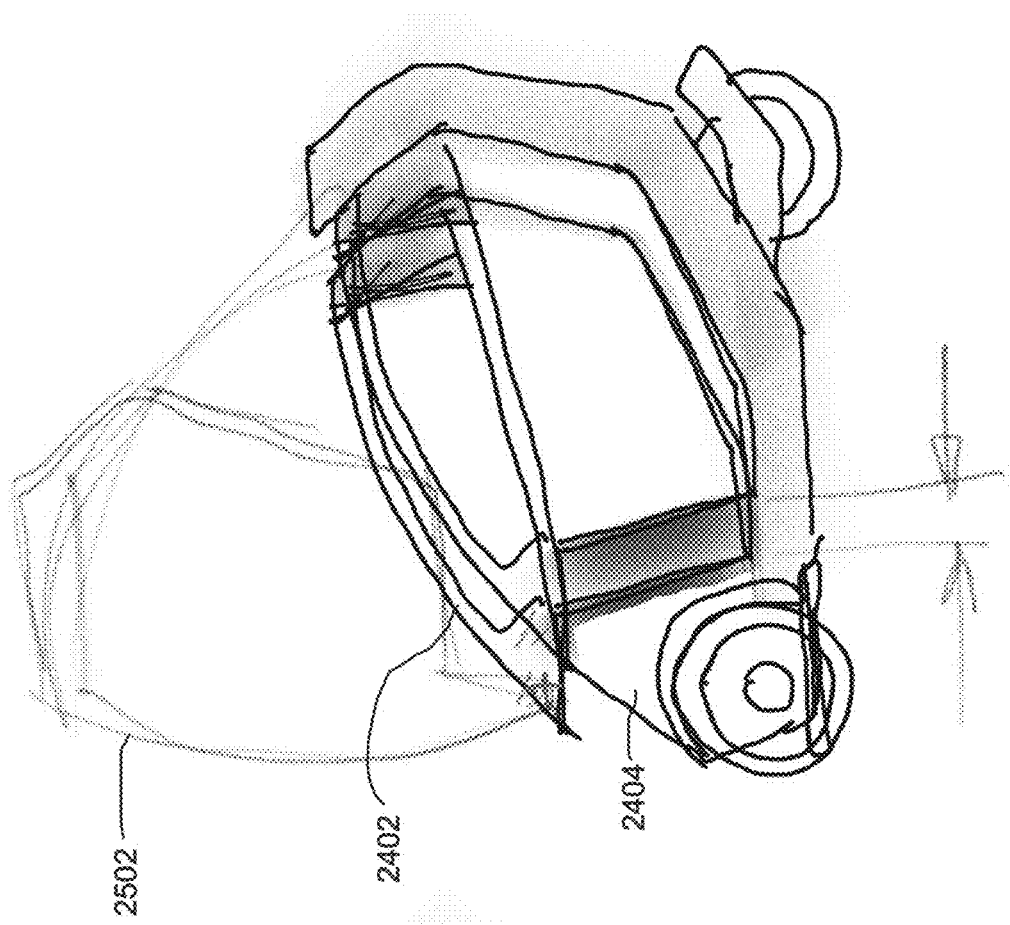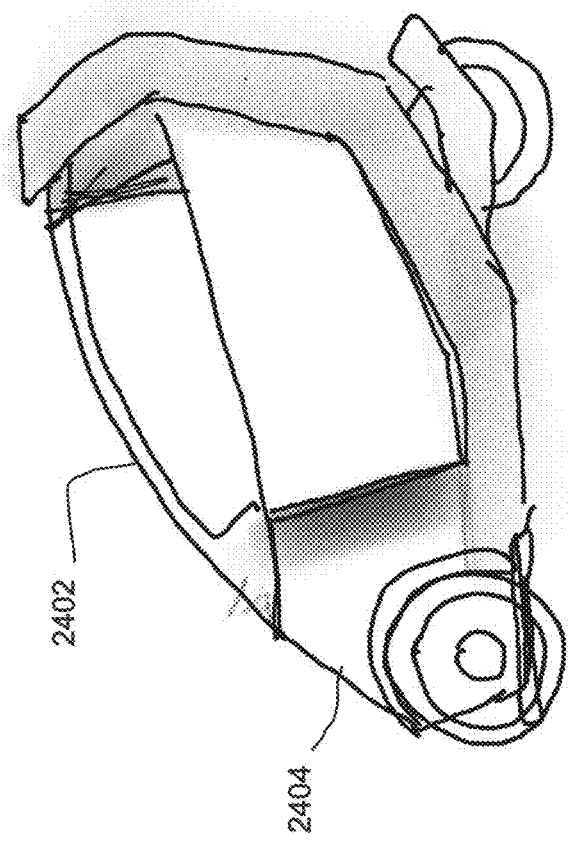
FIG. 25 design B design A

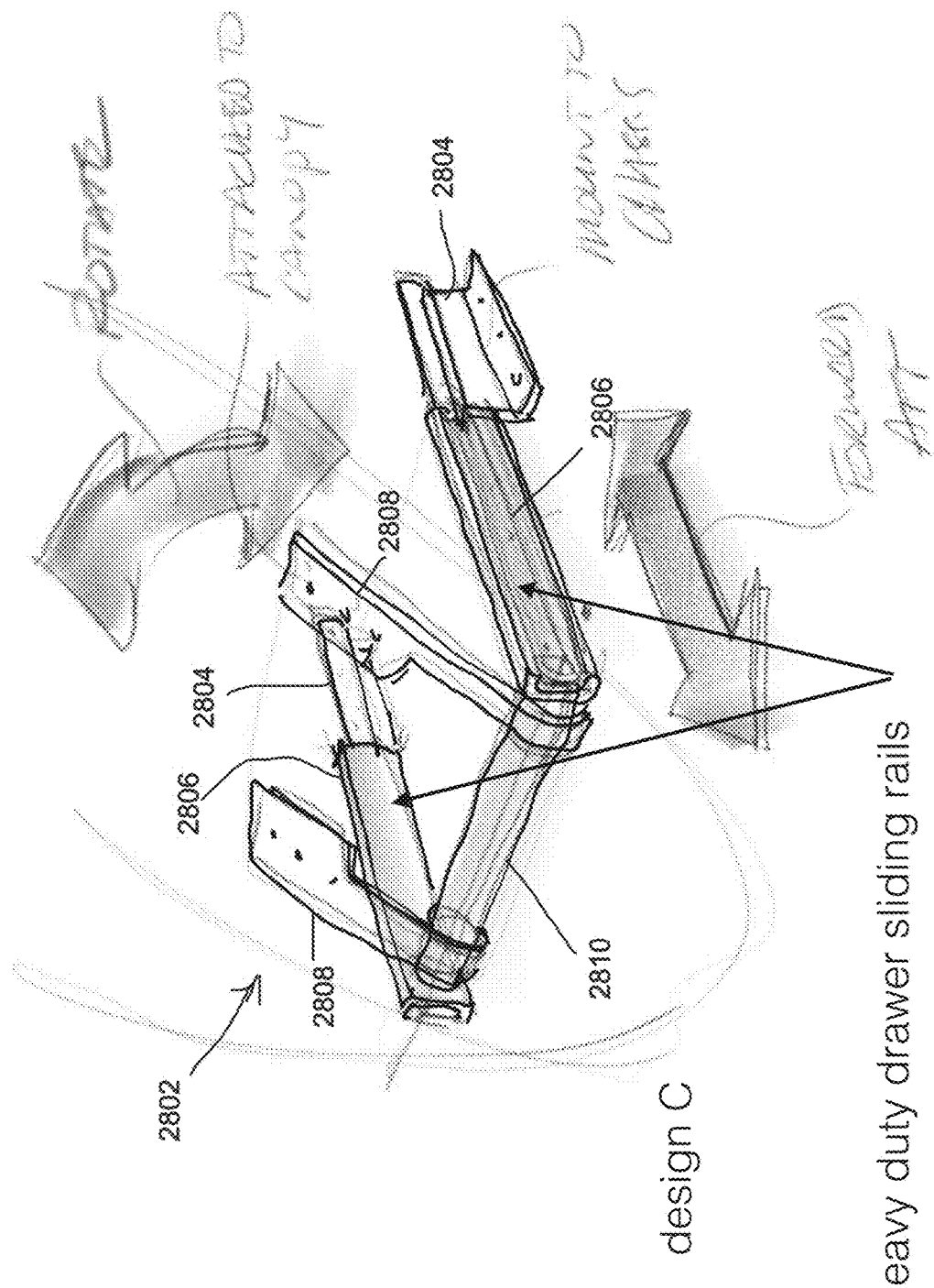

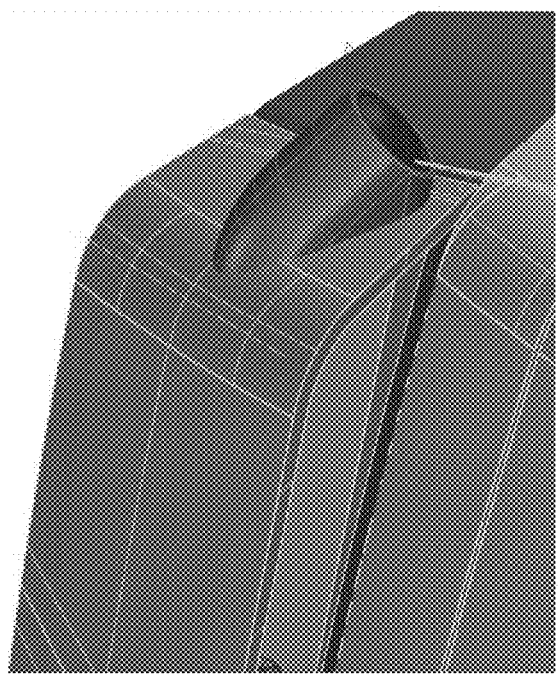
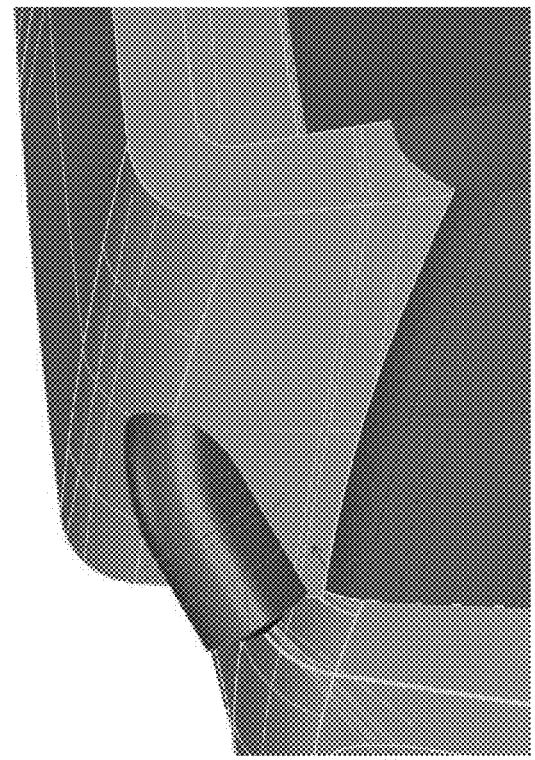
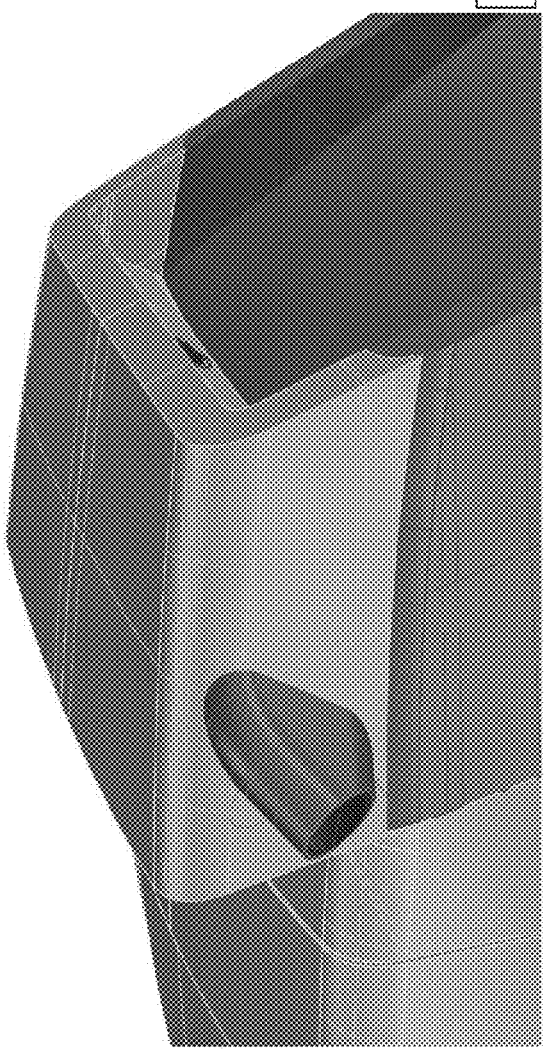
FIG. 38

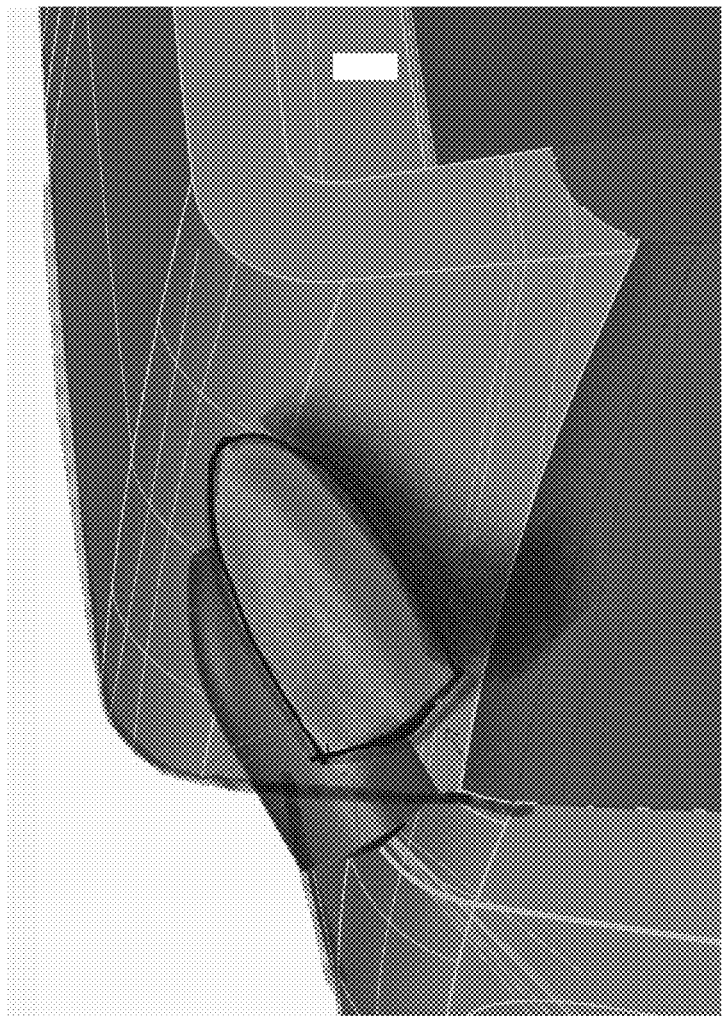
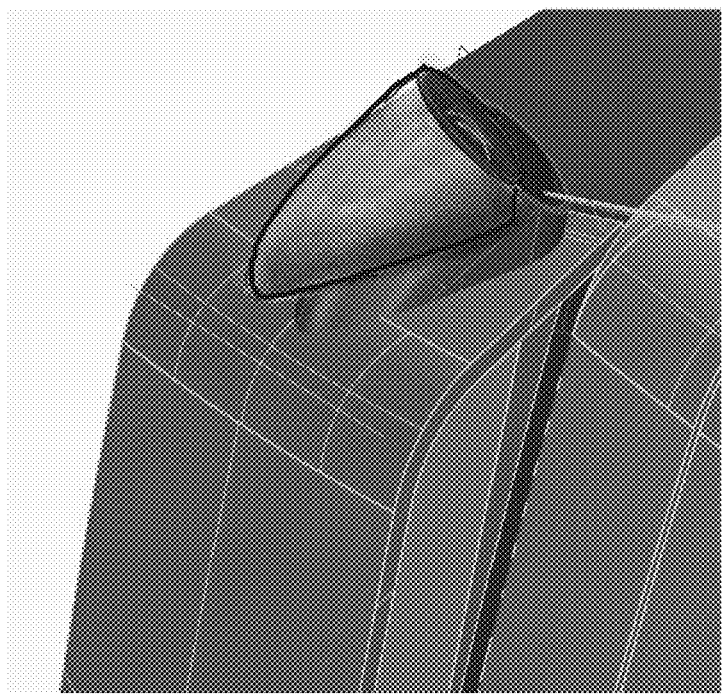
FIG. 39

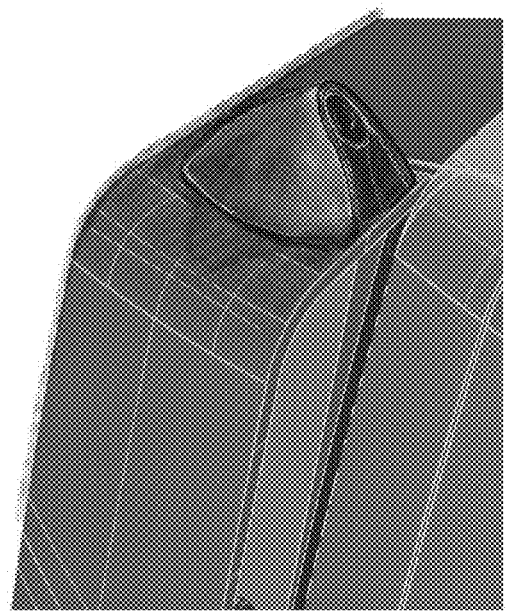
1
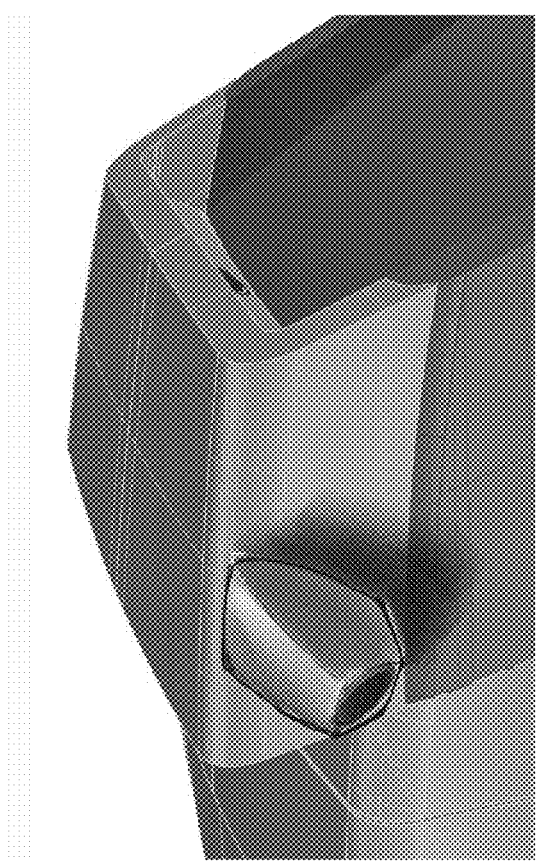
2
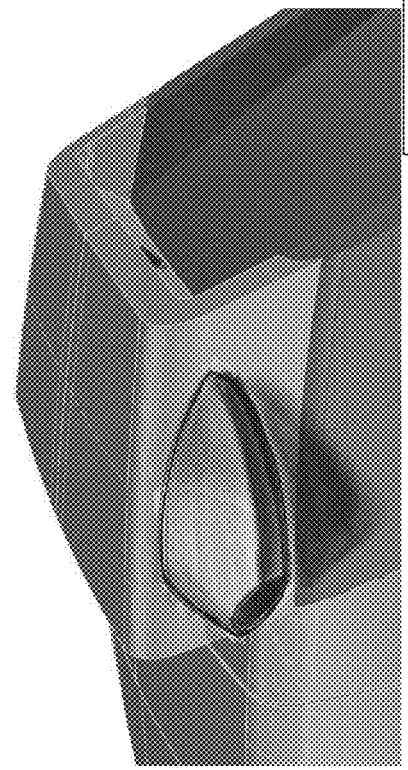
3
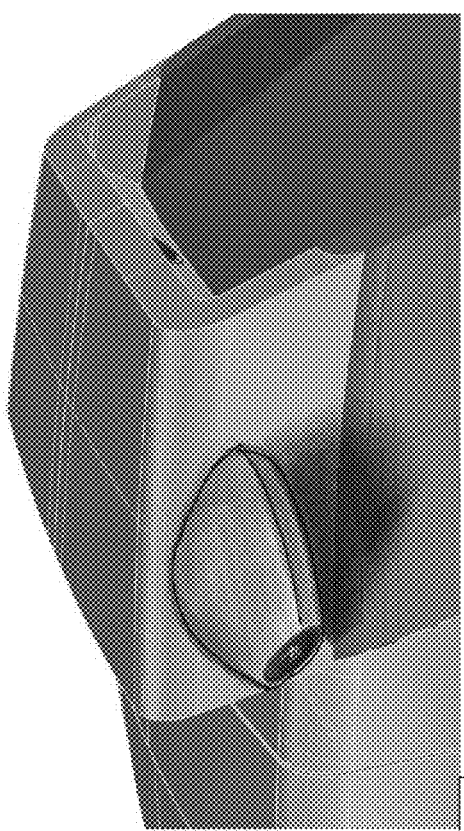
4
FIG. 40

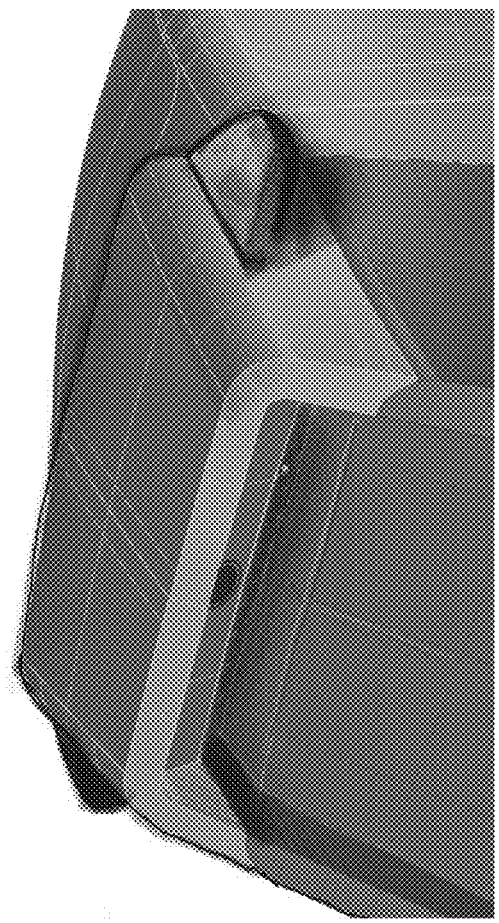
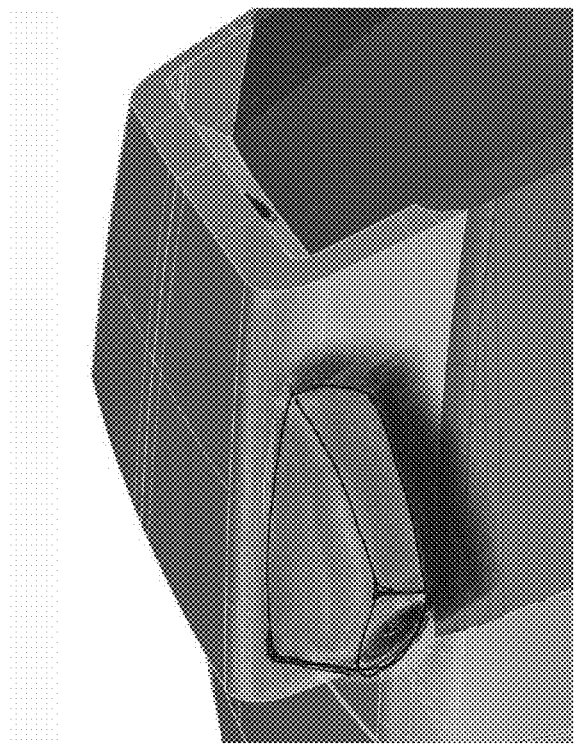
FIG. 43

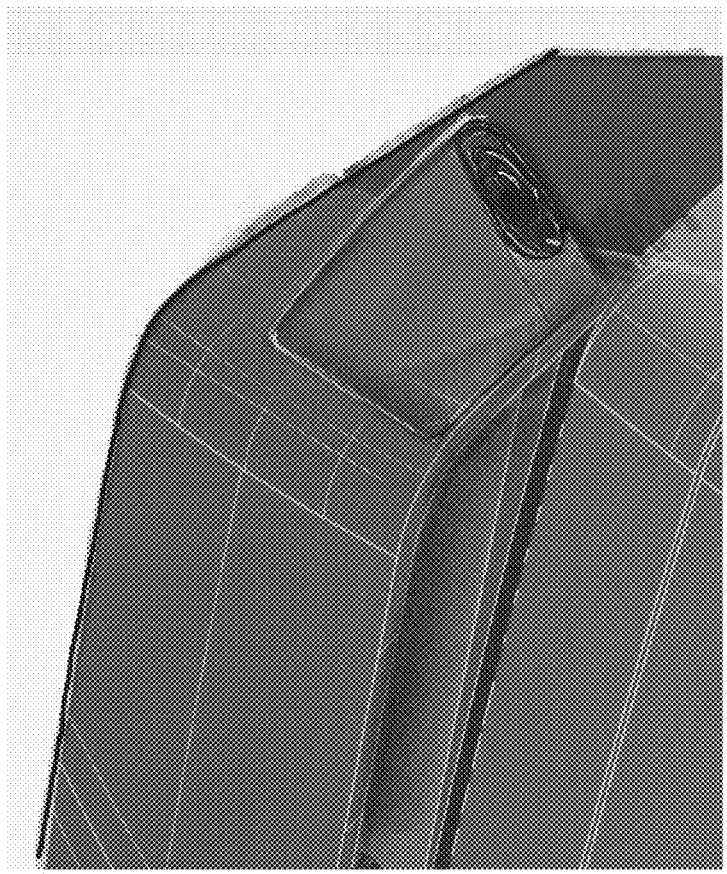
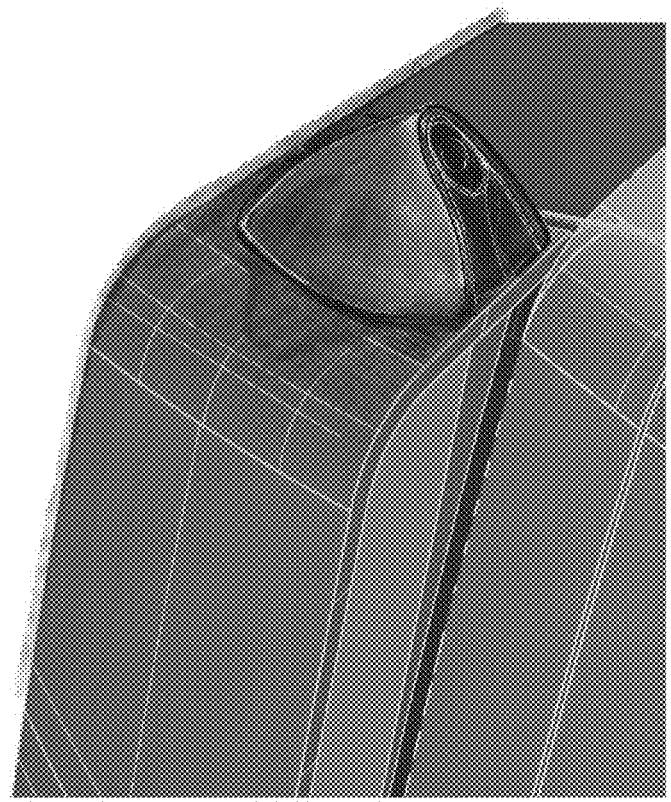
FIG. 44

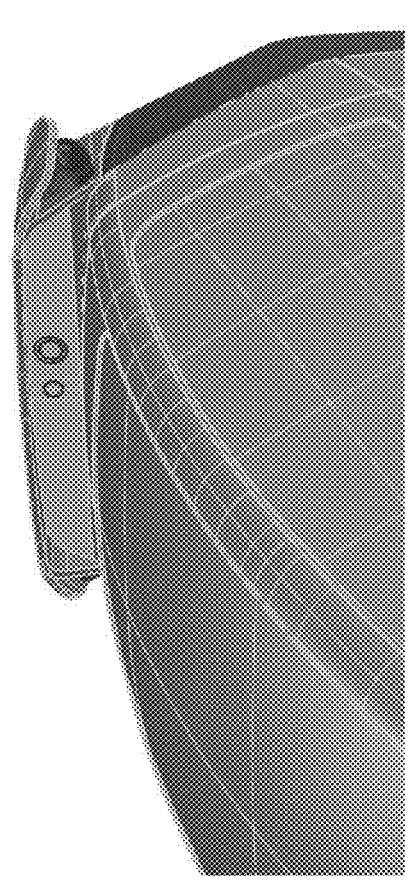
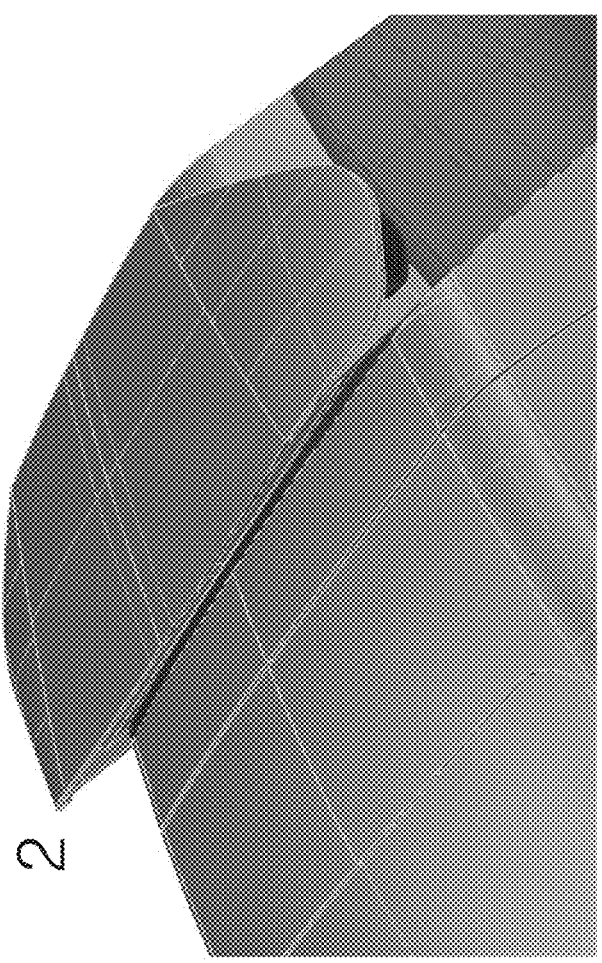
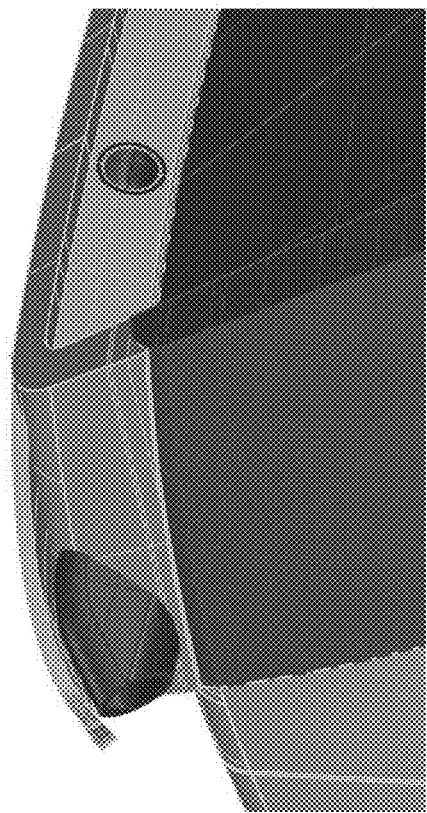
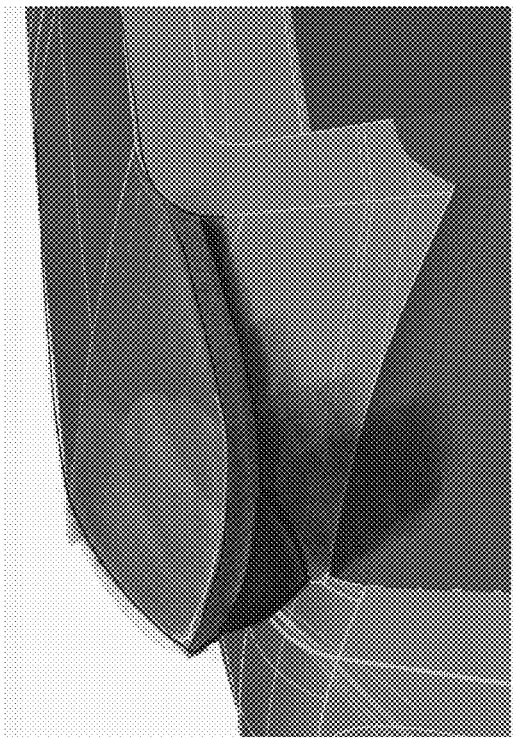
FIG. 48

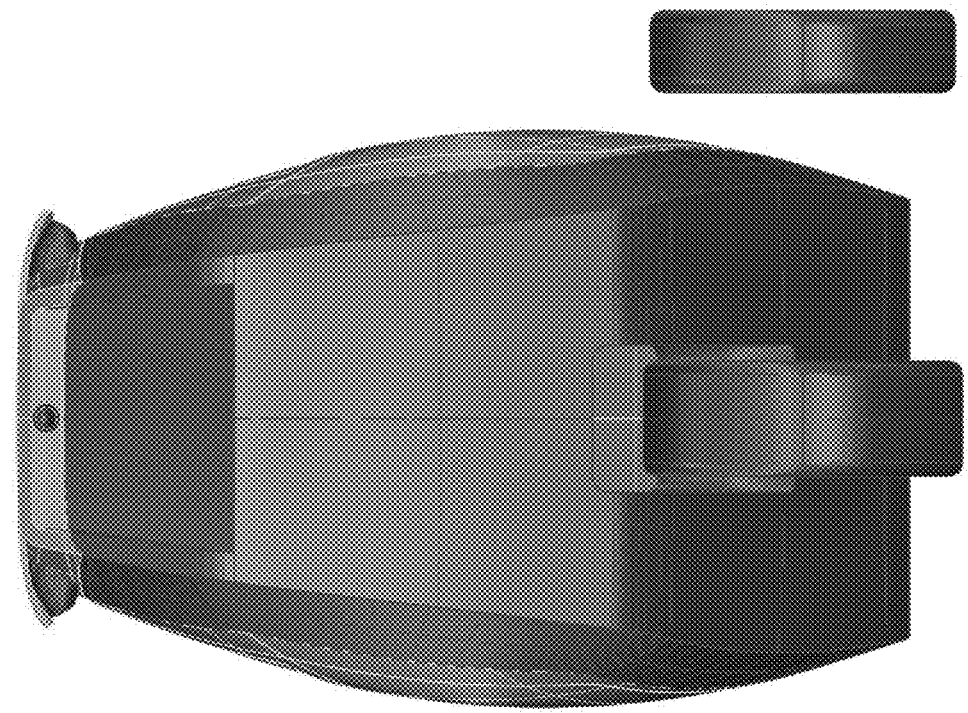
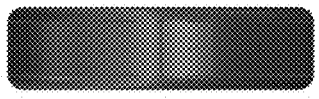
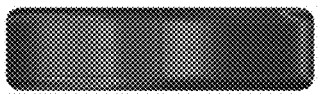
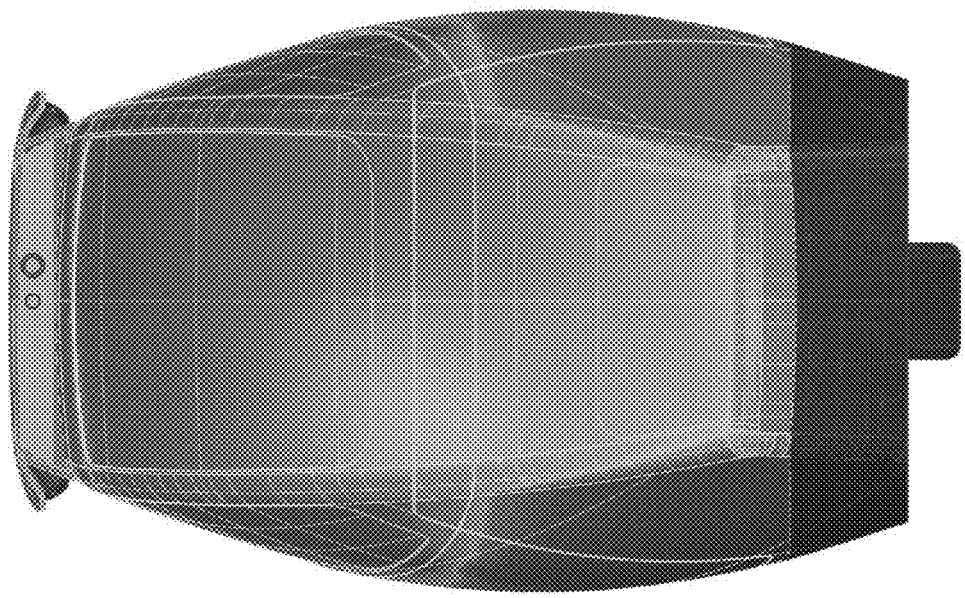
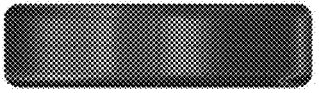
FIG. 49

MODULAR VEHICLE

CROSS-REFERENCE TO RELATED APPLICATION

This application claims the benefit of and priority to U.S. Provisional App. No. 63/443,311 filed on Feb. 3, 2023. The 63/443,311 application is incorporated herein by reference.

FIELD

The embodiments discussed in the present disclosure are related to modular vehicles.

BACKGROUND

Unless otherwise indicated herein, the materials described herein are not prior art to the claims in the present application and are not admitted to be prior art by inclusion in this section.

Vehicles may be used for a variety of purposes, including the transportation of persons and/or objects.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

BRIEF SUMMARY

This Summary is provided to introduce a selection of concepts in a simplified form that are further described below in the Detailed Description. This Summary is not intended to identify key features or essential characteristics of the claimed subject matter, nor is it intended to be used to limit the scope of the claimed subject matter.

In an embodiment, an autonomous modular vehicle includes electronic components, sensors, a three-wheeled chassis, a frame, and a modular body. The frame is attached to the chassis and is configured to enclose the electronic components and support a sensor enclosure. The sensor enclosure is configured to house the sensors. The modular body is attached to the frame and includes a battery, an electrical charging system, a modular interior portion, a door, and a canopy. The electrical charging system is configured to receive an electrical input for charging the battery. The modular interior portion is configured to be one of a cargo configuration, a single rider configuration, or a double rider configuration. The door is configured to provide access and egress to the modular interior portion. The door is rotatably coupled to the modular body. The canopy is attached to a superior portion of the door.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

BRIEF DESCRIPTION OF THE DRAWINGS

Example embodiments will be described and explained with additional specificity and detail through the use of the accompanying drawings in which:

FIG. 4 illustrates an example embodiment of a modular vehicle in which a canopy of the modular vehicle may be separably opened with respect to a door of the modular vehicle;

FIGS. 11 and 12 illustrate example battery charging options for a modular vehicle;

FIGS. 17 and 18 illustrate an example profile of a frame of a modular vehicle;

FIGS. 24-25 illustrate an example configuration of a door and/or canopy of a modular vehicle;

FIGS. 26-28 illustrate example first, second, and third 2-stage hinge mechanisms that may be used to accommodate the lateral and rotational movement of the door and/or canopy of the modular vehicle of FIGS. 24-25;

FIGS. 38-45 illustrate example configurations of various side facing (or at least partially side facing) sensors attached to a sensor enclosure or frame of a modular vehicle; and FIGS. 46-49 illustrate example configurations of various wing shaped sensor enclosures, all according to one or more embodiments of the present disclosure.

DESCRIPTION OF EMBODIMENTS

Figure 1:
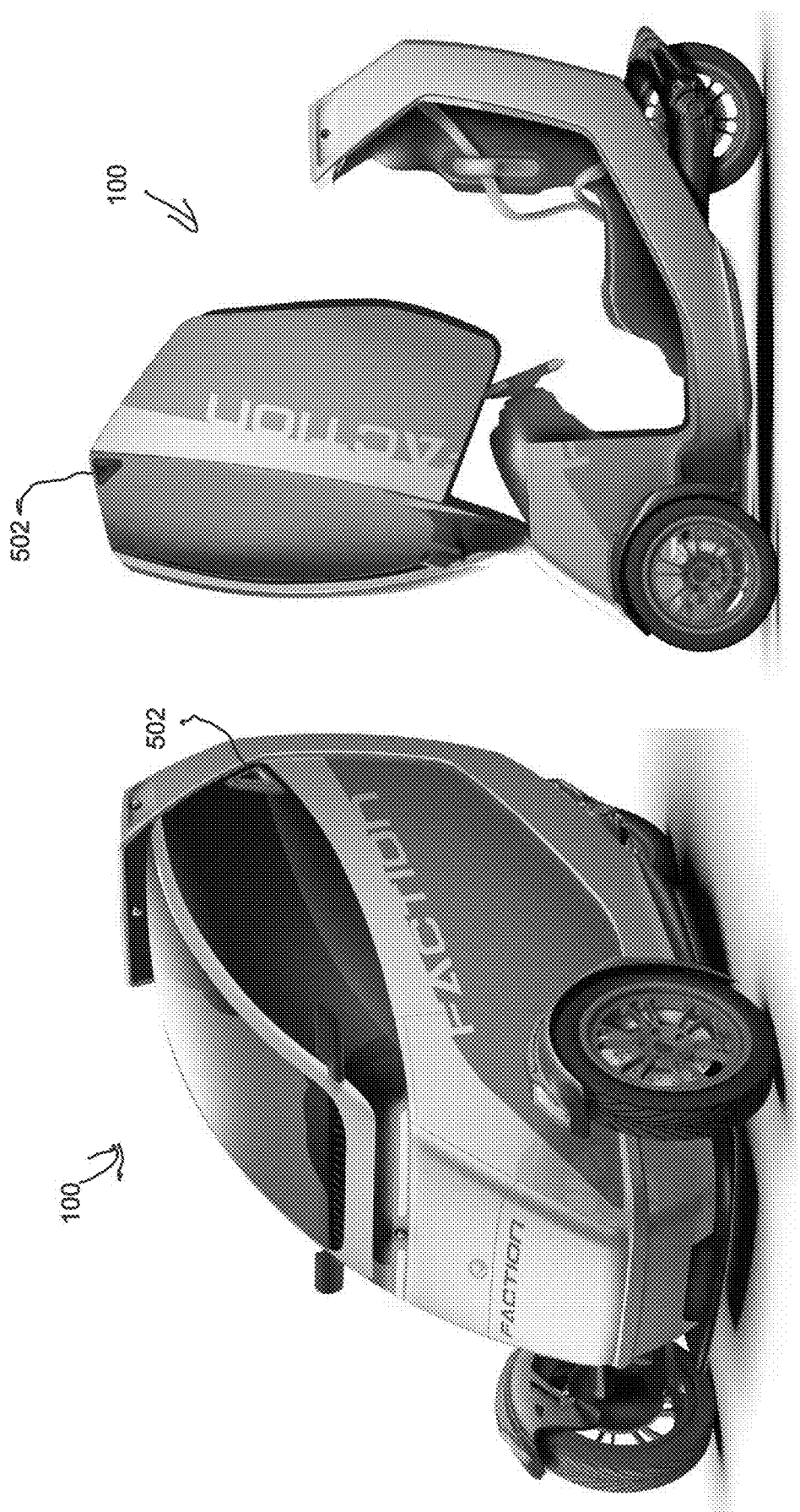
FIG. 1 illustrates a perspective and a side view of an example modular vehicle.

Vehicles may be used for a variety of purposes, including the transportation of persons and/or cargo. Further, fleets of vehicles may be used to assist in the transportation of persons or cargo. For example, a fleet of vehicles may be available for deployment for use by a user for transportation of the user, another person, and/or cargo (e.g., packages). In some embodiments, the fleet of vehicles may include one or more autonomous vehicles that may be configured to perform self-driving operations. In the present disclosure, reference to an "autonomous vehicle" may include any vehicle that is capable of navigating within an environment without human input. Additionally or alternatively, reference to an "autonomous vehicle" may include vehicles that are fully autonomous. Additionally or alternatively, reference to an "autonomous vehicle" may include vehicles that are semi-autonomous in which the vehicles are capable of navigating within a limited set of parameters without human input and/or have limited navigation capabilities without human input, but are capable of remote assistance by humans when needed.

According to one or more embodiments of the present disclosure, a modular vehicle may be designed and configured to allow for the vehicle to have multiple uses or functions corresponding to different modules. Embodiments of the modular vehicle may include a base platform and at least one of multiple different modules. Alternatively or additionally, the base platform may include a base-to-module interface that is complementary to a module-to-base interface included in each of the different modules. The base platform may include a common general shape and design that allows for transferability between being used for, e.g., human transportation and for other cargo transportation.

For example, the base platform may be configured to have different modules detachably coupled thereto. The different modules may be configured for different uses. For example, a first module may include a seat that may be used for the carrying of passengers. A second module may include a cargo box that is configured to carry packages. Each of the first module and the second module may have a corresponding module-to-base interface that is complementary to the base-to-module interface included in the base platform. For instance, the module-to-base interface of the first module may be identical (or at least substantially identical) to the module-to-base interface of the second module. The common module-to-base interface shared by the first and second module (and/or other modules) may simplify the transitioning between different configurations of the modular vehicle. Additionally or alternatively to being detachably coupled, the modules may be configured to transition between different configurations for different uses.

By way of example, the modules may include steering systems, braking systems, driving systems, battery systems, motor systems, drive-by-wire systems, etc. Additionally or alternatively, the modules may include computing systems and/or platforms, sensors, component cooling systems, power control systems, etc. Additionally or alternatively, the base platform may have a standardized base-to-module interface for each of different systems. Accordingly, many different types of systems produced by different entities may be used as modules as long as the systems have a module-to-base interface that is compatible with (and/or complementary to) the corresponding base-to-module interface of the base platform.

Further, autonomous vehicles typically rely on sensors to perceive the environment in which they are located to help with navigation. The perception may include identification of navigable paths (e.g., roadways, lanes, etc.), objects within the environment, pose of the vehicle (e.g., location of the vehicle, orientation of the vehicle, pitch of the vehicle, yaw of the vehicle, etc.), etc. Further, the calibration of the sensors often is heavily based on the locations of the sensors on the corresponding vehicles. In addition, the manner in which the sensor data is interpreted may be based on the locations of the sensors. As such, in some embodiments, the base platform may be configured such that regardless of the different configuration used, the sensor placement may not vary. Designing and configuring the base platform so that the sensor placement is consistent for each of the configurations may thus help simplify the deployment and configuration of the modular vehicles for different autonomous uses while reducing or avoiding having to make changes to sensor calibration and/or other autonomous configurations.

In some embodiments, the base platform may include a three-wheel motorcycle chassis ("motorcycle chassis"). The use of a motorcycle chassis may also help facilitate the deployment and use of the modular vehicles. For example, motorcycle chasses are typically simpler than car chasses and thus may reduce the complexity involved in the integration of different modules of different systems and configurations.

As indicated above, the modular vehicle may be used for a variety of different applications. For example, multiple such modular vehicles may be used as or within a fleet of vehicles that may be used in a ride-sharing application. For instance, a user may request a modular vehicle, which may be deployed to the user's location. In some embodiments, the modular vehicle may be autonomous and may drive itself to the user. Additionally or alternatively, the modular vehicle may allow the user to then drive the vehicle and/or the vehicle may drive the user to an indicated location using a fully autonomous and/or semi-autonomous functionality.

As another example, the modular vehicle and/or other such modular vehicles may be used to deliver food, packages, etc. In these or other embodiments, the modular vehicle may be configured to perform autonomous driving operations to make the deliveries.

The modular nature of the modular vehicle may also allow for adaptation of a fleet of vehicles in a relatively short amount of time. For example, in some instances demand for passenger services may increase while demand for package delivery decreases, or vice versa. The modular nature of the vehicle may allow an owner of a fleet of modular vehicles to adapt to such changing demands by allowing the owner to reconfigure the modular vehicles in a relatively short amount of time and a relatively small amount of work.

One or more example aspects of the modular vehicles are described below with respect to the Figures.

FIG. 1 illustrates a perspective and a side view of an example modular vehicle 100 configured according to one or more embodiments of the present disclosure.

Figure 2:
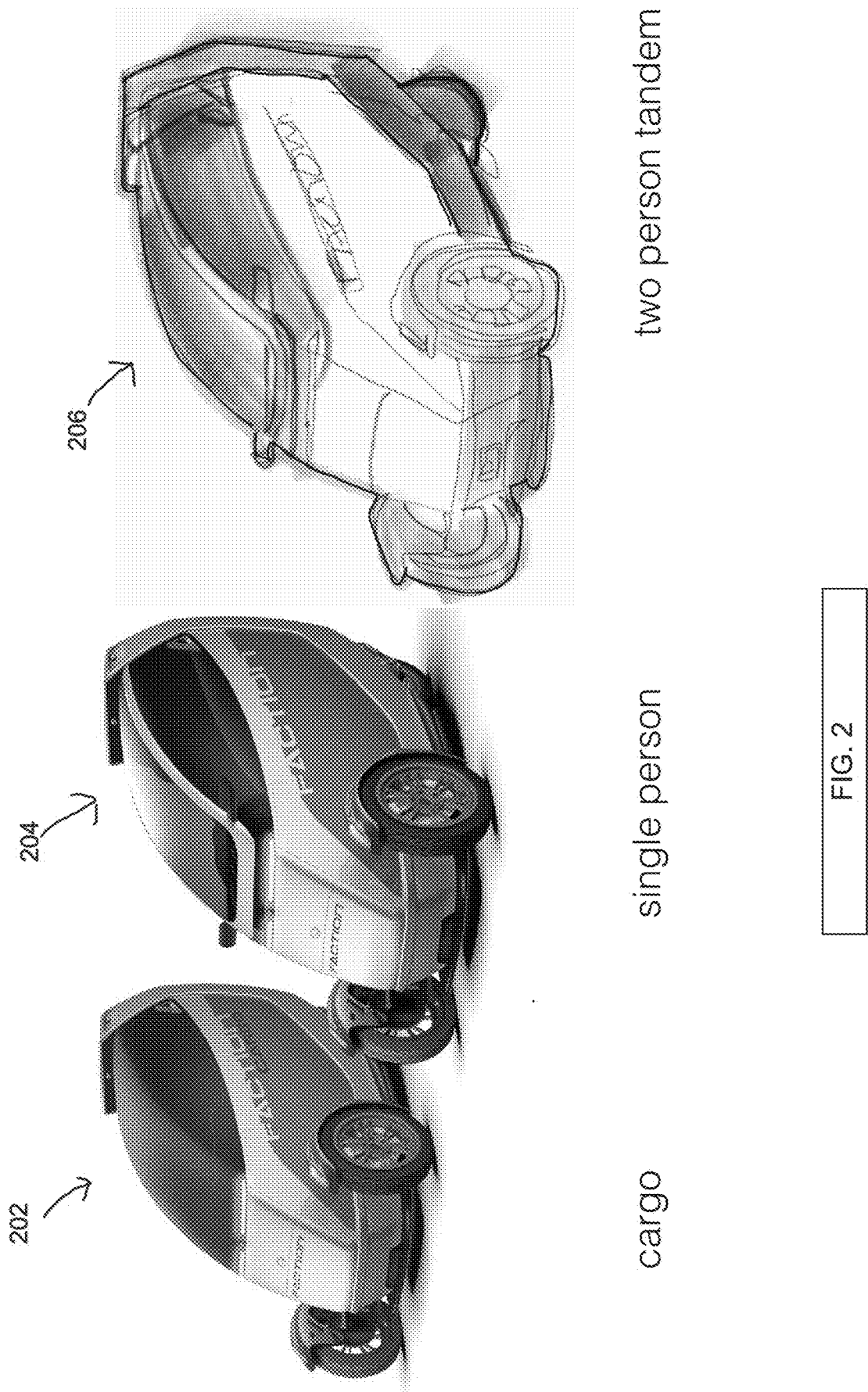
FIG. 2 illustrates example embodiments of the modular vehicle in a cargo configuration and two passenger configurations.

FIG. 2 illustrates example embodiments of the modular vehicle in a cargo configuration 202 configured primarily for transporting cargo, a single passenger configuration 204 for transporting a single person, and a two-person passenger configuration 206 configured for transporting two persons in tandem according to one or more embodiments of the present disclosure. Each of the three modular vehicle configurations 202, 204 206 in FIG. 2 may have a common base platform that includes, at a minimum, the same chassis.

Figure 3:
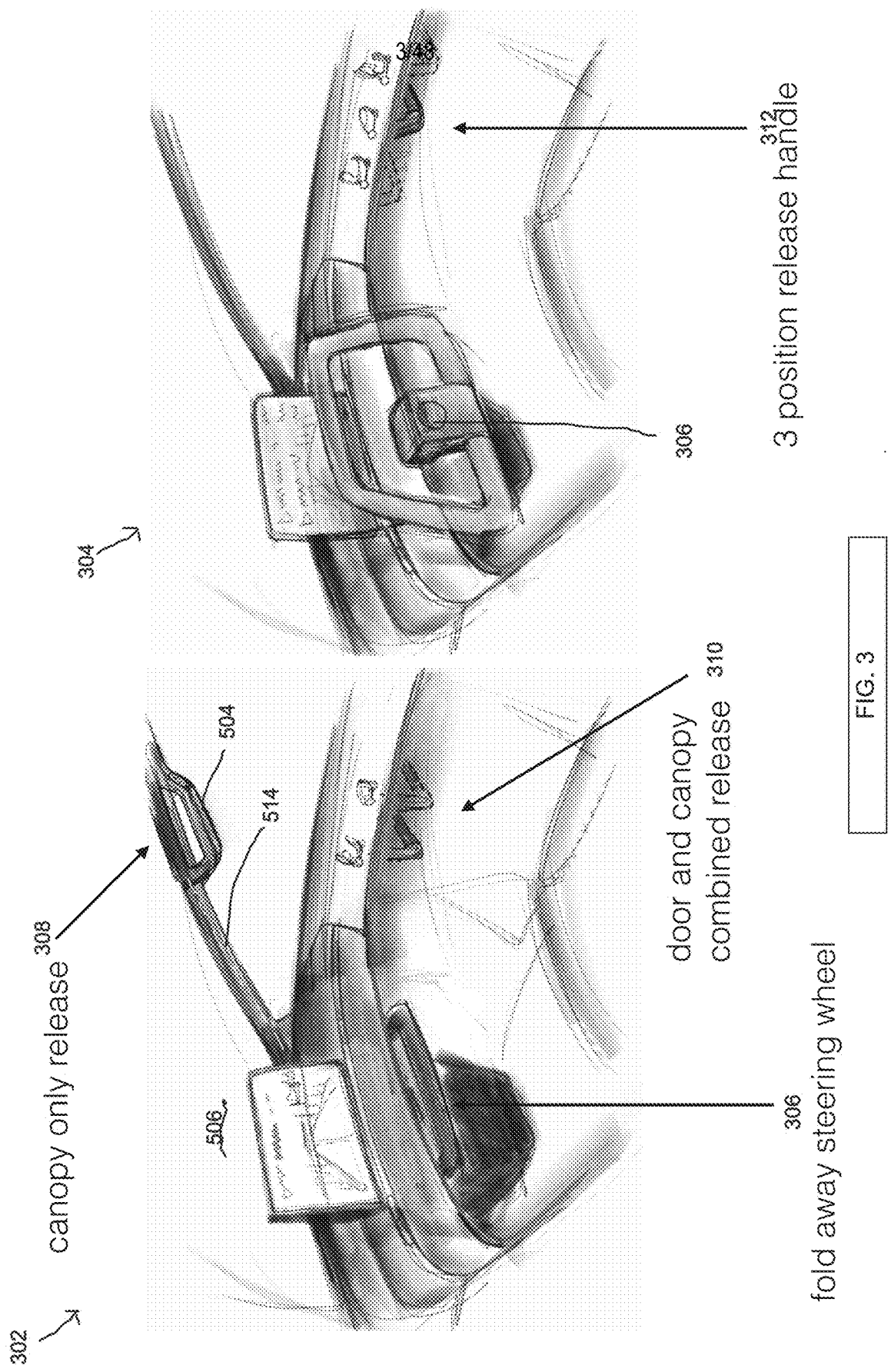
FIG. 3 illustrates example configurations of a cockpit of a modular vehicle.

FIG. 3 illustrates example configurations 302, 304 of a cockpit of a modular vehicle according to one or more embodiments of the present disclosure. The example configurations include a fold away steering wheel module 306 configured to fold away in a cargo configuration 302 and configured to be accessible and usable in a user-assisted driving configuration 304. The user-assisted driving configuration 304 may allow for a passenger to drive the vehicle and/or assist in autonomous driving operations. The user-assisted driving configuration 304 does not necessarily require that the user actually perform driving operations however. FIG. 3 also illustrates various mechanisms that may be used for opening a door and/or a canopy of the modular vehicle, including a canopy only release handle 308, a door and canopy combined release handle 310, and a 3-position release handle 312.

FIG. 4 illustrates an example embodiment of a modular vehicle in which a canopy 402 of the modular vehicle may be separably opened with respect to a door 404 of the modular vehicle according to one or more embodiments of the present disclosure. In particular, the canopy 402 may be opened on its own as illustrated in a view 406, or together with the door 404 as illustrated in a view 408. In some embodiments, the canopy 402 may be rotatably coupled to a frame, shell, or body 410 at a front and/or bottom of the canopy 402.

Figure 5:
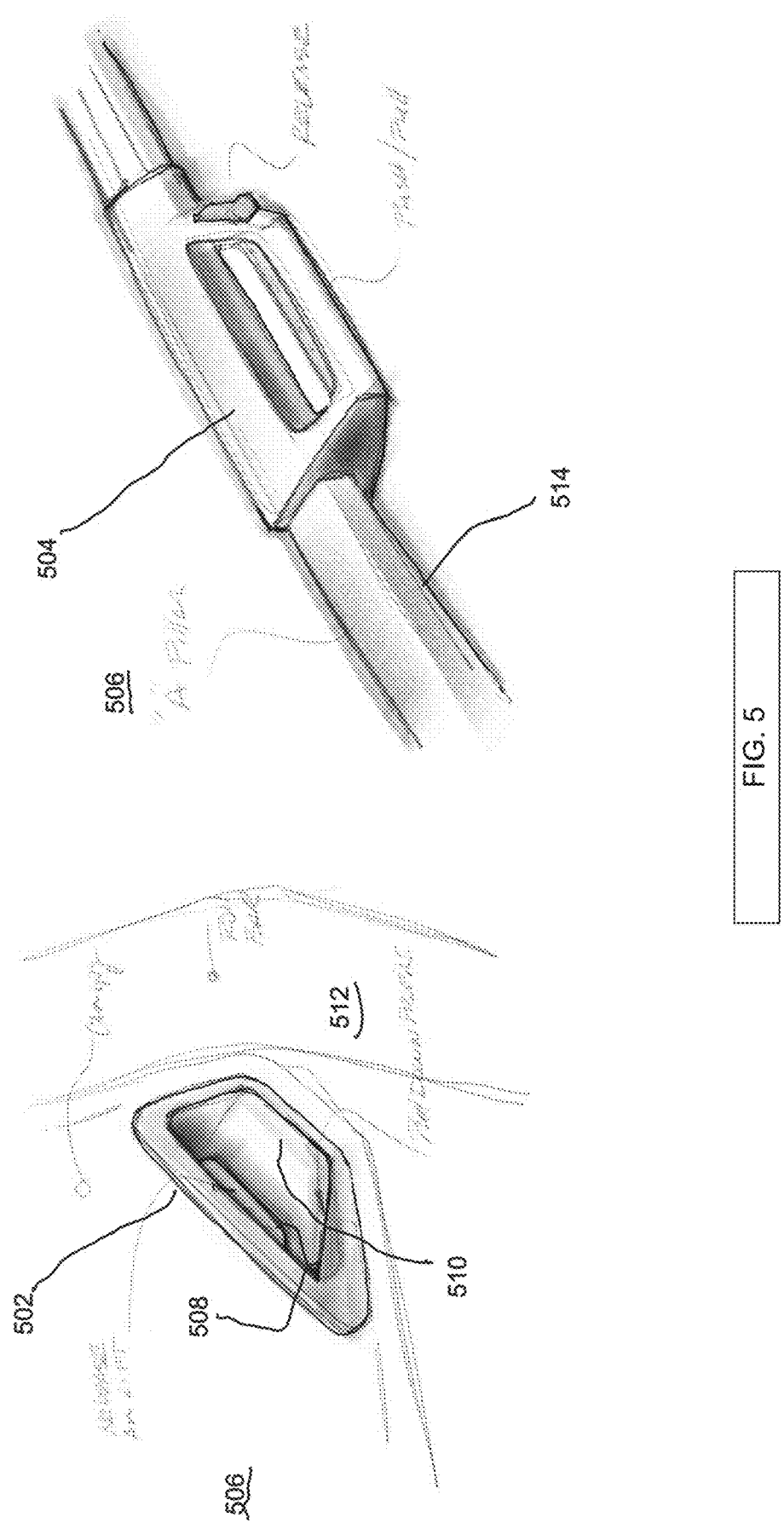
FIG. 5 illustrates some example handle and/or release mechanisms of a canopy and/or door of a modular vehicle.

FIG. 5 illustrates some example handle and/or release mechanisms 502, 504 of a canopy 506 and/or door of a modular vehicle according to one or more embodiments of the present disclosure.

The handle and release mechanism 502 may be located at, e.g., a rear and/or bottom of the canopy 506, as depicted in FIG. 1. The handle and release mechanism 502 may include a latch release 508, a pull-down profile 510, and/or other components or features. The latch release 508 may be operably coupled to a latch that engages with a roll bar 512 and/or other portion of the modular vehicle to secure the canopy 506 closed. Actuating the latch release 508 may disengage the latch from the roll bar 512 to allow the canopy 506 to open. The pull-down profile 510 may be grippable by a user to close the canopy 506.

The handle and release mechanism 504 may be located on, e.g., a structural pillar or frame member 514, as depicted in FIG. 3. The pillar 514 may be incorporated into the canopy 506 and may function as, e.g., a roll bar. The handle and release mechanism 504 may include a latch release 516, a push/pull handle 518, and/or other components or features. The latch release 516 may be operably coupled to a latch that engages with another portion of the modular vehicle to secure the canopy 506 closed. Actuating the latch release 508 may disengage the latch from the modular vehicle to allow the canopy 506 to open. The push/pull handle 518 may grippable by a user to open or close the canopy 506.

Figure 6:
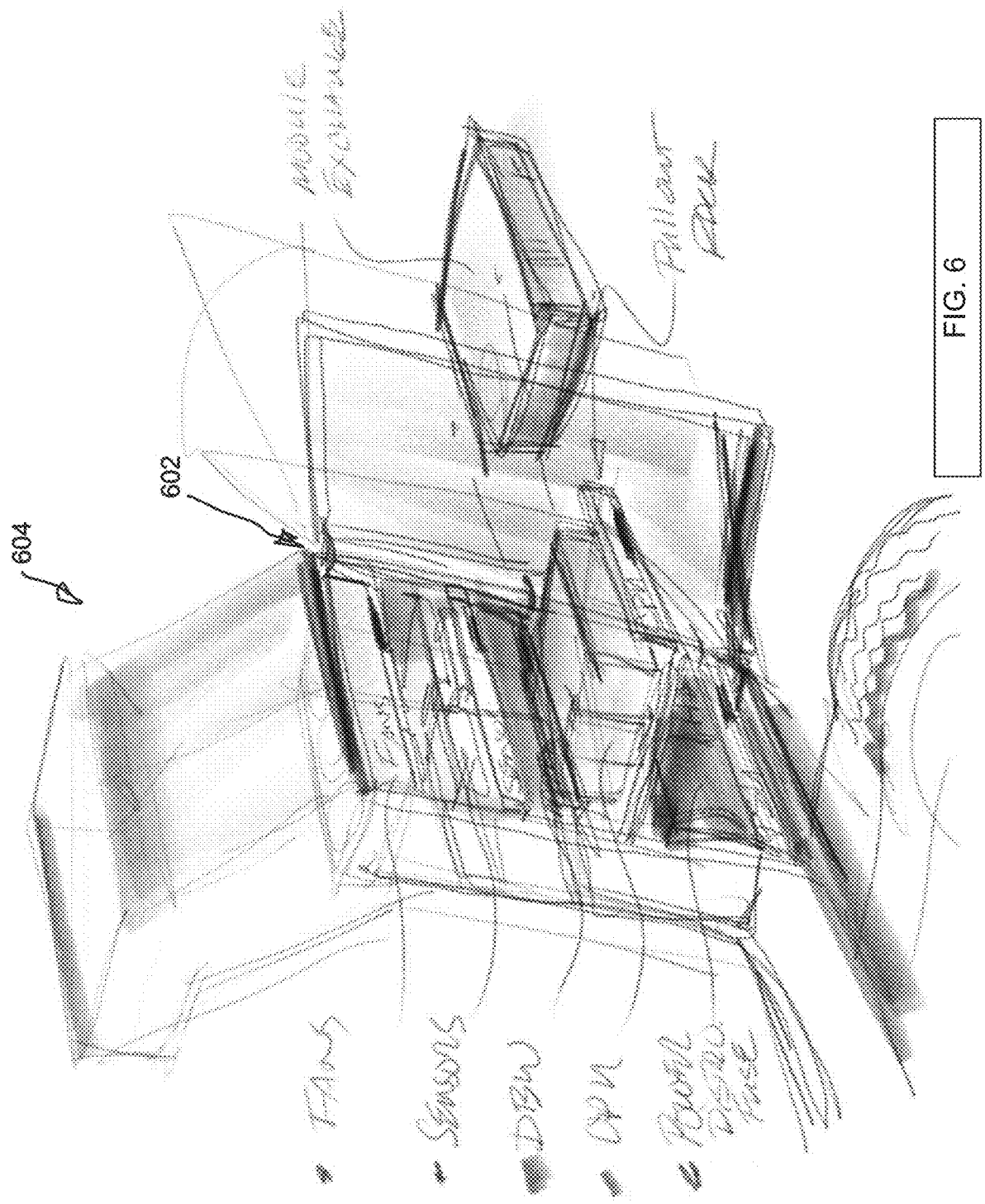
FIG. 6 illustrates an example components exchange and cable management interface of a base platform of a modular vehicle.
Figure 7:
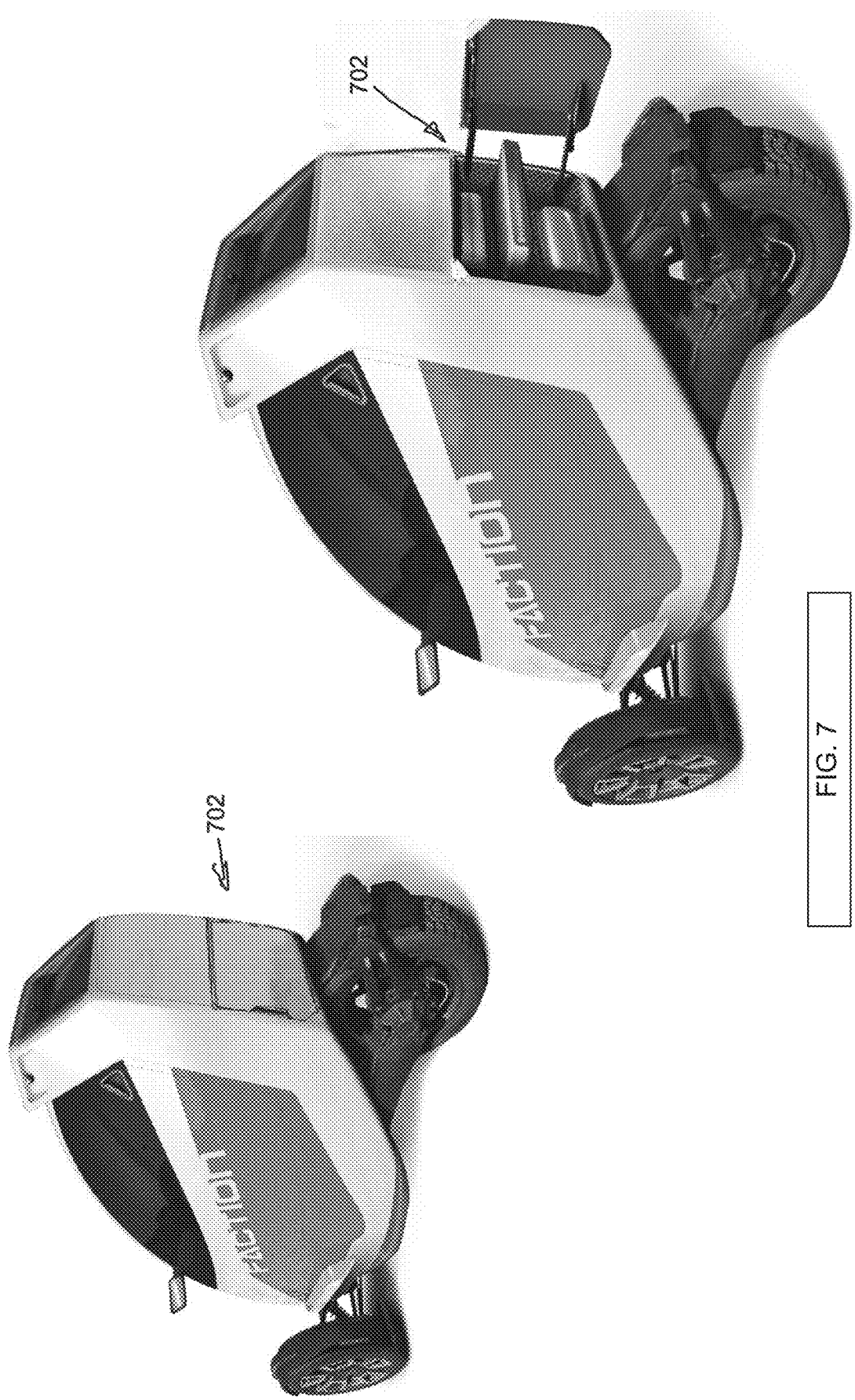
FIGS. 7-9 illustrates other example implementations of the interface of FIG. 6.
Figure 8:
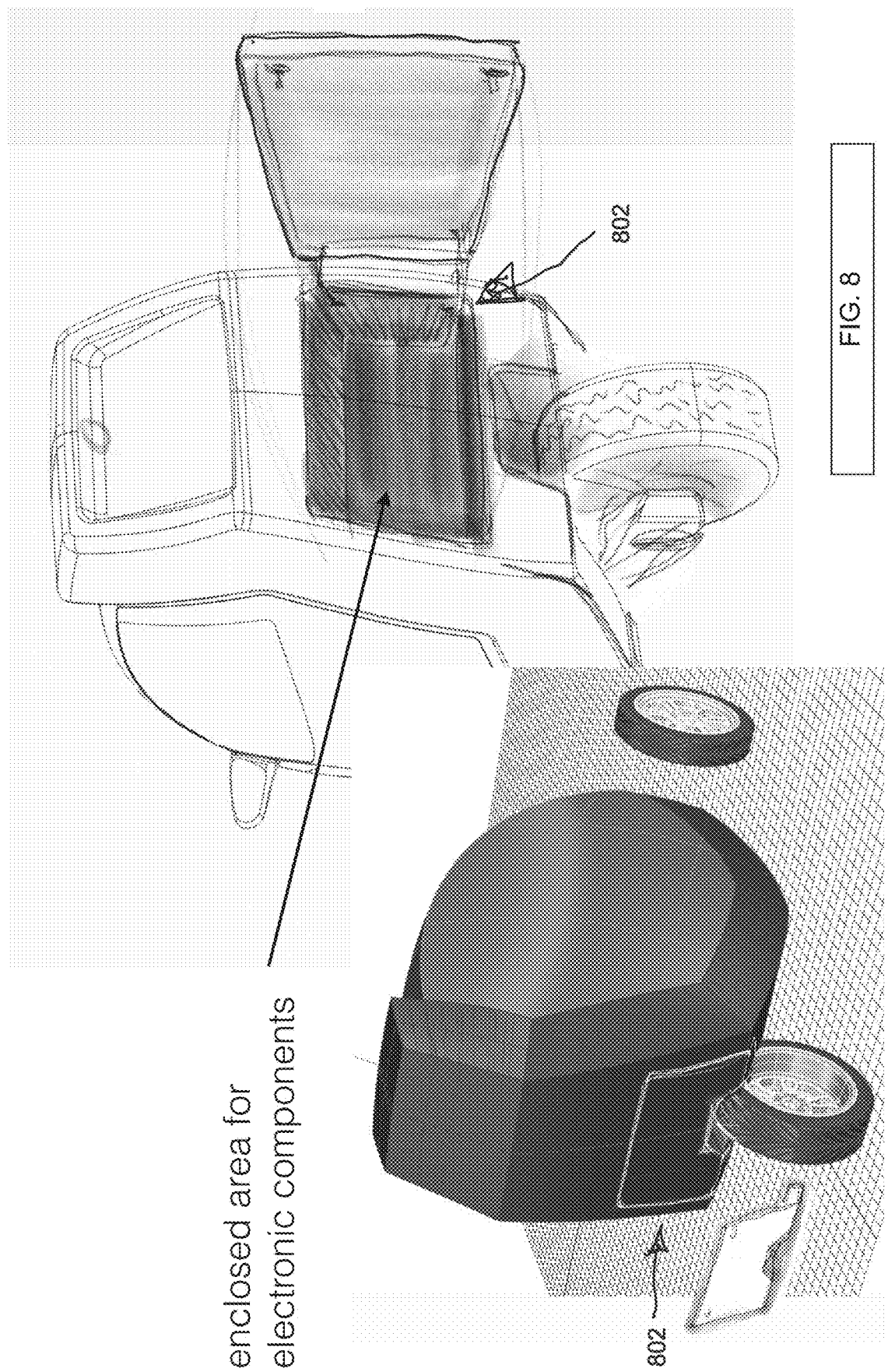
Figure 9:
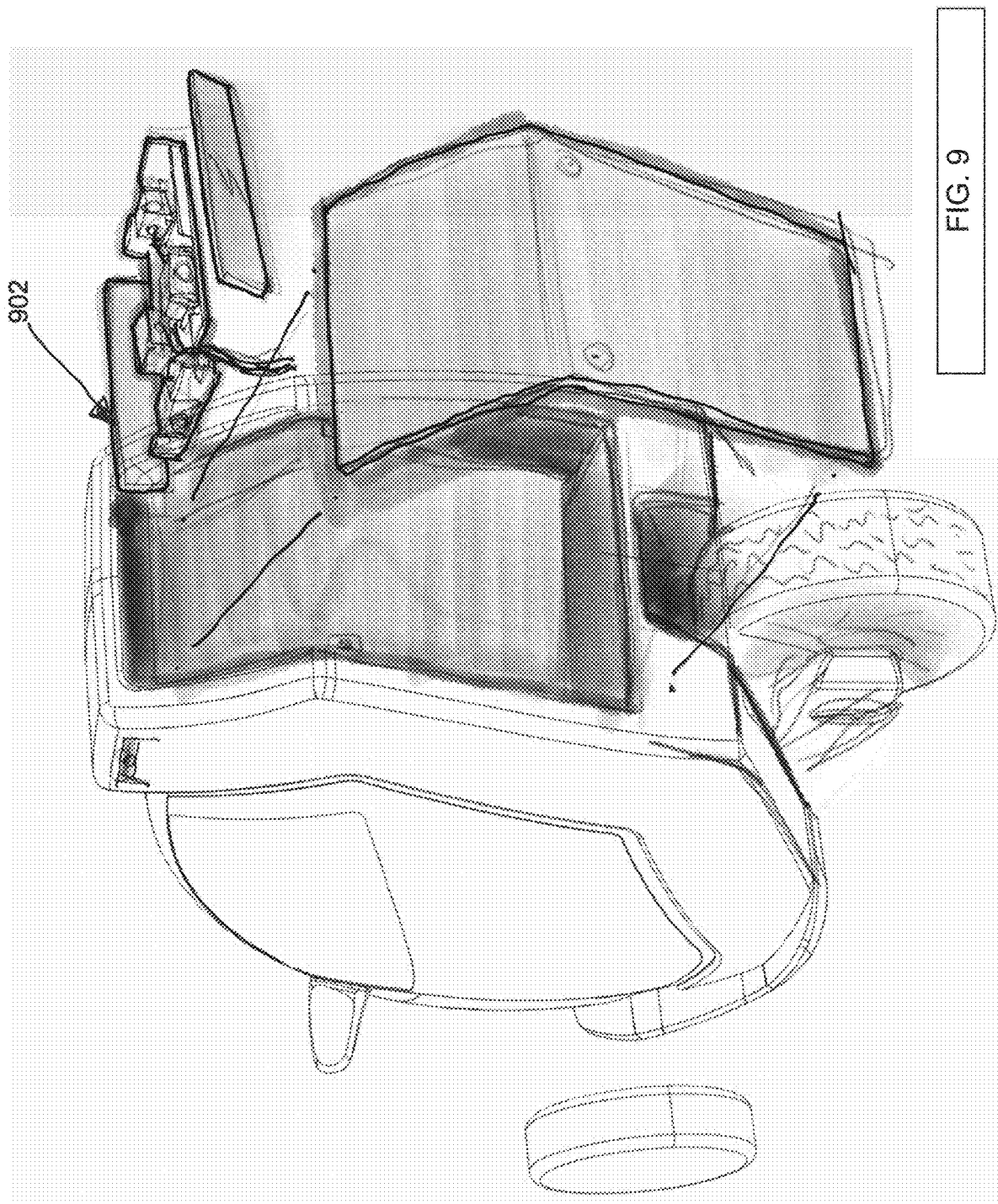

FIG. 6 illustrates an example components exchange and cable management interface 602 of a base platform 604 of a modular vehicle according to one or more embodiments of the present disclosure. The interface 602 may allow for the reception of various modules such as a cooling module (e.g., a fan module), a sensor module, a processing module (e.g., CPU module), a power management module (e.g., a fuse), and an electromechanical vehicle module (e.g., drive by wire). The interface 602 may include one or more racks that may be configured to be pulled out for the removal and/or installation of a corresponding module. FIGS. 7-9 illustrates other example implementations of the interface 602 of FIG. 6 depicted as interfaces 702, 802, 902 according to one or more embodiments of the present disclosure.

Figure 10:
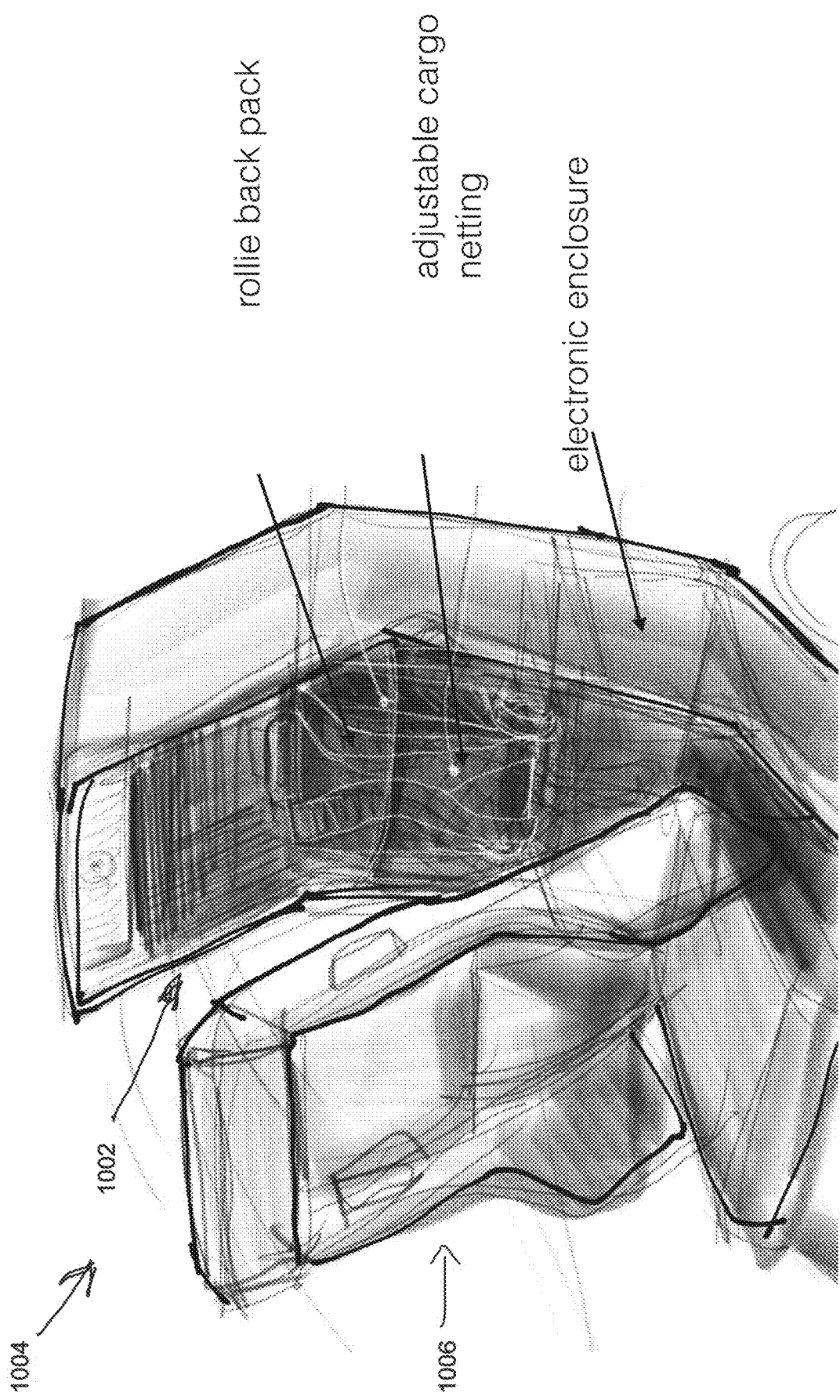
FIG. 10 illustrates an example embodiment that includes a storage compartment that may be used for personal cargo of a passenger in a passenger carrying configuration of a modular vehicle.

FIG. 10 illustrates an example embodiment that includes a storage compartment 1002 that may be used for personal cargo of a passenger in a passenger carrying configuration 1004 of a modular vehicle according to one or more embodiments of the present disclosure. The storage compartment 1002 may be located behind a passenger seat 1006. The passenger seat 1006 is shown in FIG. 10 in a forward-leaning position used to access the storage compartment 1002. A backrest or support of the passenger seat 1006 may lean backward when in use by a passenger. The term passenger as used herein refers to any person within the modular vehicle, whether or not the person assists or overrides autonomous control of the modular vehicle. Thus, a driver also qualifies as a passenger. The storage compartment 1002 may include modular components such as an adjustable cargo net and/or a shelf that may be configured to receive and/or hold cargo such as a backpack.

Figure 12:
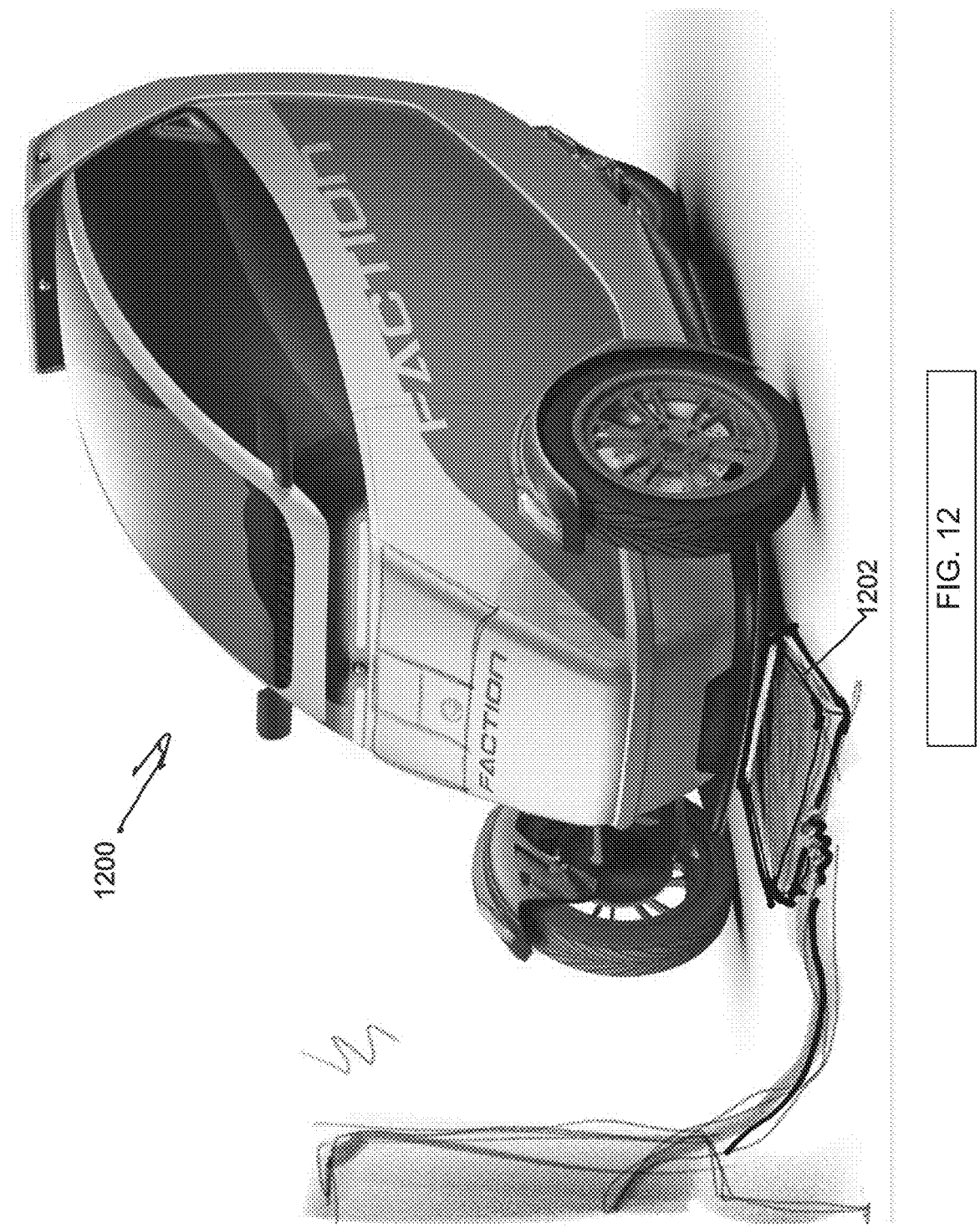

FIGS. 11 and 12 illustrate example battery charging options for a modular vehicle according to one or more embodiments of the present disclosure. In more detail, FIG. 11 illustrates a modular vehicle 1100 with a charge port 1102, the charge port 1102 shown in a closed state on the left side of FIG. 11 and in an open state and plugged in on the right side of FIG. 11. FIG. 12 illustrates a modular vehicle 1200 configured for inductive charging. The modular vehicle 1200 may include an inductive charging circuit on or towards a bottom of the modular vehicle 1200. In operation, the modular vehicle 1200 may be parked with the inductive charging circuit positioned above an inductive charger mat 1202 for charging. With the inductive charging circuit positioned above the inductive charger mat 1202 and the inductive charger mat 1202, electrical input may be transferred from the inductive charger mat 1202 to the inductive charging circuit and from there to a battery of the modular vehicle 1200.

Figure 13:
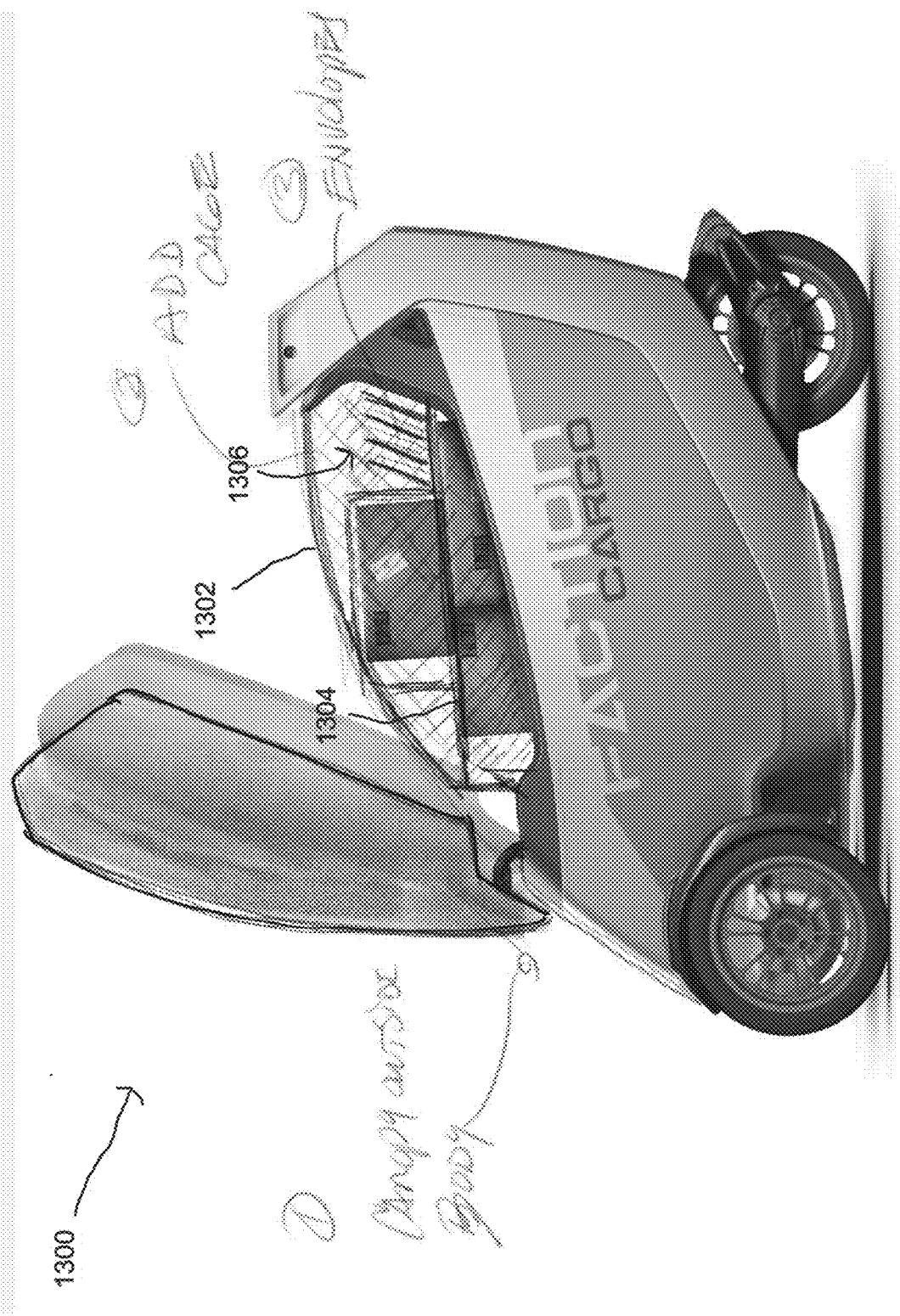
FIG. 13 illustrates example modular components of a modular vehicle in a cargo carrying configuration.

FIG. 13 illustrates example modular components of a modular vehicle 1300 in a cargo carrying configuration according to one or more embodiments of the present disclosure. The example modular components may include a cargo cage 1302 and/or one or more cargo modules such as a shelving system 1304 for packages and/or a folder/envelope carrying system 1306.

Figure 14:
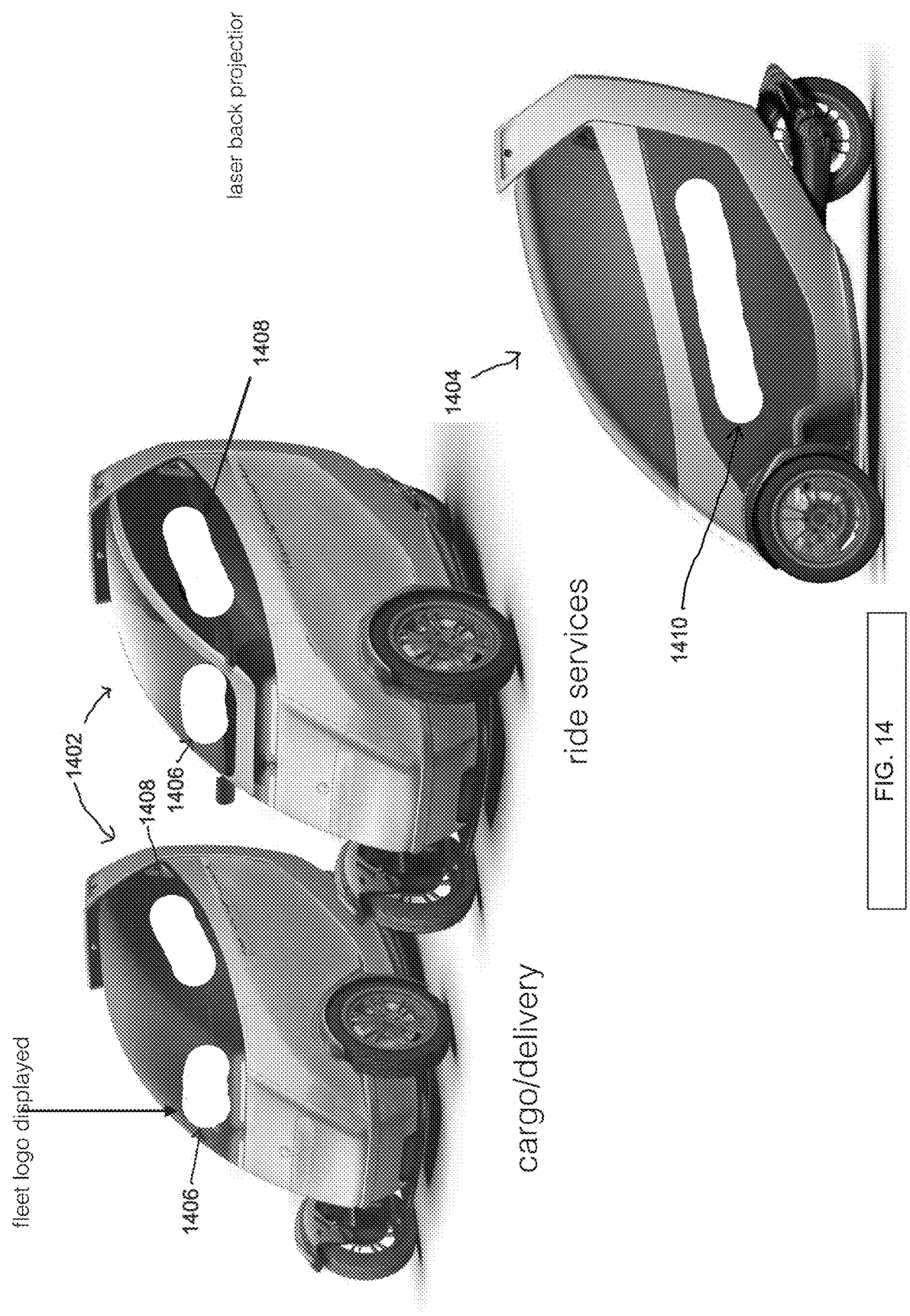
FIG. 14 illustrates example configurations that may allow for identification and branding of modular vehicles when used for fleet operations.

FIG. 14 illustrates example configurations 1402, 1404 that may allow for identification and branding of modular vehicles when used for fleet operations, according to one or more embodiments of the present disclosure. For example, a name or logo of the fleet operator or other entity may be placed on a front of the modular vehicle's canopy at a location 1406, on a side of the canopy at a location 1408, on a side of a door of the modular vehicle at a location 1410, or the like or any combination thereof.

Figure 15:
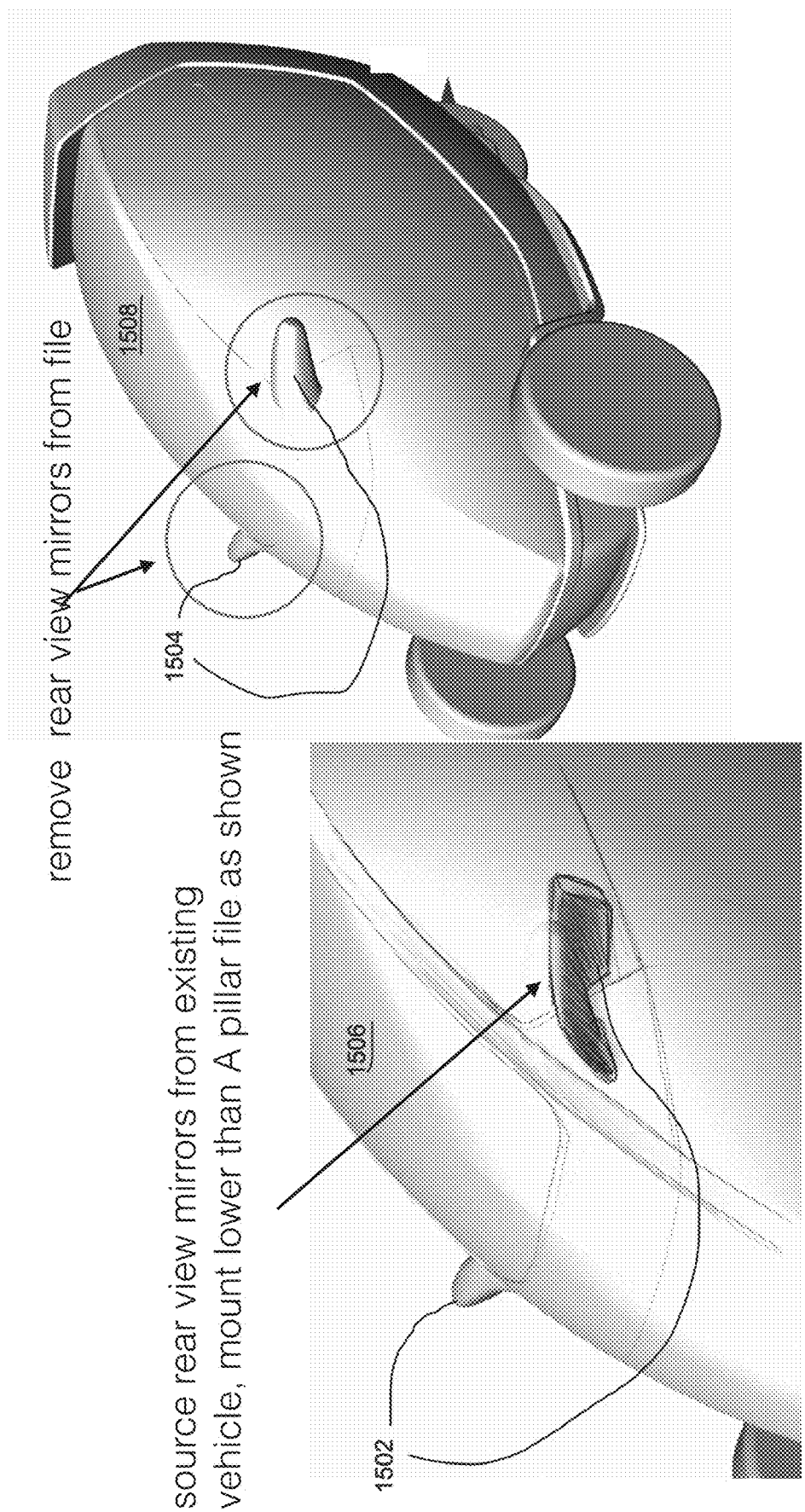
FIGS. 15 and 16 illustrate example configurations of a front of a modular vehicle.
Figure 16:
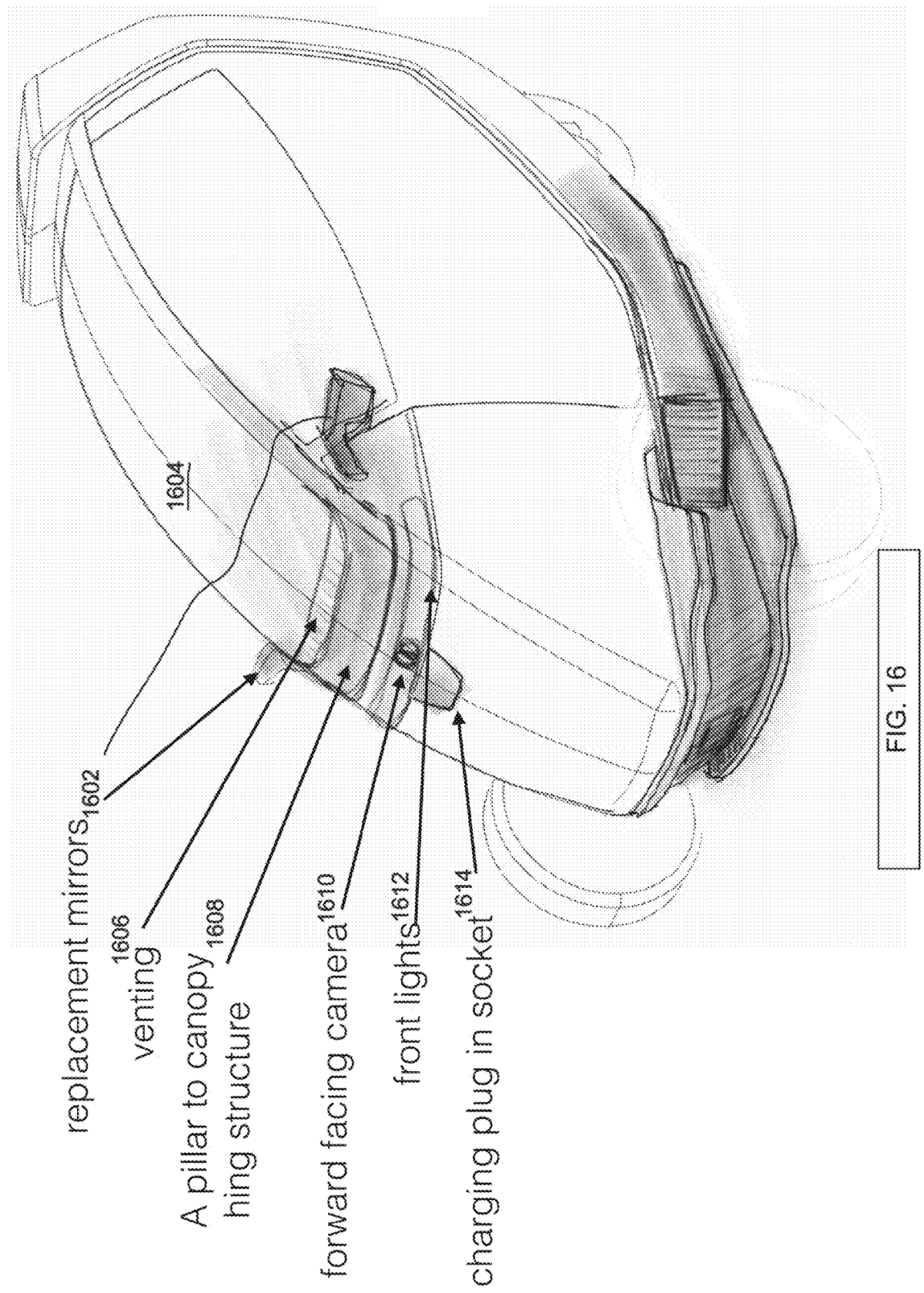

FIGS. 15 and 16 illustrate example configurations of a front of a modular vehicle according to one or more embodiments of the present disclosure. FIG. 15 illustrates example side view mirrors 1502, 1504 that may be included in a modular vehicle 1500A. The side view mirrors 1502 are provided below and separate from a canopy 1506 of the modular vehicle 1500A. The side view mirrors 1504 are coupled to a canopy 1508 of the modular vehicle 1500B.

FIG. 16 illustrates a modular vehicle 1600 that includes side view mirrors 1602 that are separate from a canopy 1604 of the modular vehicle 1600. A vent 1606 is formed in the canopy 1604. A hinge structure 1608 rotatably couples the canopy 1604 (in this example a front bottom of the canopy 1604) to the modular vehicle 1600. The modular vehicle 1600 additionally includes a forward facing camera 1610, front lights 1612, and a charge port 1614.

Figure 17:
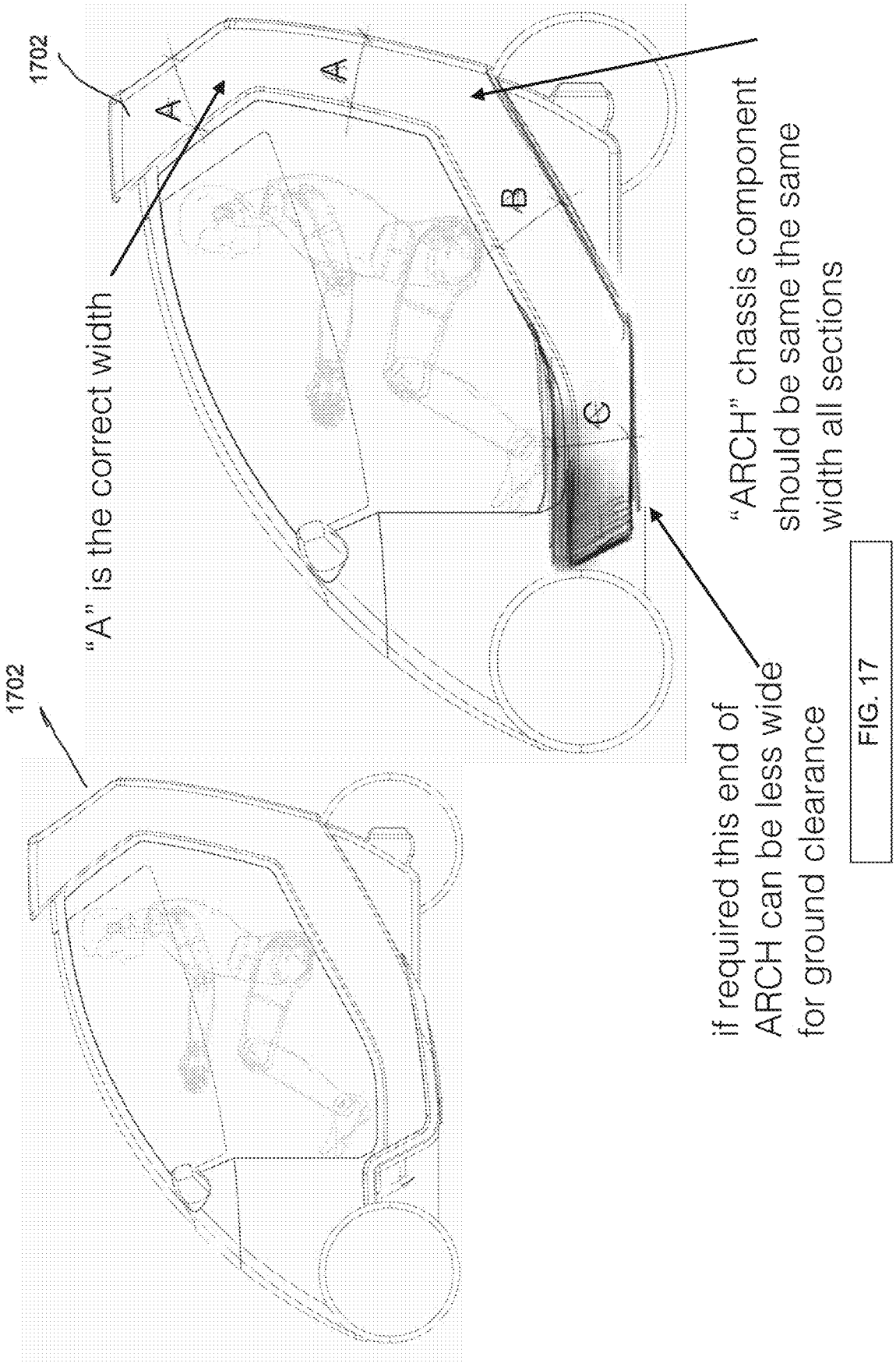

FIGS. 17 and 18 illustrate an example profile of a frame 1702, 1802 of a modular vehicle, according to one or more embodiments of the present disclosure. The frame 1702, 1802 may have a "C" type shape that may help provide structural and/or aesthetic support for the modular vehicle.

Figure 19:
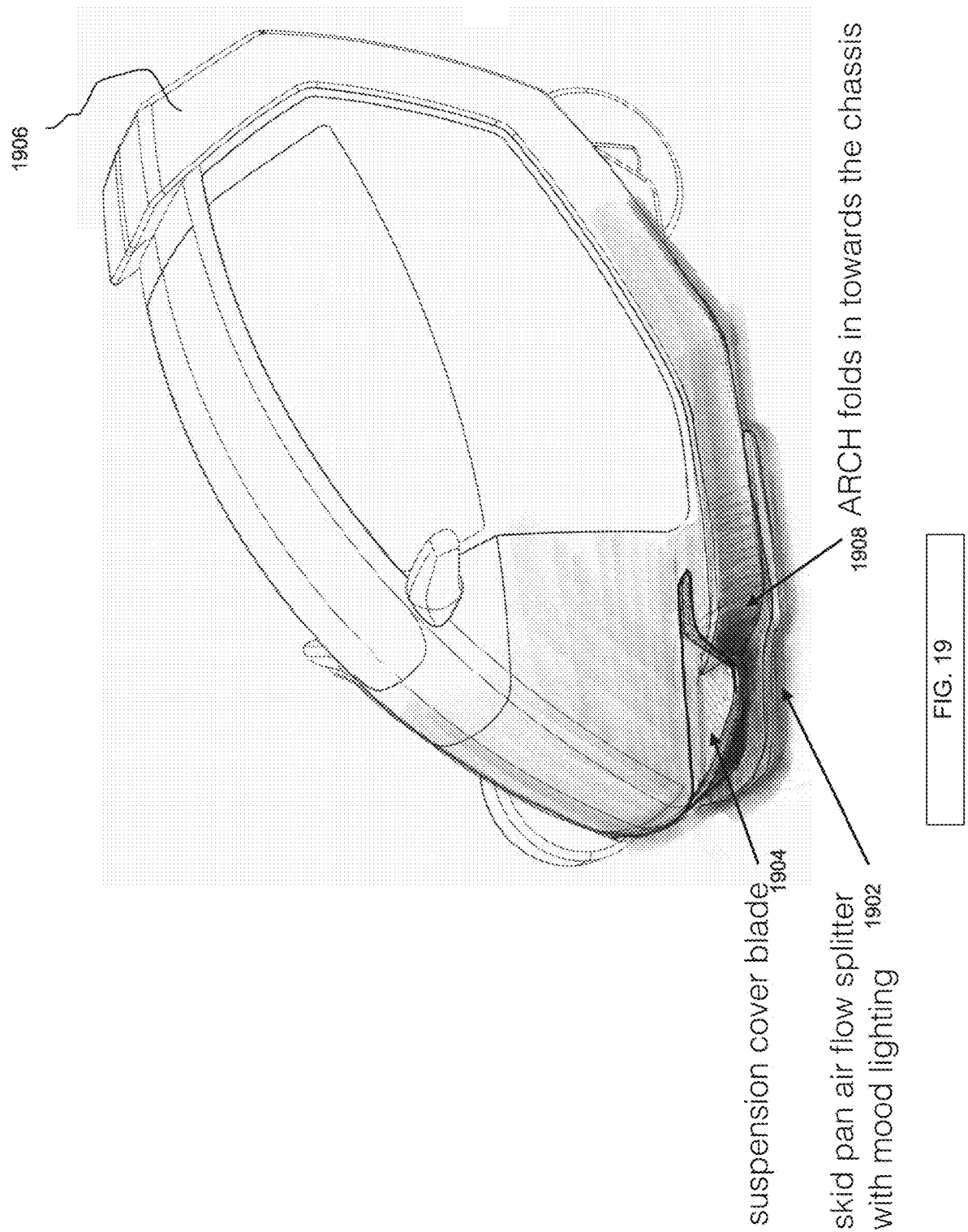
FIG. 19 illustrates examples of a skid pan and a suspension blade that may be used with a modular vehicle.

FIG. 19 illustrates examples of a skid pan 1902 and a suspension blade 1904 that may be used with a modular vehicle, according to one or more embodiments of the present disclosure. The skid pan 1902 may protect an underside of the modular vehicle. The suspension blade 1904 may protect an upper side of a suspension of the modular vehicle. The modular vehicle of FIG. 19 further includes a frame 1906 that may include, be included in, and/or correspond to the frame 1702, 1802 of FIGS. 17-18. In some embodiments, the frame 1906 turns or curves inward, e.g., at 1908, where the frame 1906 attaches to a chassis of the modular vehicle.

Figure 20:
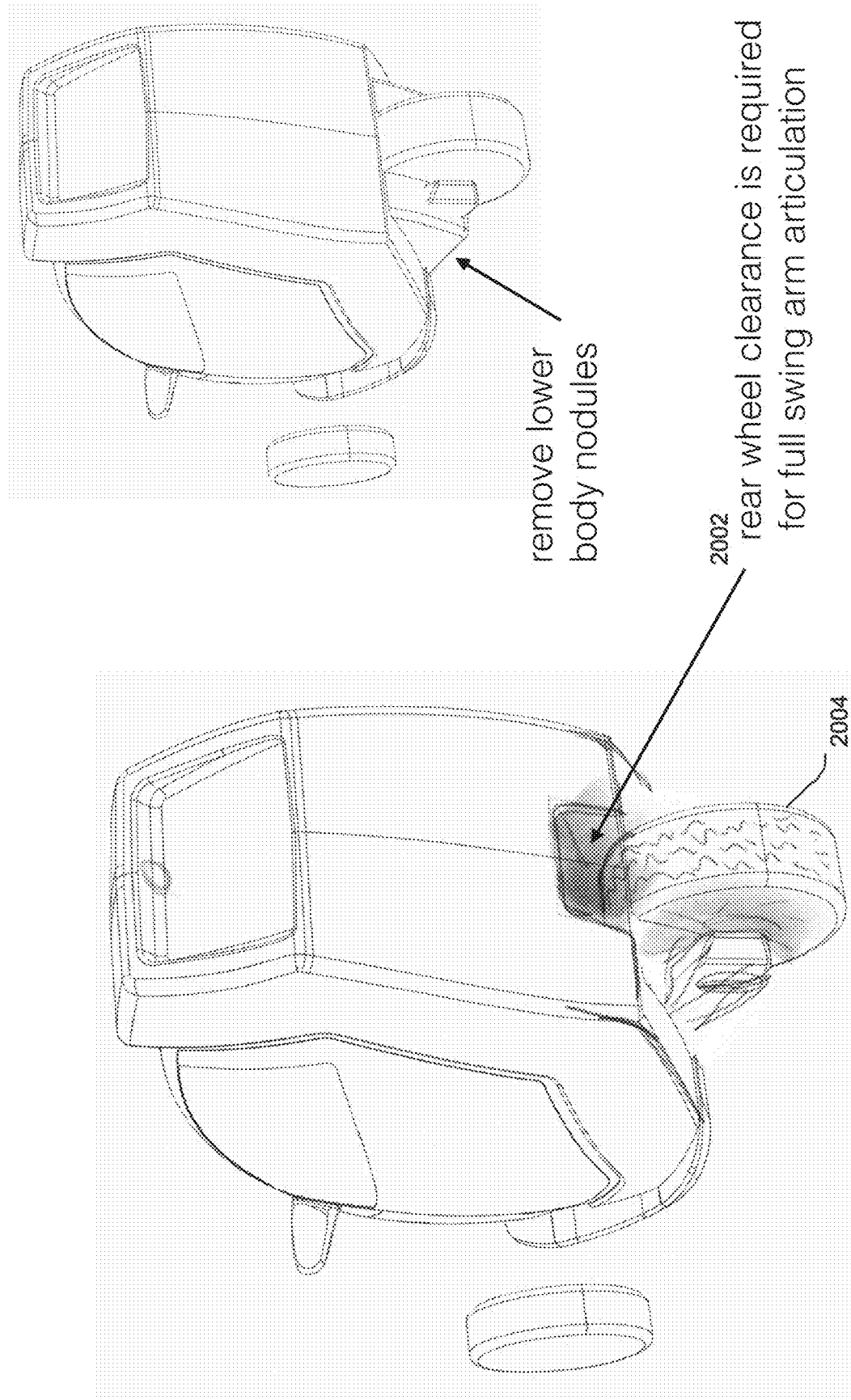
FIG. 20 illustrates an example configuration to allow for rear wheel suspension travel of a modular vehicle.

FIG. 20 illustrates an example configuration to allow for rear wheel suspension travel of a modular vehicle, according to one or more embodiments of the present disclosure. As illustrated, the modular vehicle may define a channel 2002 arranged to accommodate relative movement between a rear wheel 2004 of the modular vehicle as a suspension between the rear wheel 2004 and a chassis or frame of the modular vehicle compresses and expands.

Figure 21:
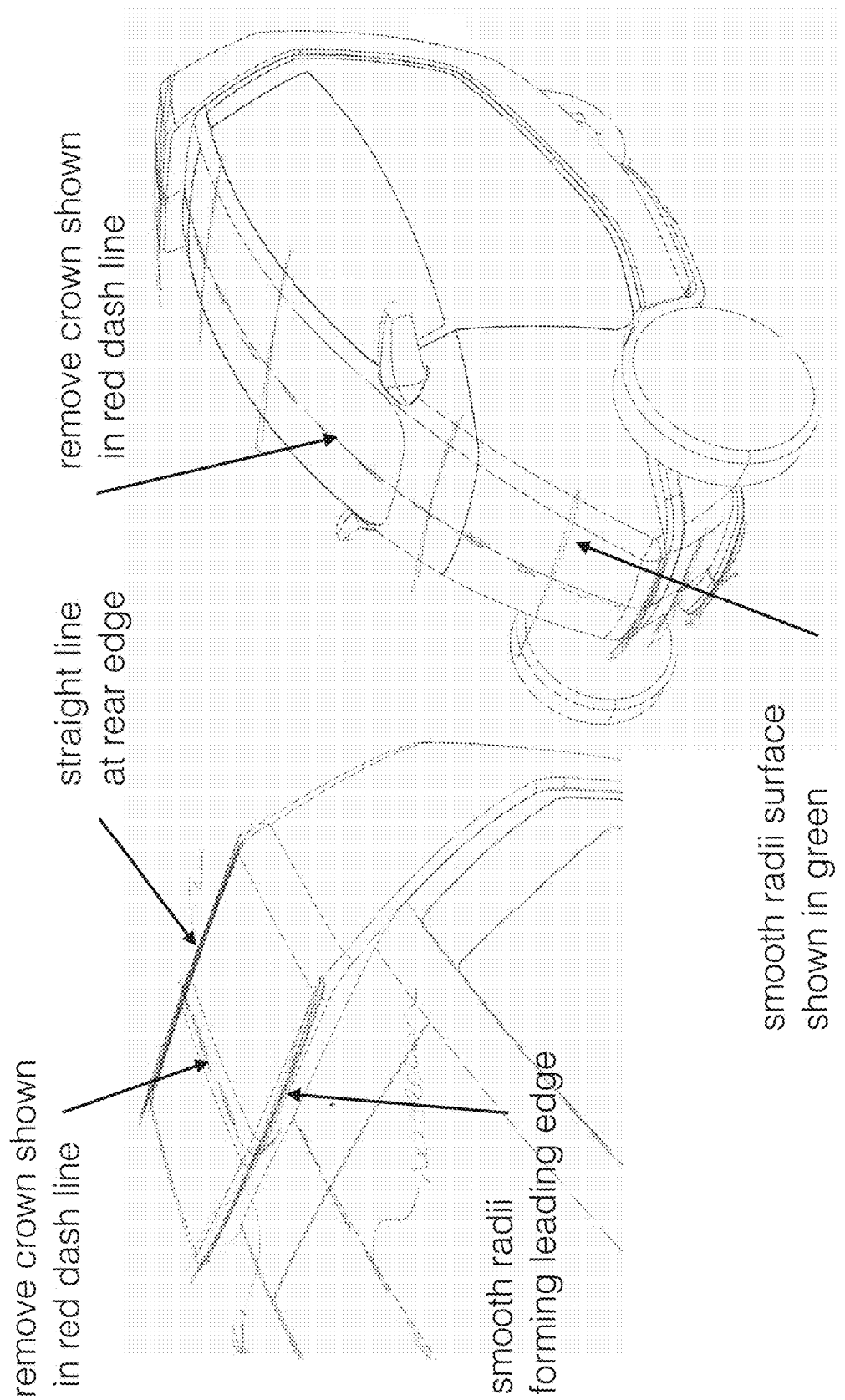
FIG. 21 illustrates an example configuration of a crown surface of a modular vehicle.

FIG. 21 illustrates an example configuration of a crown surface of a modular vehicle, according to one or more embodiments of the present disclosure.

Figure 22:
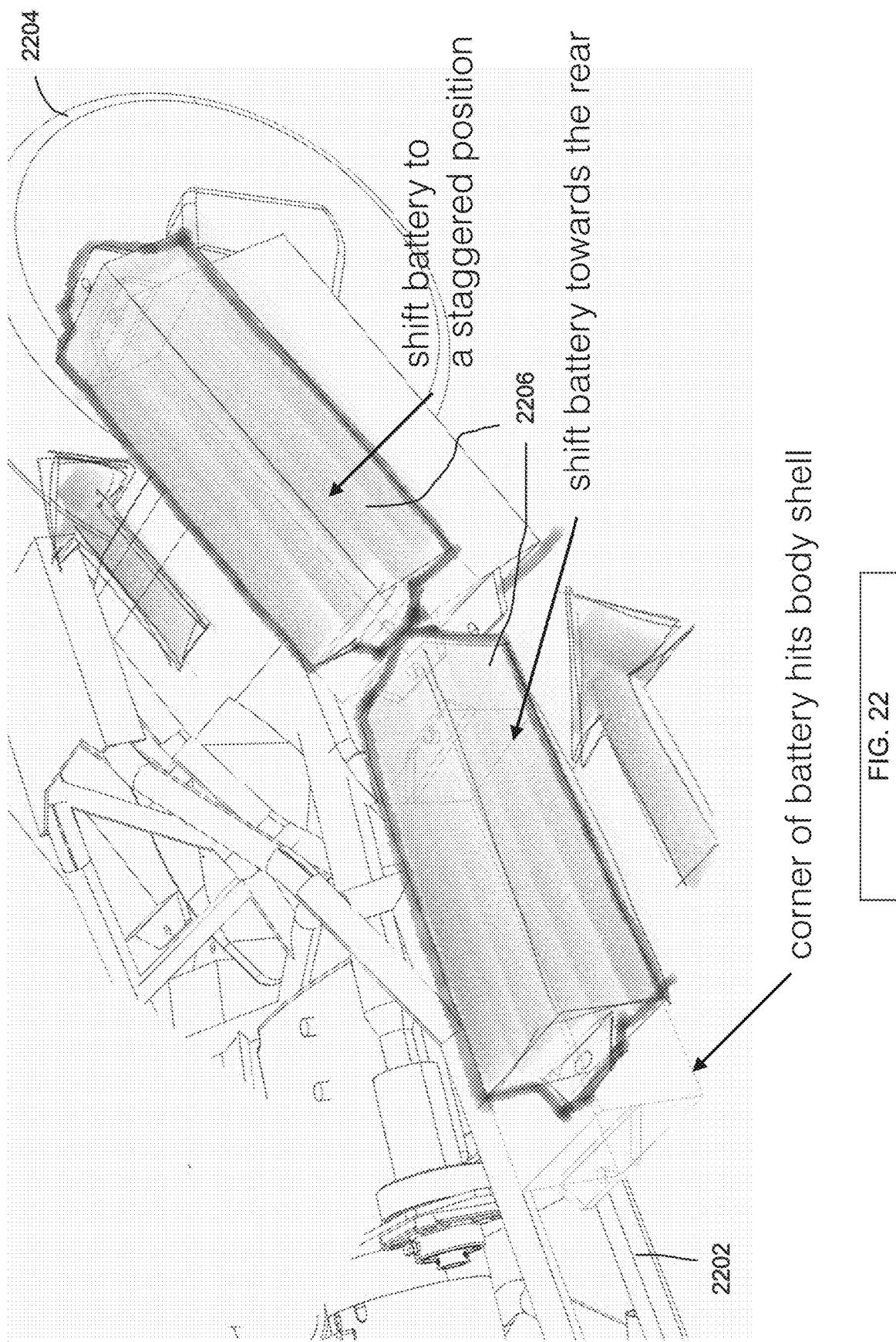
FIG. 22 illustrates an example of battery placement within a modular vehicle.

FIG. 22 illustrates an example of battery placement within a modular vehicle, according to one or more embodiments of the present disclosure. In FIG. 22, the modular vehicle includes a chassis 2202 attached to a rear wheel 2204, the front wheels generally being to the left of the visible portion of the modular vehicle in FIG. 22. In FIG. 22, a frame (see, e.g., 1702, 1802, 1906 in FIGS. 17-19) of the modular vehicle is not shown so that the chassis 2202 and placement of one or more batteries 2206 may be visible.

Figure 23:
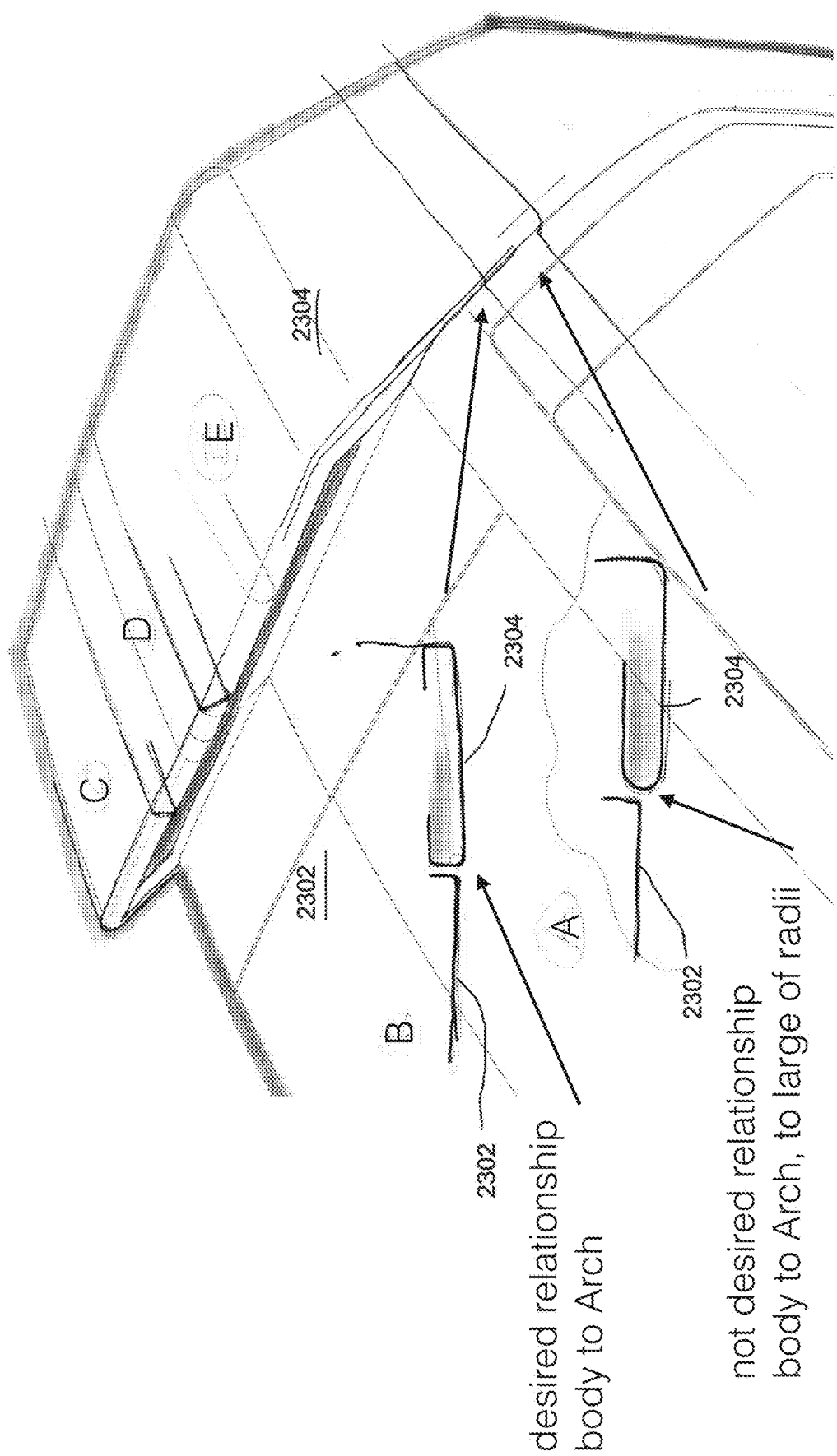
FIG. 23 illustrates two potential configurations between a door or canopy of a modular vehicle and an upper portion of a frame of the modular vehicle.

FIG. 23 illustrates two potential configurations A, B between door or canopy 2302 of a modular vehicle and an upper portion of a frame 2304 of the modular vehicle, according to one or more embodiments of the present disclosure. In a first configuration A, the frame 2304 has a thicker and/or more rounded cross-section such that outer surfaces of the frame 2304 and door or canopy 2302 are offset from each other. In a second configuration B, the frame 2304 has a thinner and/or less rounded cross-section and is much more flush with the door or canopy 2302 than in the first configuration A.

Figure 24:
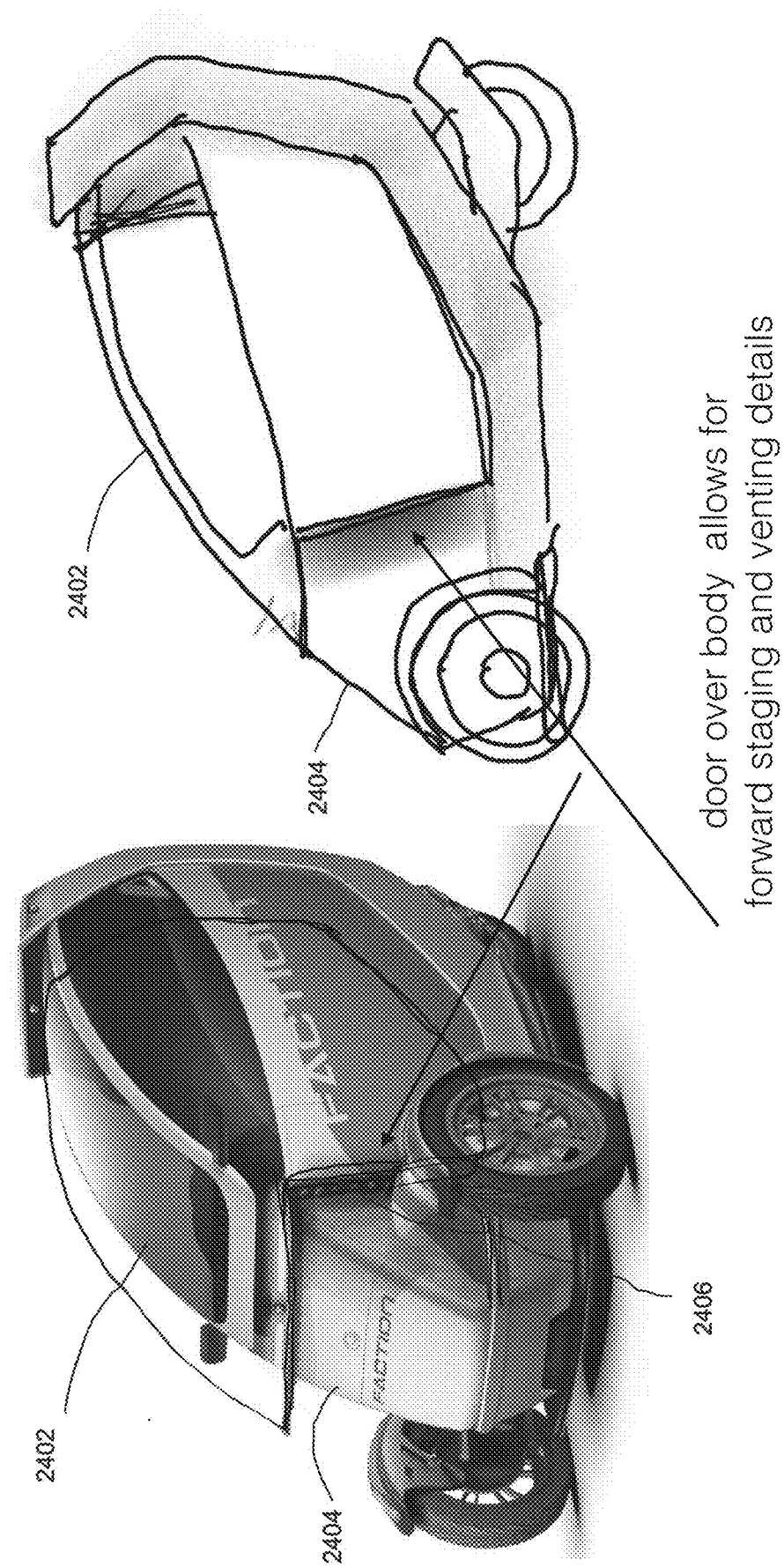

FIGS. 24-25 illustrate an example configuration of a door and/or canopy 2402 of a modular vehicle, according to one or more embodiments of the present disclosure. In FIGS. 24-25, from a closed state (FIG. 24 left and right, FIG. 25 left), the door and/or canopy 2402 is configured to slide or otherwise move forward a distance (FIG. 25 right) before rotating upward (relative to the modular vehicle) to open (FIG. 25 right outline 2408). In such a configuration, the door and/or canopy 2402 may be over or outside of a body 2404 of the modular vehicle to permit forward staging and venting 2406 of the modular vehicle. In FIG. 25, an outline 2502 shows an approximate outline of the door and/or canopy 2402 in an open state after first moving forward and then rotating upward away from the body 2404.

Figure 27:
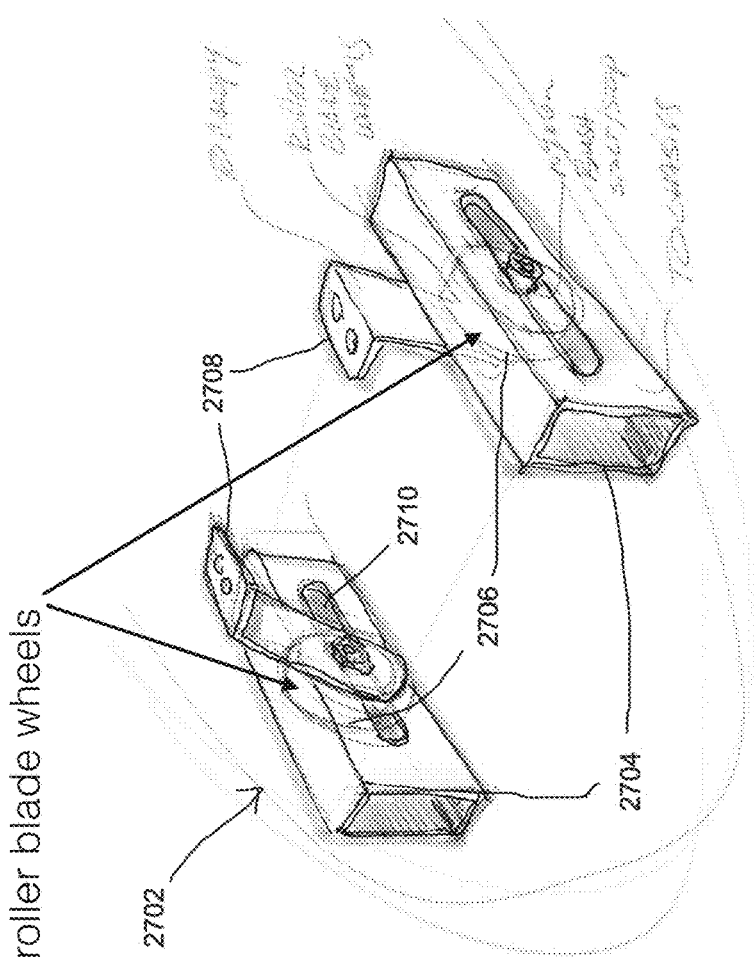
Figure 26:
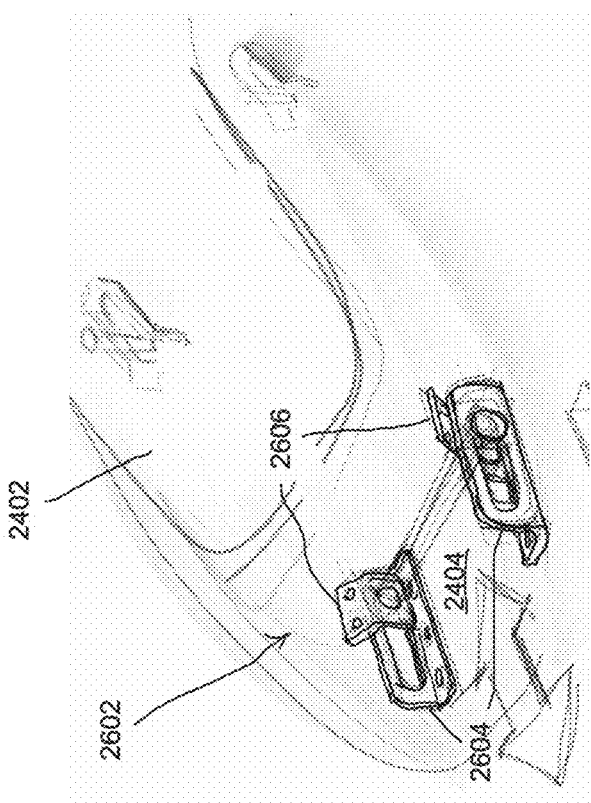

FIGS. 26-28 illustrate example first, second, and third 2-stage hinge mechanisms 2602, 2702, 2802 that may be used to accommodate the lateral and rotational movement of the door and/or canopy 2402 of the modular vehicle of FIGS. 24-25, according to one or more embodiments of the present disclosure.

The first 2-stage hinge mechanism 2602 of FIG. 26 may include two tracks 2604 mounted to a body or frame 2404 (or chassis) of the modular vehicle and two support mounts 2606 mounted to the door or canopy 2402. The door or canopy 2402 is depicted as transparent in FIG. 26 to make the tracks 2604 and support mounts 2606 visible, although the door or canopy 2402 mayor may not be transparent in practice. The support mounts 2606 are slidably coupled to the tracks 2604 to permit the door or canopy 2402 to slide forward and backward relative to the tracks 2604 and the body or frame 2404 (or chassis). The support mounts 2606 are also rotatably coupled to the tracks 2604 to allow the support mounts 2606 and the door or canopy 2402 to rotate relative to the tracks 2604 and the body or frame 2404 (or chassis). In some embodiments, the support mounts 2606 are rotatable relative to the tracks 2604 in only some positions of the support mounts 2606 relative to the tracks 2604. In particular, and as illustrated, the support mounts 2606 may flare outward and over the tracks 2604. In any position of the support mounts 2606 relative to the tracks 2604 except the forwardmost relative position, the outward flare of the support mounts 2606 may essentially engage a top of the tracks 2604 to prevent the support mounts 2606, and thus the door or canopy 2402, from rotating relative to the tracks 2604. However, when the support mounts 2606 are in the forwardmost position, the outward flare of the support mounts may clear the tracks 2604 when the support mounts 2606 and door or canopy 2402 are rotated upward and away (i.e., counterclockwise in FIG. 26) from the body or frame 2404.

The second 2-stage hinge mechanism 2702 of FIG. 27 may include two tracks 2704, two wheels 2706 sized to fit within the tracks, and two support mounts 2708 coupled to the door or canopy of the modular vehicle. The tracks 2704 are mounted to the body, frame, and/or chassis of the modular vehicle and are hollow. The hollow interior of each of the tracks 2704 may be large enough to permit the wheels 2706 to roll within the corresponding hollow interior on a bottom wall or floor of the hollow interior without contacting a top wall or ceiling of the hollow interior. A slot 2710 is defined in the inward facing wall of each of the tracks 2704 and extends longitudinally; only one of the slots 2710 is visible in FIG. 27. The wheels 2706 inside the tracks 2704 are rotatably coupled to the support mounts 2708 outside the tracks 2704 via one or more connectors and/or fasteners (e.g., axle, bolt, etc.) that extend through the corresponding slot 2710 and corresponding components (e.g., nuts, washers, etc.). The slots 2710 permit the wheels 2706 and the support mounts 2708 to move longitudinally relative to the tracks 2704 and the body, frame, and/or chassis of the modular vehicle within a predefined range while preventing the wheels 2706 from moving beyond this range (e.g., beyond ends of the tracks 2704). The rotatable connections between the support mounts 2708 and the wheels 2706 permit the support mounts 2708, and thereby the door or canopy of the modular vehicle, to rotate relative to the tracks 2704 and the body, frame, and/or chassis of the modular vehicle.

The third 2-stage hinge mechanism 2802 of FIG. 28 may include two tracks 2804 and two heavy duty drawer sliding rails 2806 that may be slidably attached to the two tracks 2804. The tracks 2804 may be coupled to the body, frame, and/or chassis of the modular vehicle. The third 2-stage hinge mechanism 2802 of FIG. 28 may further include two support mounts 2808 rotatably coupled, with or without a support bar 2810, to the rails 2806. The support mounts 2808 may be coupled to the door or canopy of the modular vehicle. In operation, the slidable connection between the tracks 2804 and the rails 2806 may permit the door or canopy to move longitudinally relative to the body, frame, and/or chassis, while the rotatable connection between the rails 2806 and the support mounts 2808 may permit the door or canopy to rotate relative to the body, frame, and/or chassis.

Figure 29:
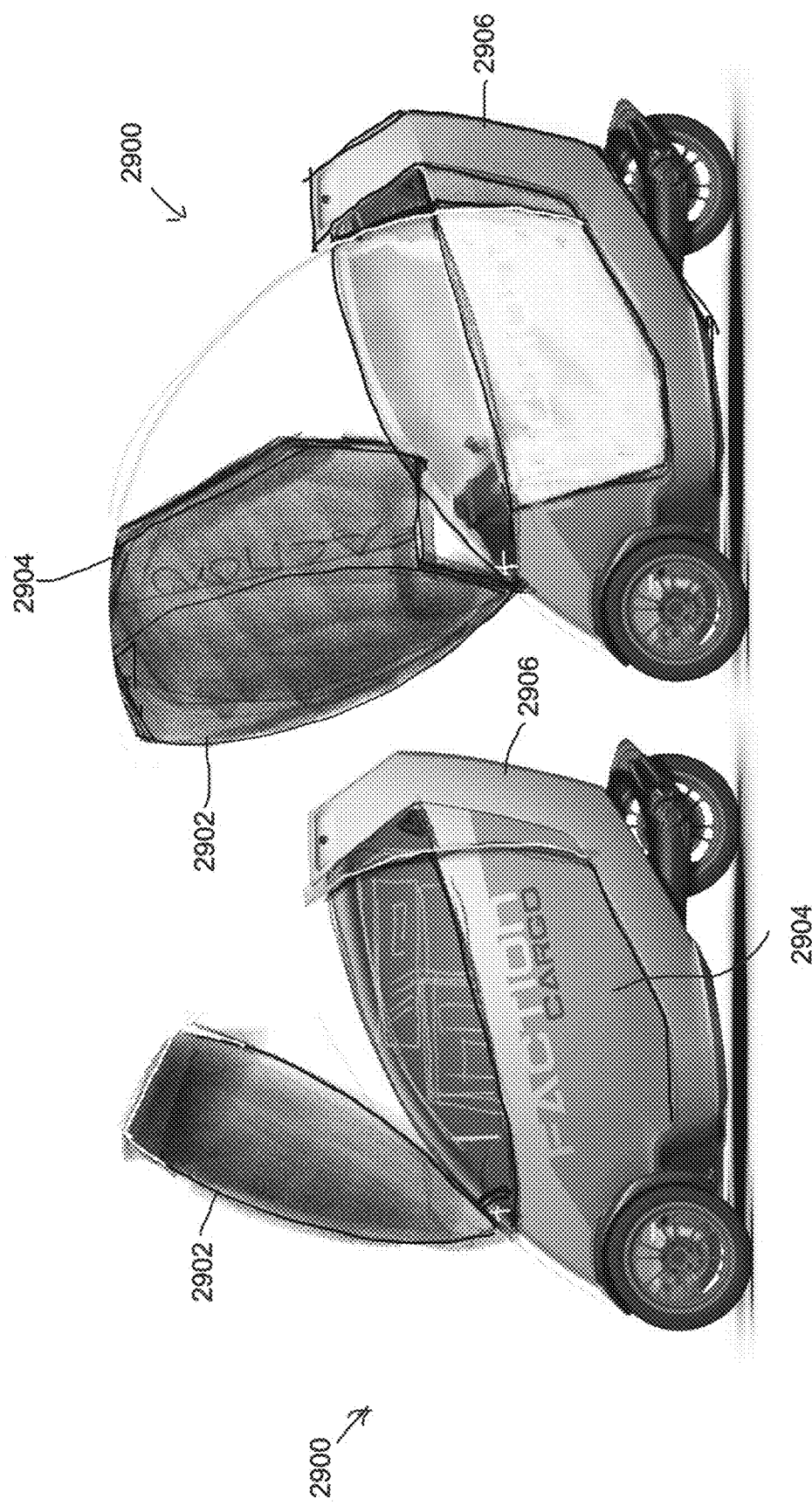
FIG. 29 illustrates another example configuration of a modular vehicle with a single-stage rotatable canopy and door.

FIG. 29 illustrates another example configuration of a modular vehicle 2900 with a single-stage rotatable canopy 2902 and door 2904, according to one or more embodiments of the present disclosure. In the example of FIG. 29, each of the canopy 2902 and door 2904 is rotatably coupled to a body, frame, and/or chassis 2906 of the modular vehicle 2900. The canopy 2902 may be opened independent of the door 2904, as illustrated on the left in FIG. 29. Alternatively or additionally, the canopy 2902 and the door 2904 may be opened together, as illustrated on the right in FIG. 29.

Figure 30:
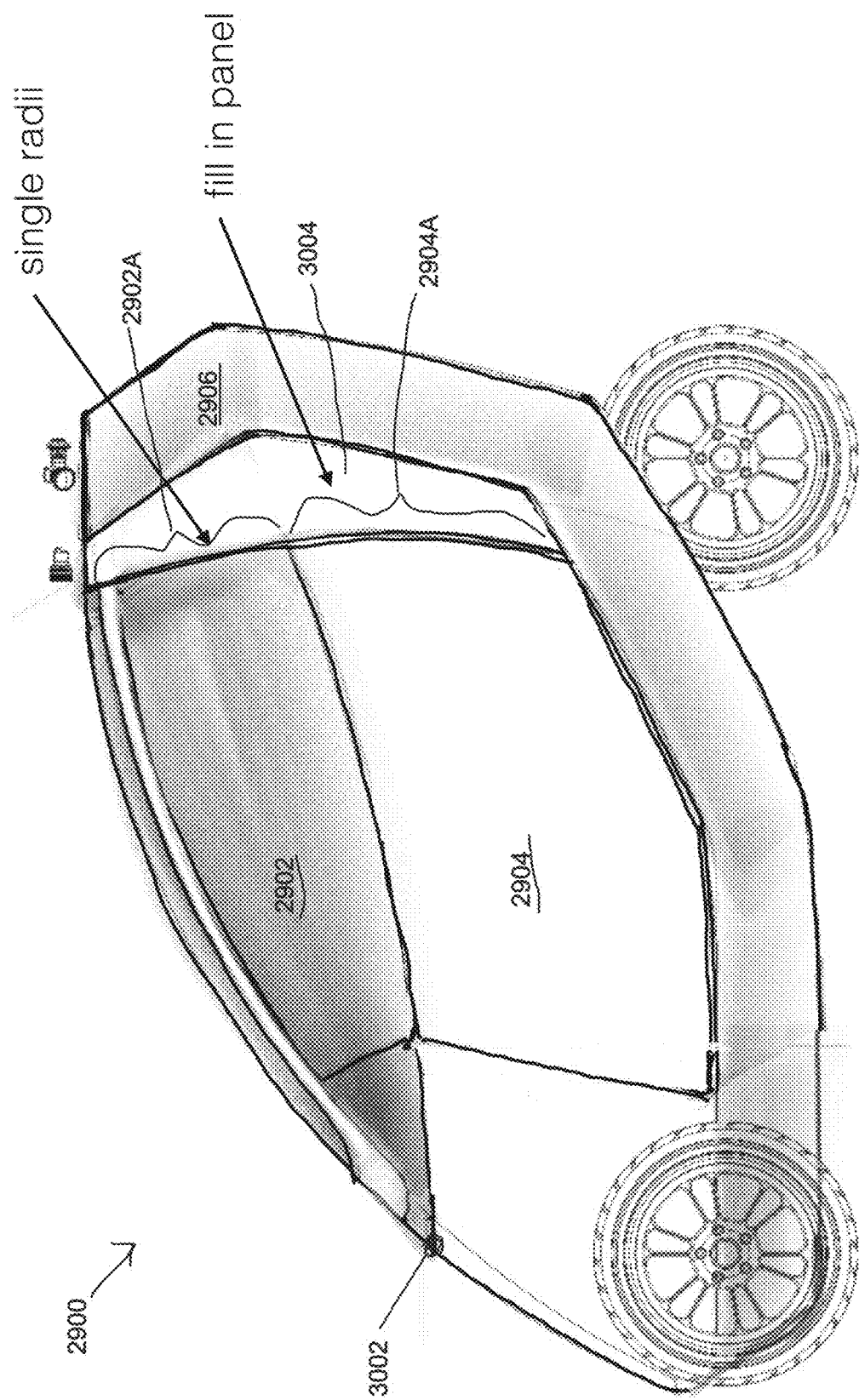
FIGS. 30-35 illustrate example profiles of a canopy of a modular vehicle including various structural and/or aesthetic designs.
Figure 31:
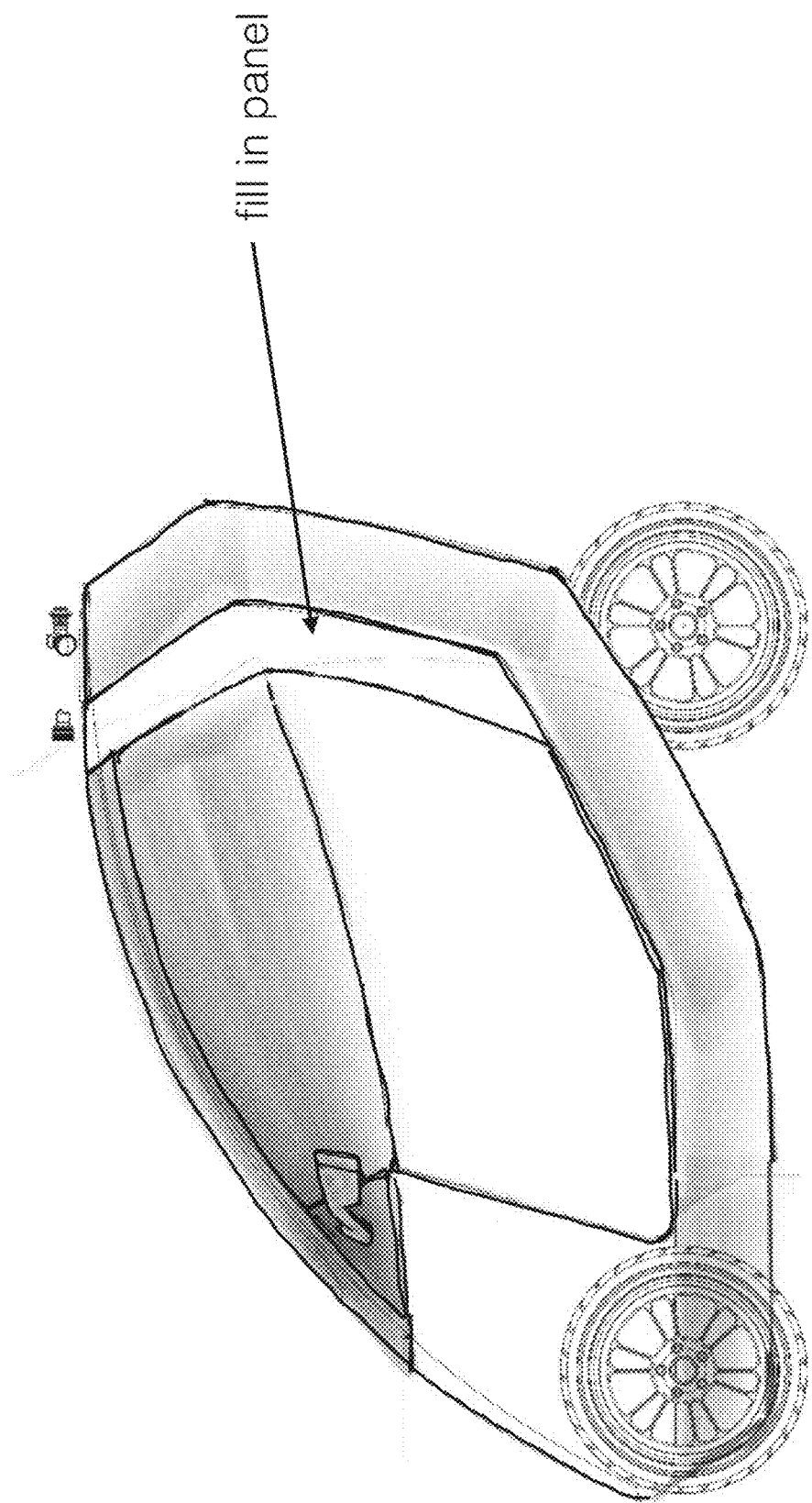
Figure 32:
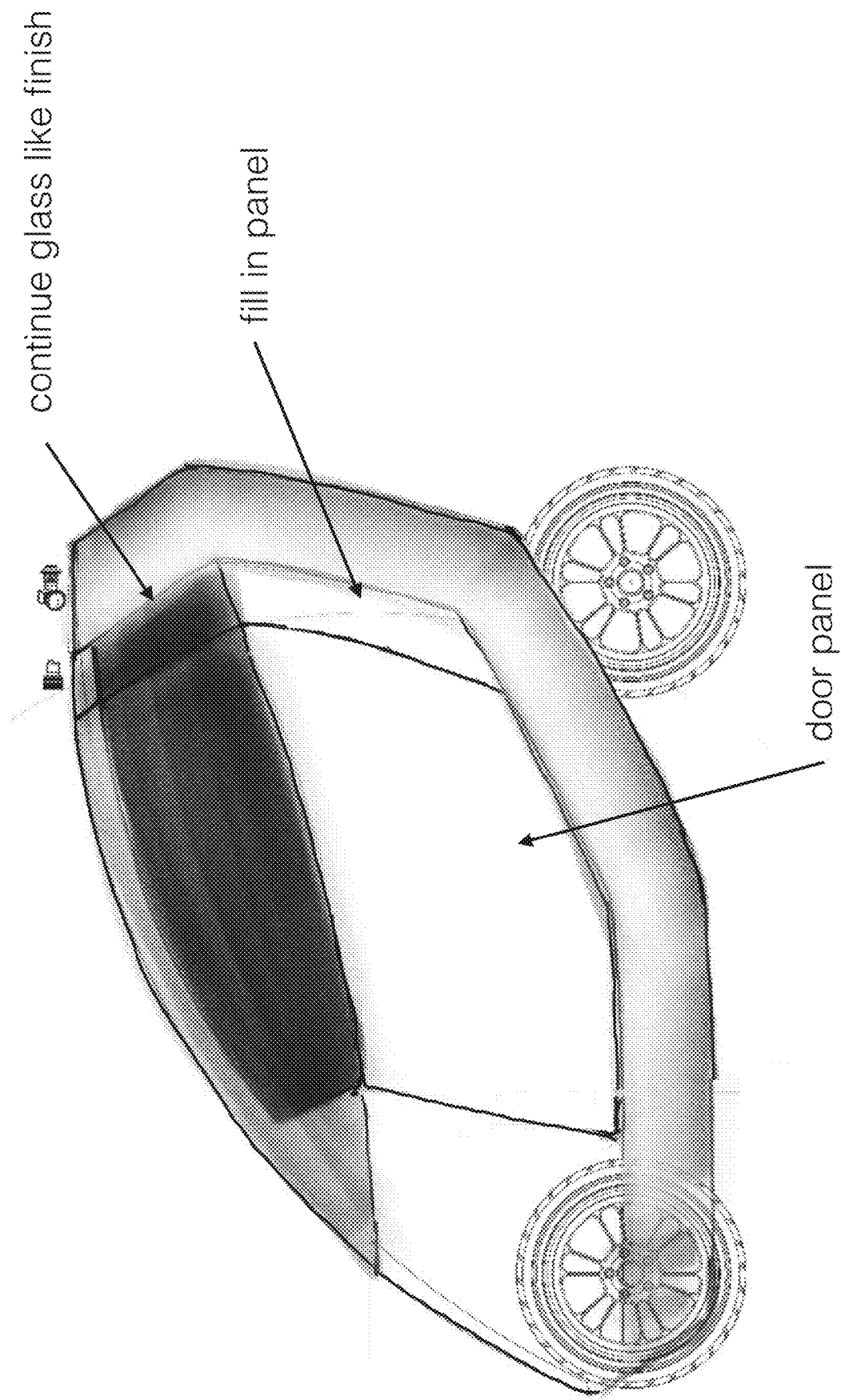

FIGS. 30-35 illustrate example profiles of a canopy of a modular vehicle including various structural and/or aesthetic designs, according to one or more embodiments of the present disclosure. FIG. 30 shows the modular vehicle 2900 of FIG. 29 in which the canopy 2902 and/or the door 2904 are rotatable about an axis of rotation 3002 relative to the body, frame, and/or chassis 2906. The modular vehicle 2900 may further include a fill in panel 3004 to fill in a space between trailing edges 2902A, 2904A of the canopy 2902/door 2904 and the body, frame, and/or chassis 2906. The trailing edges 2902A, 2904A may have a common radius of curvature centered on the axis of rotation 3002. The fill in panel 3004 may have a complementary radius of curvature. The fill in panel 3004 may be provided between the body, frame, and/or chassis 2906 and the canopy 2902/door 2904 to provide the complementary radius of curvature to that of the trailing edges 2902A, 2904 to form a tight seal between the canopy 2902/door 2904 and the fill in panel 3004.

Figure 33:
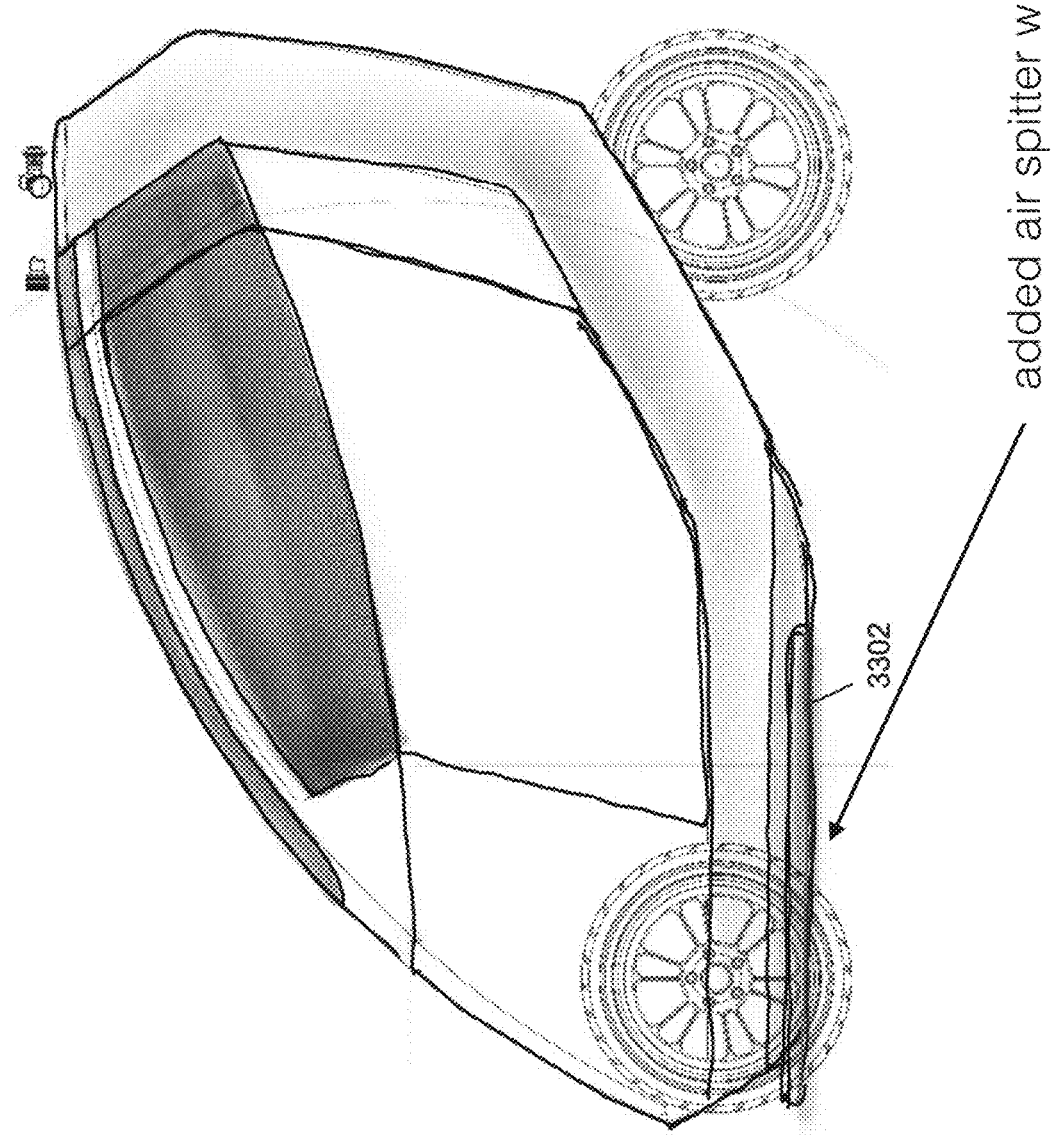
Figure 34:
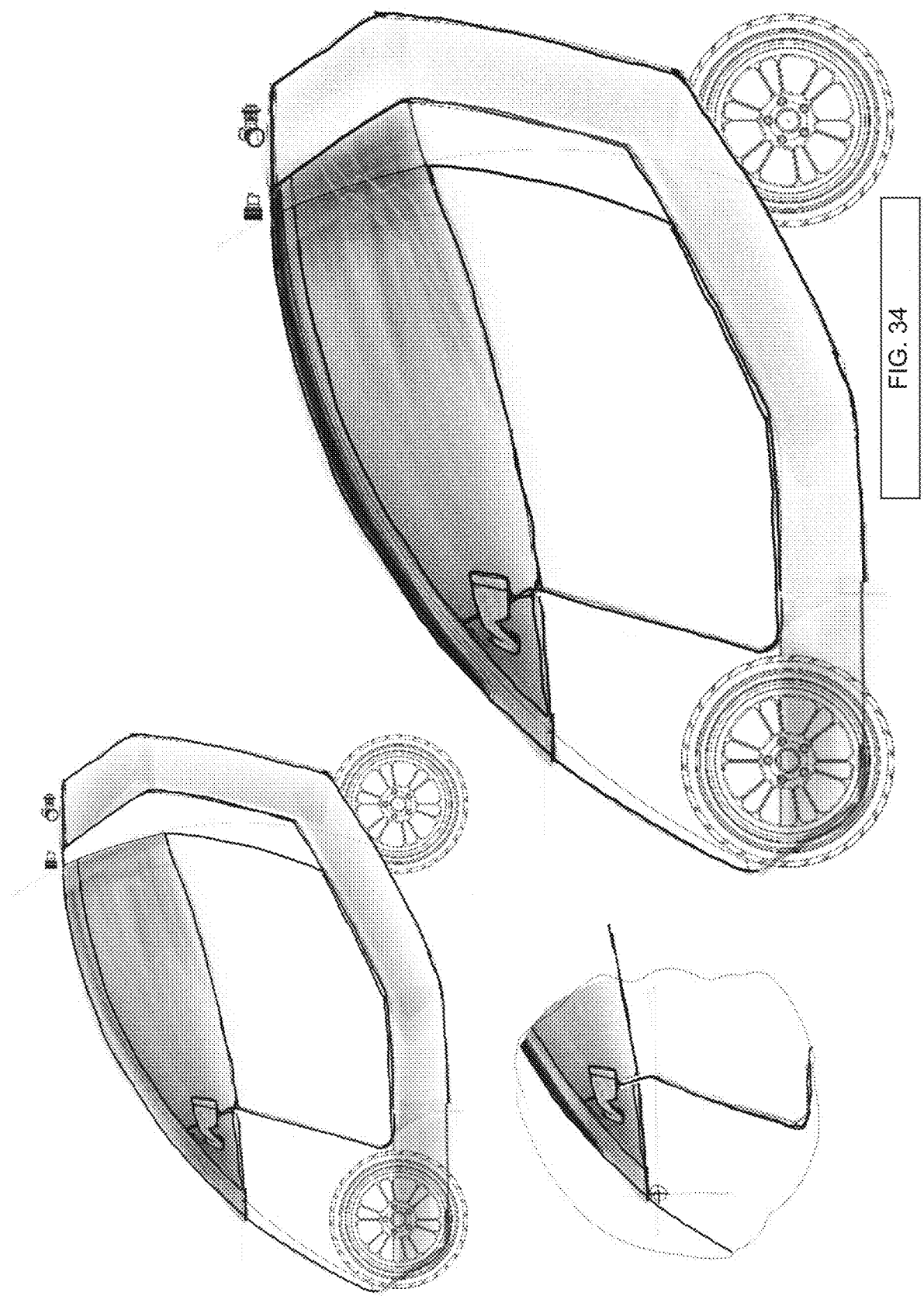
Figure 35:
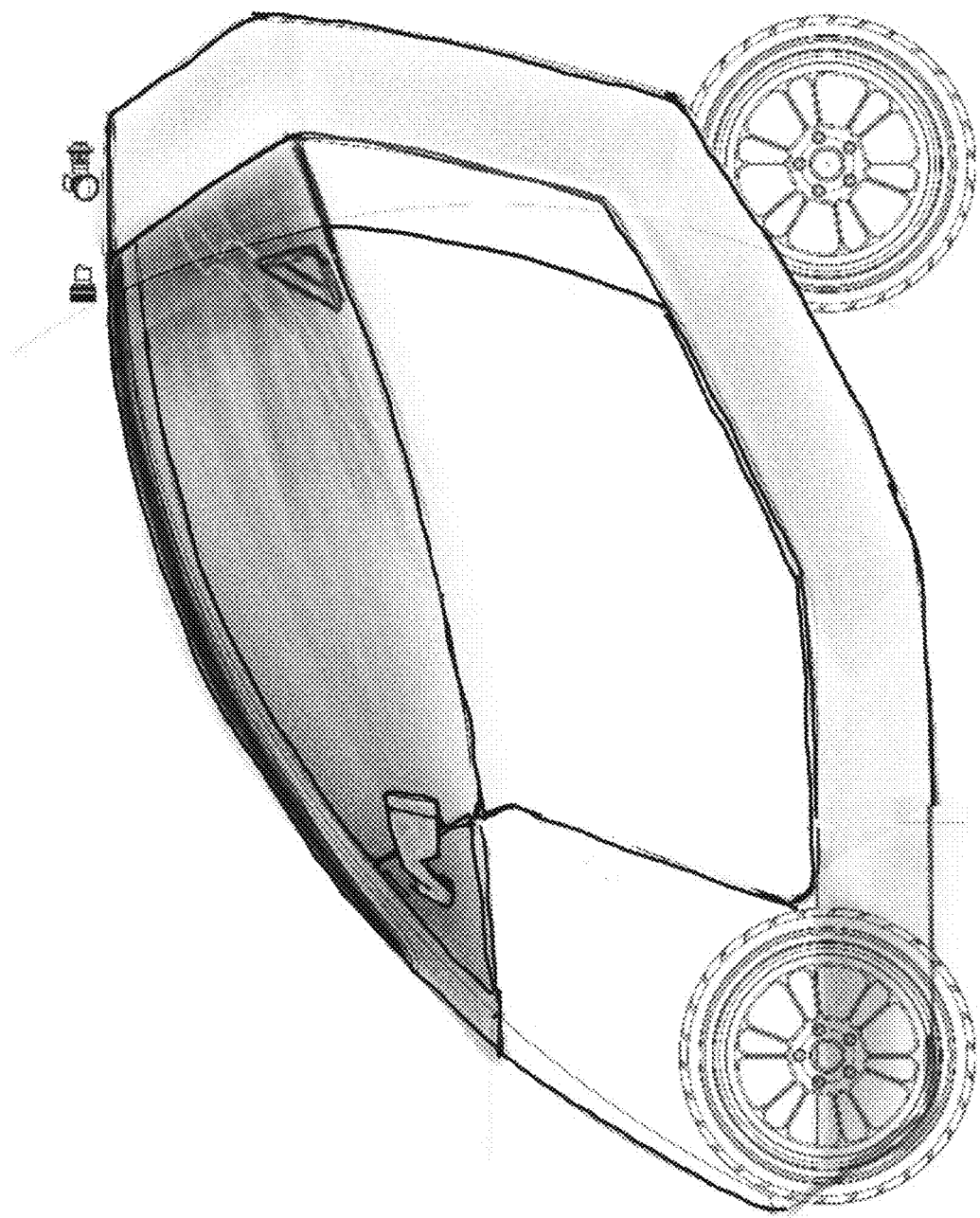

FIG. 33 also illustrates an example air splitter 3302 with light feature attached to a bottom of the illustrated modular vehicle.

Figure 36:
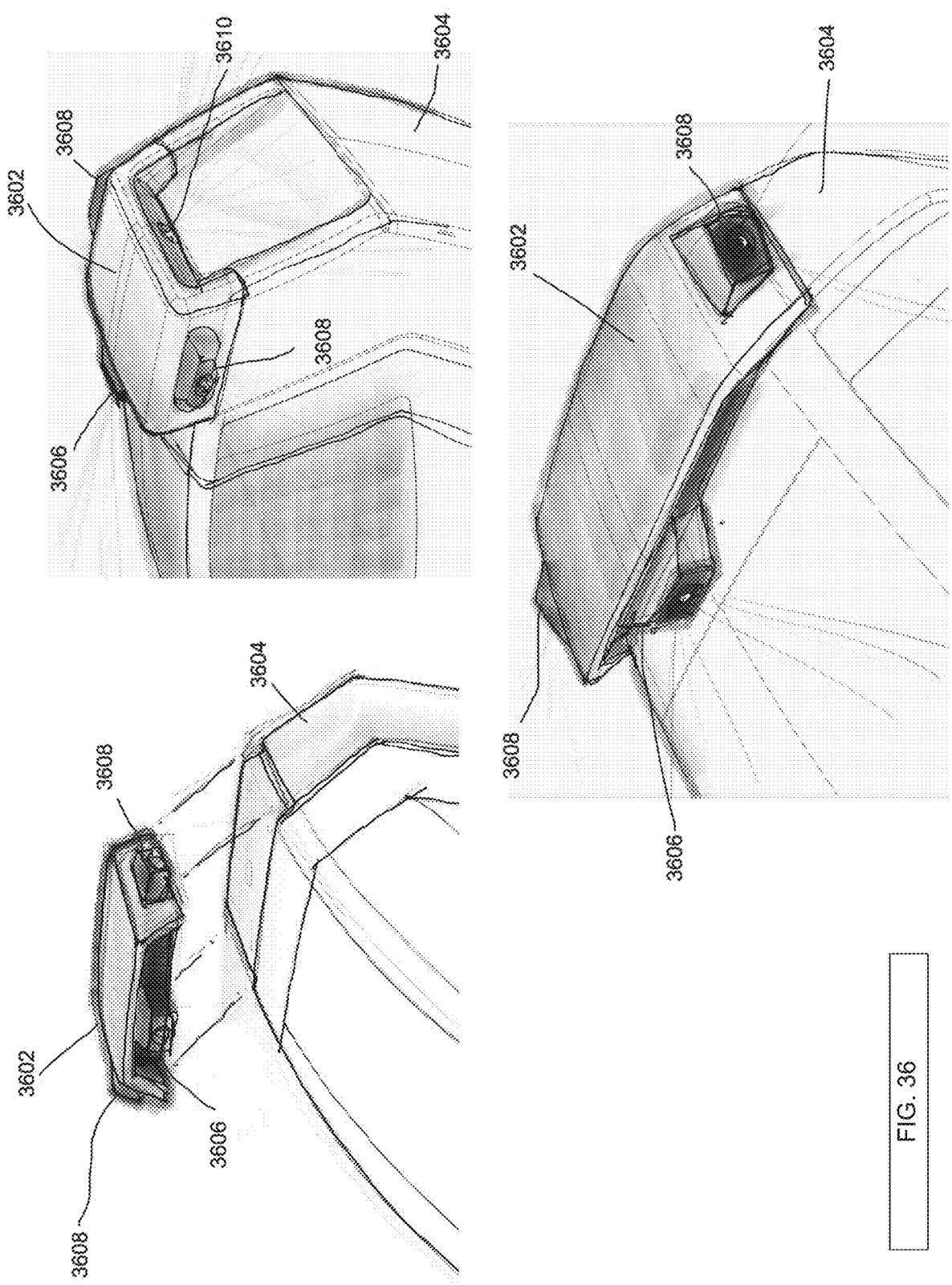
FIG. 36 illustrates an example configuration of a sensor enclosure that may be attached to a frame of a modular vehicle.

FIG. 36 illustrates an example configuration of a sensor enclosure 3602 that may be attached to a frame 3604 of a modular vehicle, according to one or more embodiments of the present disclosure. The sensor enclosure 3602 may include at least a front facing camera 3606, multiple side facing cameras 3608, 3610, and a rear facing camera 3612. The sensor enclosure 3602 is another example module that may be implemented as part of a modular vehicle. Implementation as a module may permit easier replacement of the sensor enclosure 3602 in the event of damage, failure, and/or upgrades.

Figure 37:
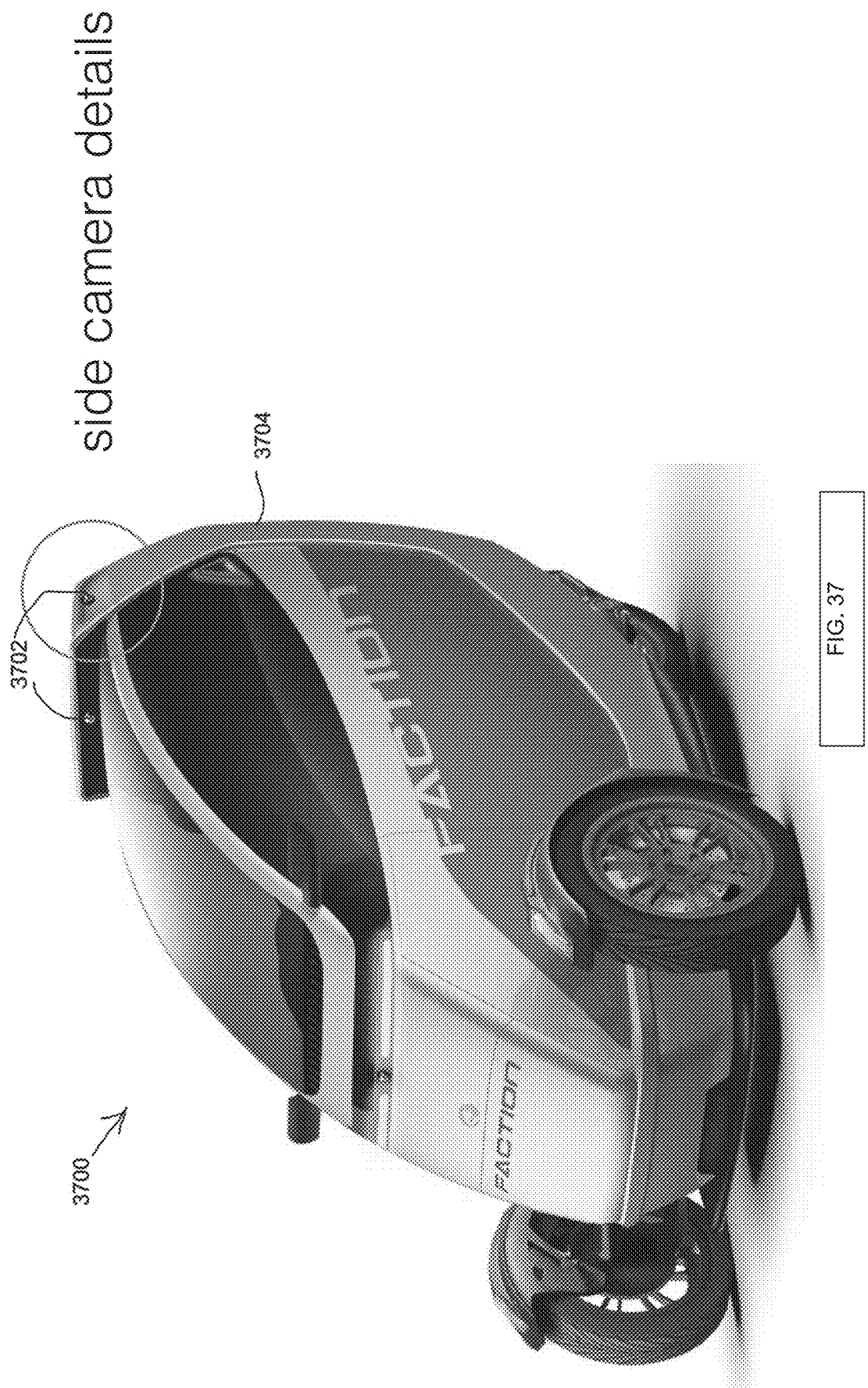
FIG. 37 illustrates a perspective view of a modular vehicle including multiple sensors integrated into a frame of the modular vehicle.
Figure 41:
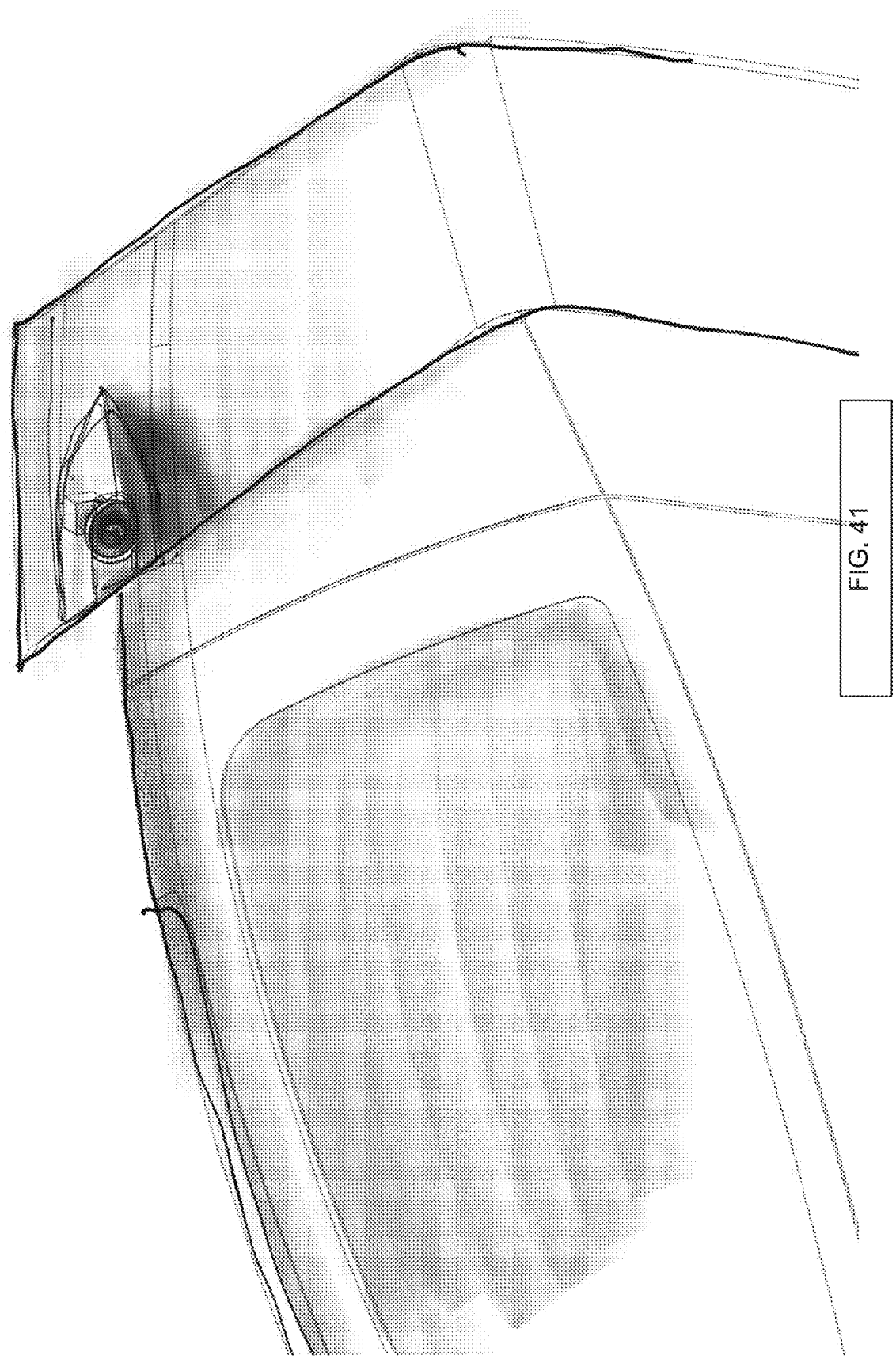
Figure 42:
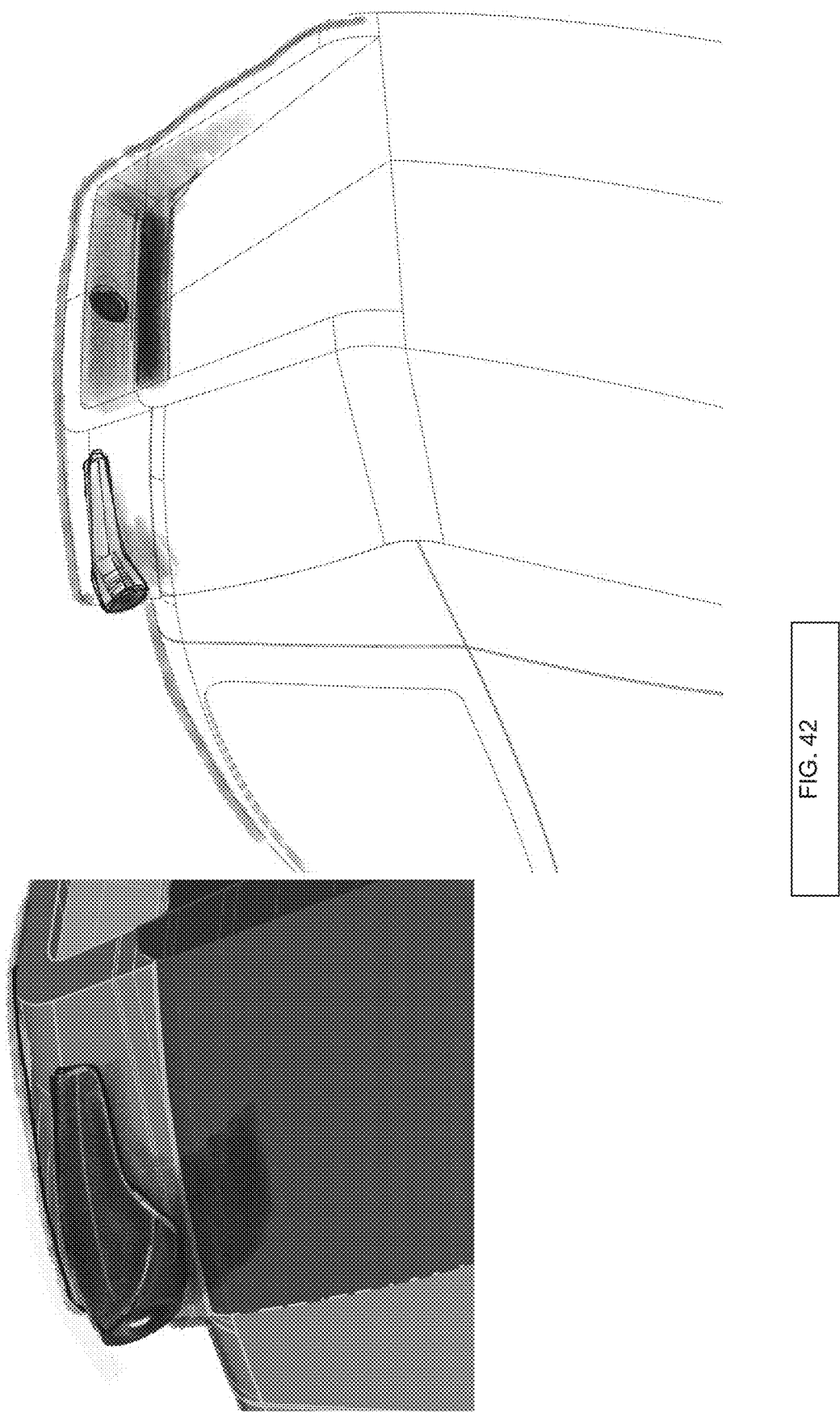
Figure 45:
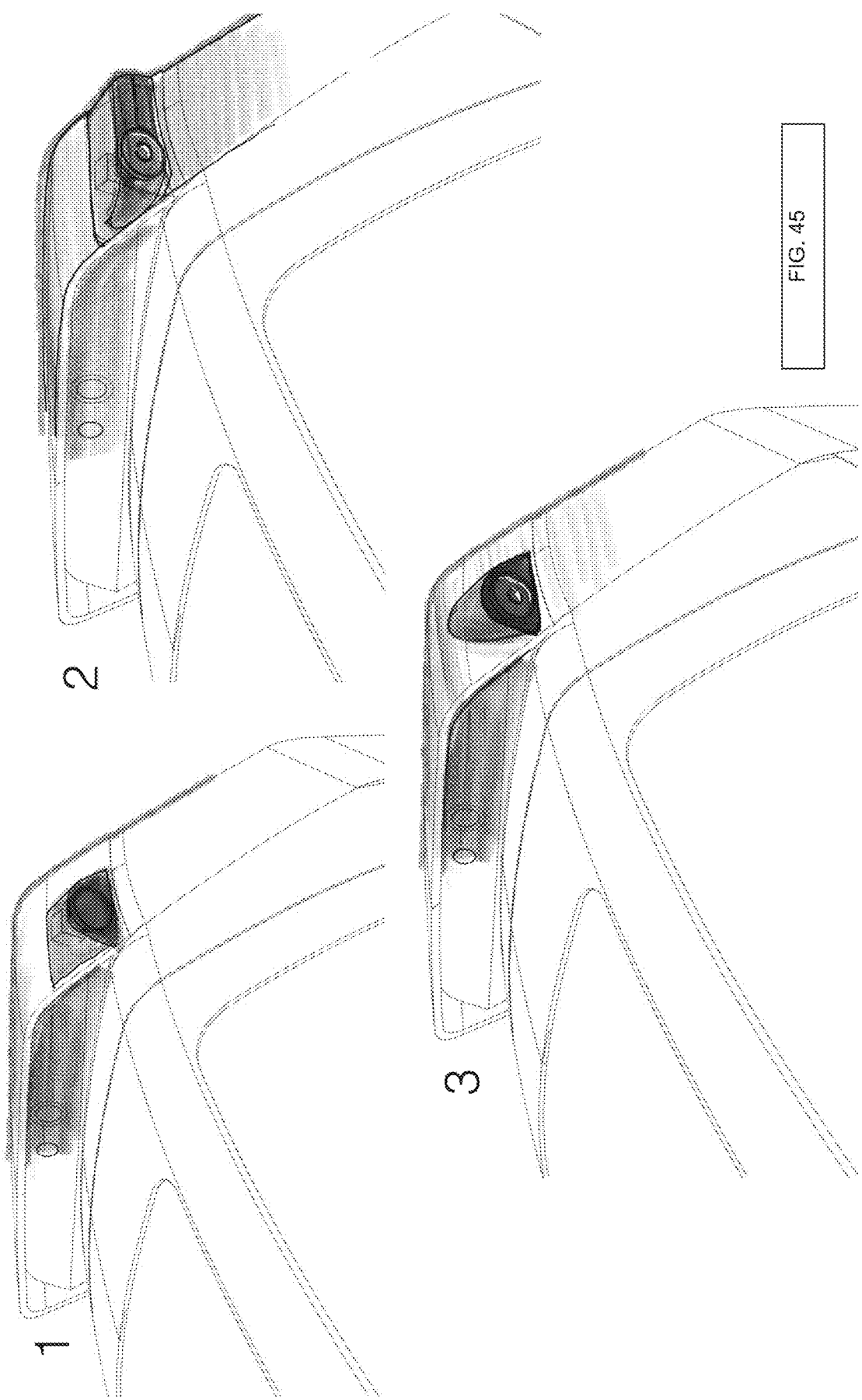
Figure 46:
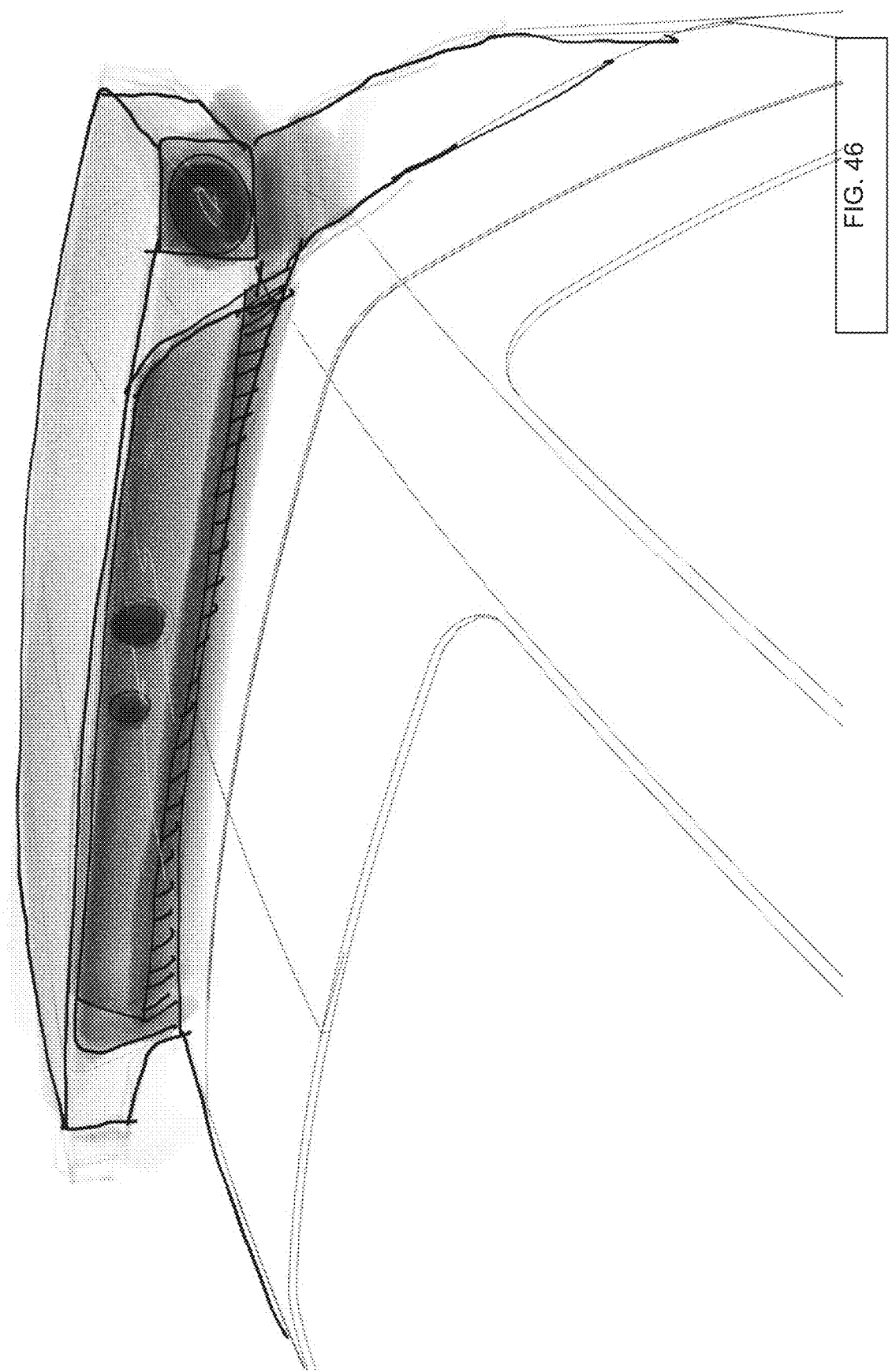
Figure 47:
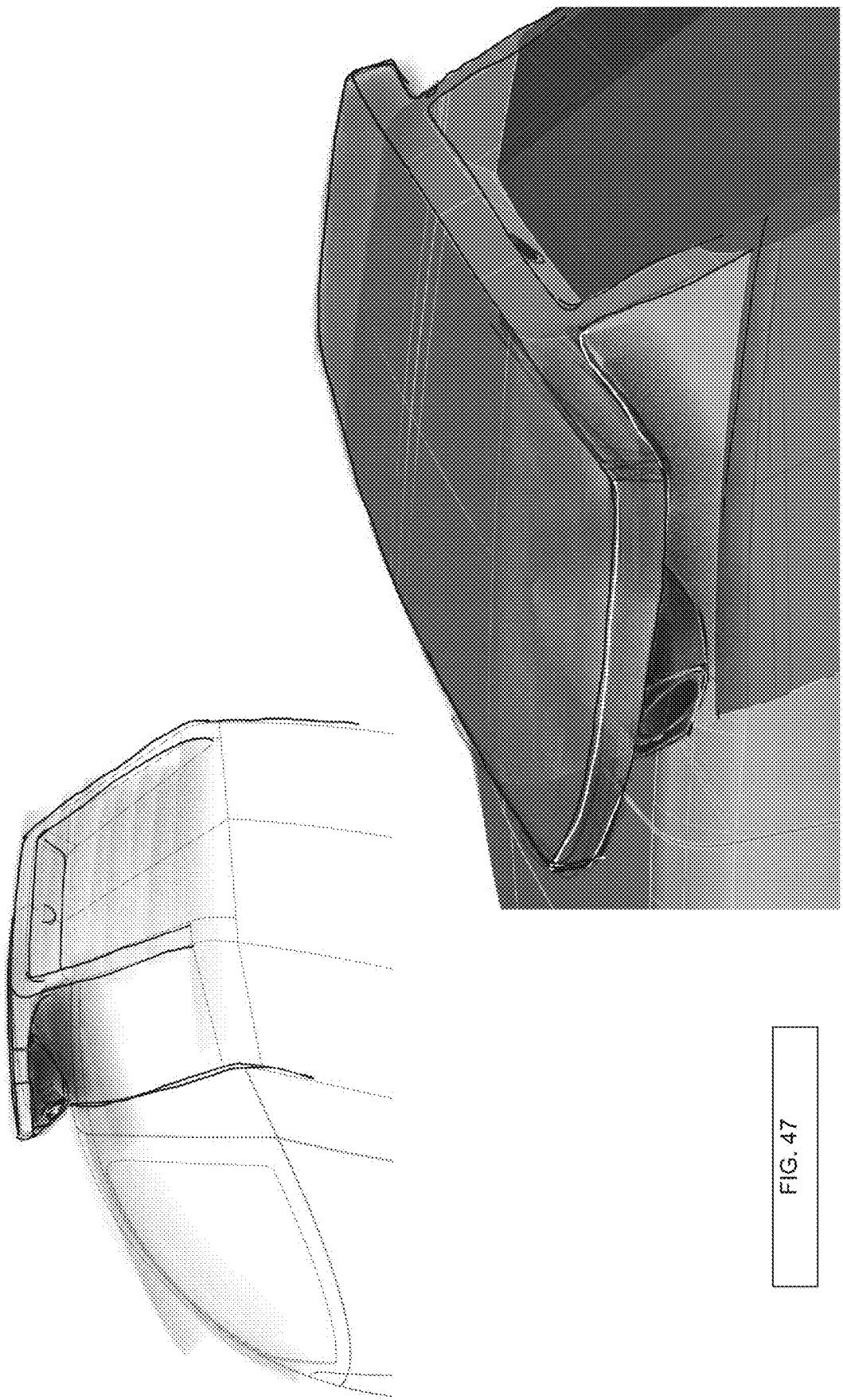

FIG. 37 illustrates a perspective view of a modular vehicle 3700 including multiple sensors 3702 integrated into a frame 3704 of the modular vehicle 3700, according to one or more embodiments of the present disclosure. While only two sensors 3702 are visible in FIG. 37, the modular vehicle 3700 may have one or more others sensors, e.g., pointing rearward and/or rightward, that are not visible in FIG. 37. The sensors 3702 may include various directional cameras or other sensors (e.g., radar, lidar, or the like).

FIGS. 38-45 illustrate example configurations of various side facing (or at least partially side facing) sensors attached to a sensor enclosure or frame of a modular vehicle, according to one or more embodiments of the present disclosure. The various side facing sensors may provide structural and/or aesthetic support for the modular vehicle.

FIGS. 46-49 illustrate example configurations of various wing shaped sensor enclosures, according to one or more embodiments of the present disclosure. The various wing shaped sensor enclosures may provide structural, aerodynamic, and/or aesthetic support for the modular vehicle. In some embodiments, the various sensor enclosures depicted throughout the drawings may be modular and/or may provide different configurations for sensors to attach to the modular vehicle.

As used in the present disclosure, the terms "module" or "component" may refer to physical objects or elements that may be detachably coupled to a module vehicle. Additionally or alternatively, the terms "module" or "component" may refer to specific electrical component hardware implementations configured to perform one or more operations. Additionally or alternatively, the terms "module" or "component" may refer to software objects or software routines that may be stored on and/or executed by general purpose hardware (e.g., computer-readable media, processing devices, etc.) of a computing system.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B." This interpretation of the phrase "A or B" is still applicable even though the term "A and/or B" may be used at times to include the possibilities of "A" or "B" or "A and B."

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. An autonomous modular vehicle comprising:
   electronic components;
   a plurality of sensors;
   a three-wheeled chassis;
   a frame attached to the three-wheeled chassis, the frame configured to enclose the electronic components, and the frame configured to support a sensor enclosure, the sensor enclosure configured to house the plurality of sensors; and
   a modular body attached to the frame, the modular body comprising:
      a battery;
      an electrical charging system configured to receive an electrical input for charging the battery;
      a modular interior portion configured to be one of a cargo configuration, a single rider configuration, or a double rider configuration;
      a door configured to provide access and egress to the modular interior portion, the door rotatably coupled to the modular body; and
      a canopy attached to a superior portion of the door, wherein the canopy is releasably attached to the superior portion of the door and is rotatably coupled to the modular body, the canopy configured to open and close independent of the door.

2. The autonomous modular vehicle of claim 1, wherein the modular body further comprises a steering wheel located in the modular interior portion of the modular body.

3. The autonomous modular vehicle of claim 1, wherein the steering wheel is retractable.

4. The autonomous modular vehicle of claim 1, wherein the door is operable to, at separate times, remain in place while the canopy opens and closes and to open and close with the canopy.

5. The autonomous modular vehicle of claim 1, wherein the modular interior portion is the cargo configuration, the modular interior portion including at least one of a cargo cage, a shelving system, or a folder/envelope carrying system.

6. The autonomous modular vehicle of claim 1, wherein the modular interior portion is the single rider configuration or the double rider configuration, the modular interior portion including at least one seat to accommodate at least one passenger.

7. The autonomous modular vehicle of claim 6, wherein the modular interior portion further includes at least one of a storage compartment, an adjustable cargo net, or a shelf located behind the at least one seat.

8. The autonomous modular vehicle of claim 1, further comprising a charge port to access the electrical charging system from an exterior of the autonomous modular vehicle, the charge port coupled to at least one of the modular body or the frame and configured to electrically and mechanically couple a charger to the electrical charging system to receive the electrical input from the charger.

9. The autonomous modular vehicle of claim 1, wherein the electrical charging system includes an inductive charging circuit positioned on or towards a bottom of the autonomous modular vehicle, the inductive charging circuit configured to cooperate with an inductive charger mat positioned beneath the inductive charging circuit to receive the electrical input for charging the battery.

10. The autonomous modular vehicle of claim 1, further comprising a 2-stage hinge mechanism that rotatably and slidably couples at least one of the door or the canopy to at least one of the modular body, the frame, or the chassis.

11. The autonomous modular vehicle of claim 10, wherein the 2-stage hinge mechanism comprises:
   two tracks mounted to the at least one of the modular body, the frame, or the chassis; and
   two support mounts mounted to the at least one of the door or the canopy;
   wherein each support mount is slidably and rotatably coupled to a different one of the two tracks.

12. The autonomous modular vehicle of claim 10, wherein the 2-stage hinge mechanism comprises:
   two tracks mounted to the at least one of the modular body, the frame, or the chassis, each track comprising a hollow interior and defining a slot in a corresponding inward-facing sidewall;
   two support mounts mounted to the at least one of the door or the canopy; and
   two wheels, each rollable longitudinally relative to a corresponding track within the corresponding hollow interior of the corresponding track;
   wherein each support mount is rotatably coupled through a corresponding slot to a corresponding wheel within the corresponding hollow interior of the corresponding track.

13. The autonomous modular vehicle of claim 10, wherein the 2-stage hinge mechanism comprises:
   two tracks mounted to the at least one of the modular body, the frame, or the chassis;
   two support mounts mounted to the at least one of the door or the canopy; and
   two rails, each slidably coupled to a corresponding one of the tracks and rotatably coupled to a corresponding one of the support mounts.

14. The autonomous modular vehicle of claim 1, wherein each of the door and the canopy has a trailing edge with a radius of curvature, the radius of curvature of the trailing edge of the door being the same as the radius of curvature of the trailing edge of the canopy.

15. The autonomous modular vehicle of claim 14, further comprising a fill panel positioned between the trailing edges of the door and the canopy and a rearmost portion of the frame, a front edge of the fill panel being complementary to the trailing edges of the door and the canopy.

16. The autonomous modular vehicle of claim 1, wherein the sensor enclosure is mountable on a top rear of the frame.

17. The autonomous modular vehicle of claim 16, wherein the one or more sensors include one or more cameras.

18. The autonomous modular vehicle of claim 1, further comprising a components exchange and cable management interface formed in a rear of the frame or modular body.

19. The autonomous modular vehicle of claim 18, further comprising one or more of the following engageable with the components exchange and cable management interface: a cooling module, a sensor module, a processing module, a power management module, or a drive by wire module.

* * * * *